United States Patent [19]
Tanaka et al.

[11] Patent Number: 5,661,711
[45] Date of Patent: *Aug. 26, 1997

[54] OPTICAL RECORDING AND REPRODUCING APPARATUS

[75] Inventors: Masahiko Tanaka, Yokohama; Toshihiro Sugaya, Ibaraki-ken, both of Japan

[73] Assignee: Kabushiki Kaisha Toshiba, Kawasaki, Japan

[*] Notice: The term of this patent shall not extend beyond the expiration date of Pat. No. 5,513,164.

[21] Appl. No.: 582,283

[22] Filed: Jan. 3, 1996

Related U.S. Application Data

[63] Continuation of Ser. No. 407,034, Mar. 17, 1995, Pat. No. 5,513,164, which is a continuation of Ser. No. 118,336, Sep. 9, 1993.

[30] Foreign Application Priority Data

Sep. 11, 1992 [JP] Japan ................................. 4-243733
Mar. 15, 1993 [JP] Japan ................................. 5-080112

[51] Int. Cl.⁶ ........................................ G11B 7/00
[52] U.S. Cl. .................... 369/112; 369/110; 369/109; 369/54; 369/44.37; 369/13
[58] Field of Search ............................... 369/112, 110, 369/109, 54, 44.37, 13, 44.12, 44.38

[56] References Cited

U.S. PATENT DOCUMENTS 5,289,313  2/1994  Matsuoka ........................... 369/110 X
5,513,164  4/1996  Tanaka et al. ...................... 369/112

*Primary Examiner*—Muhammad N. Edun
*Attorney, Agent, or Firm*—Oblon, Spivak, McClelland, Maier & Neustadt, P.C.

[57] ABSTRACT

An optical head has a first light source for emitting a first light beam having a first wavelength, a second light source for emitting a second light beam having a second wavelength larger than the first wavelength, and an optical system for guiding the first and second light beams to an optical disc and guiding light beams reflected by the optical disc to an optical detector. The optical system comprises an objective lens, a beam splitter for reflecting the first light beam and the S-polarized component of the second light beam and transmitting the P-polarized component of the second light beam, and a quarter wavelength plate. When a high density medium is set against the optical hend, recording is performed by the second light beam and reproduction is performed by the first light beam. When a low density medium is set against the optical head, recording and reproduction are carried out by the second light beam. A single optical head provides read/write compatibility with optical discs of different densities, and recording and reproduction can be made on a high density optical disc.

16 Claims, 47 Drawing Sheets

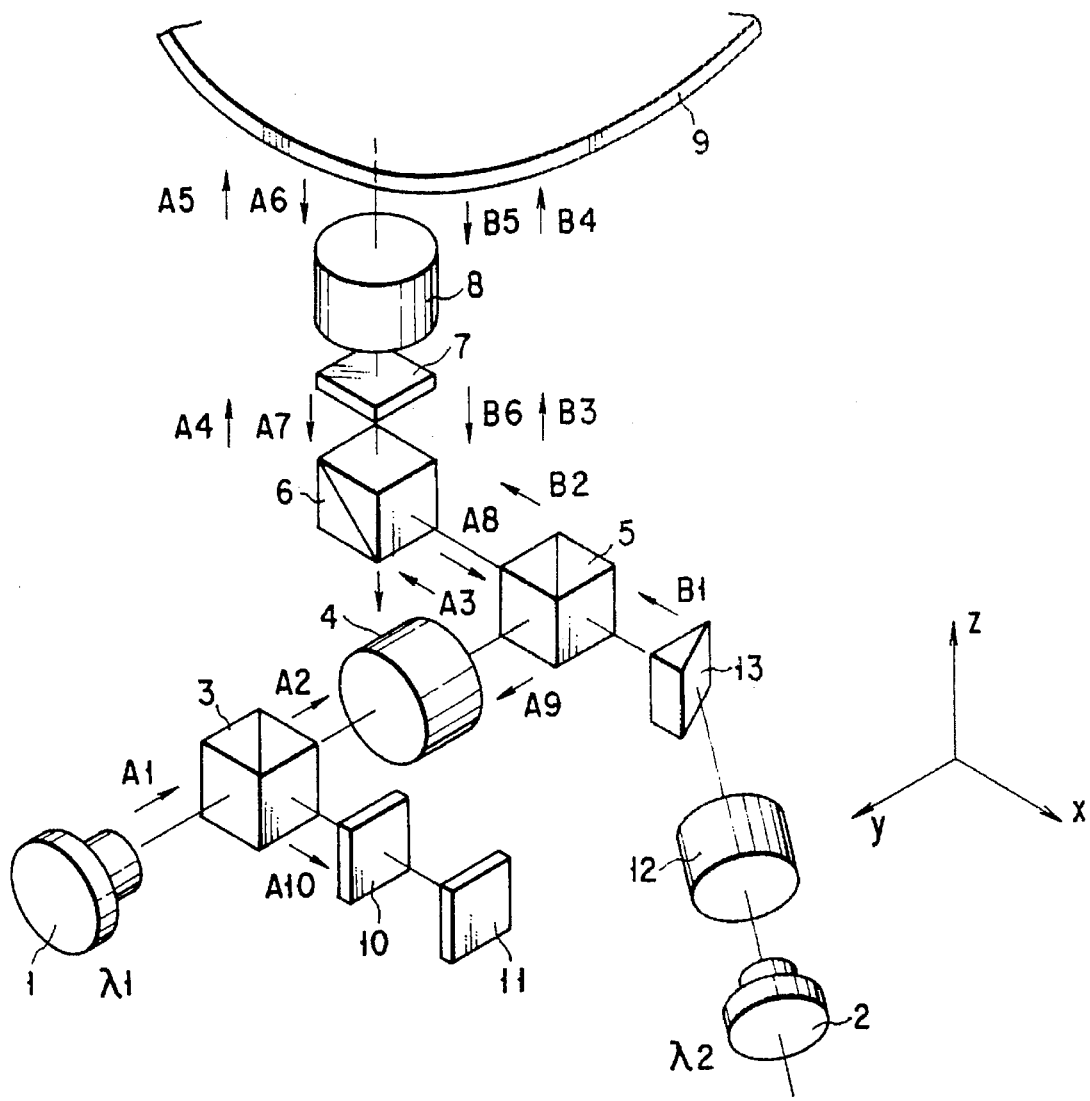
F I G. 1

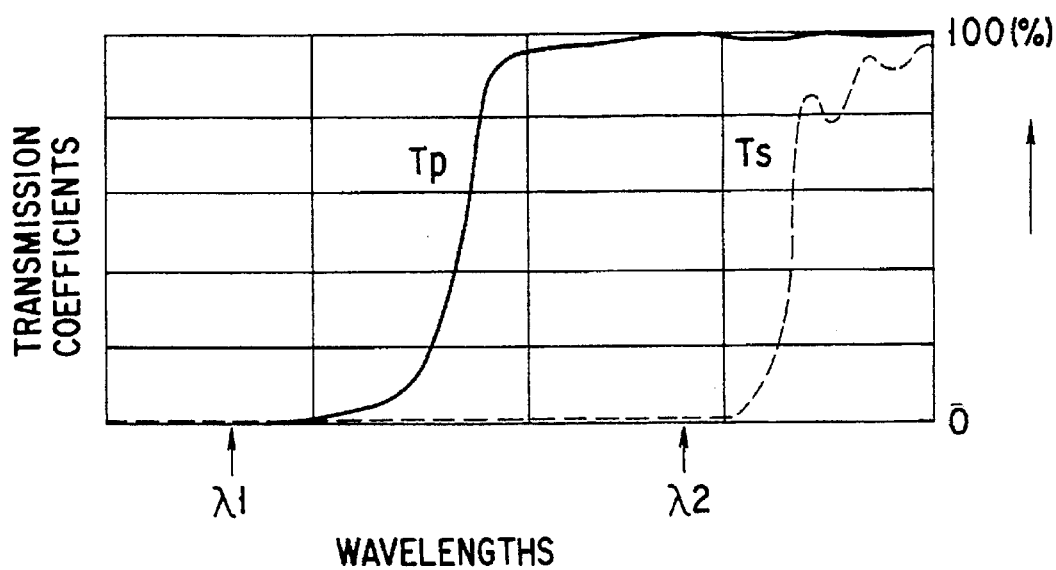
F I G. 4
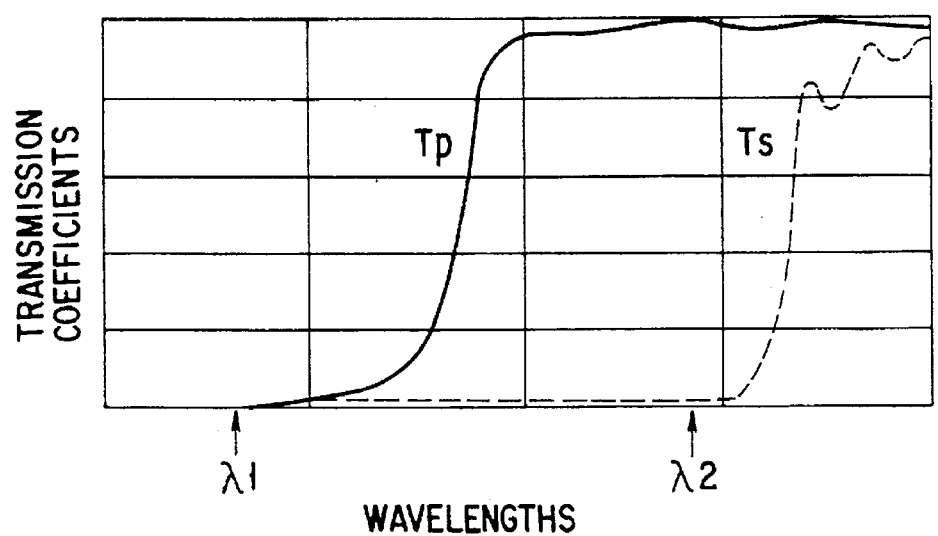
F I G. 5

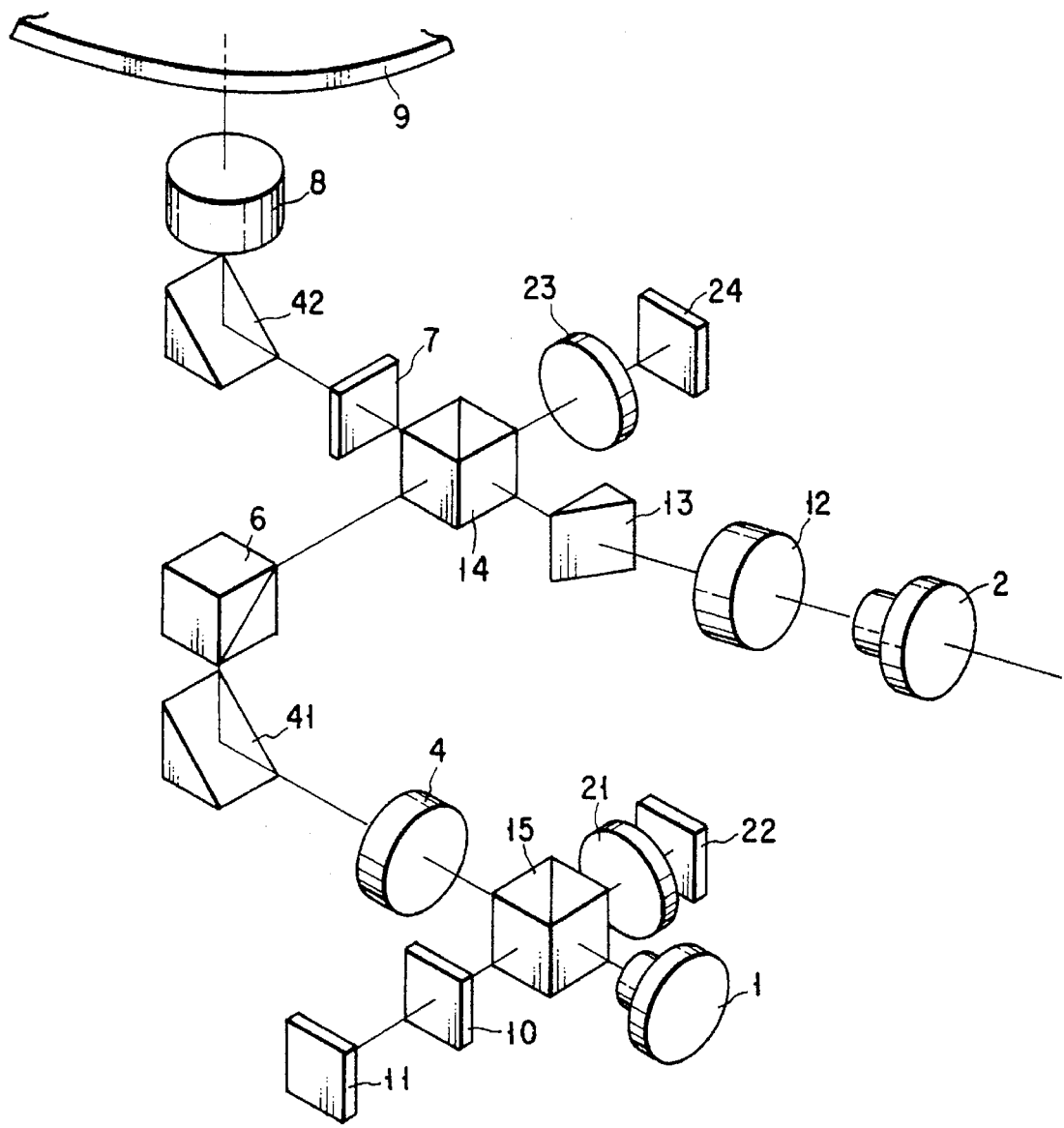
F I G. 12

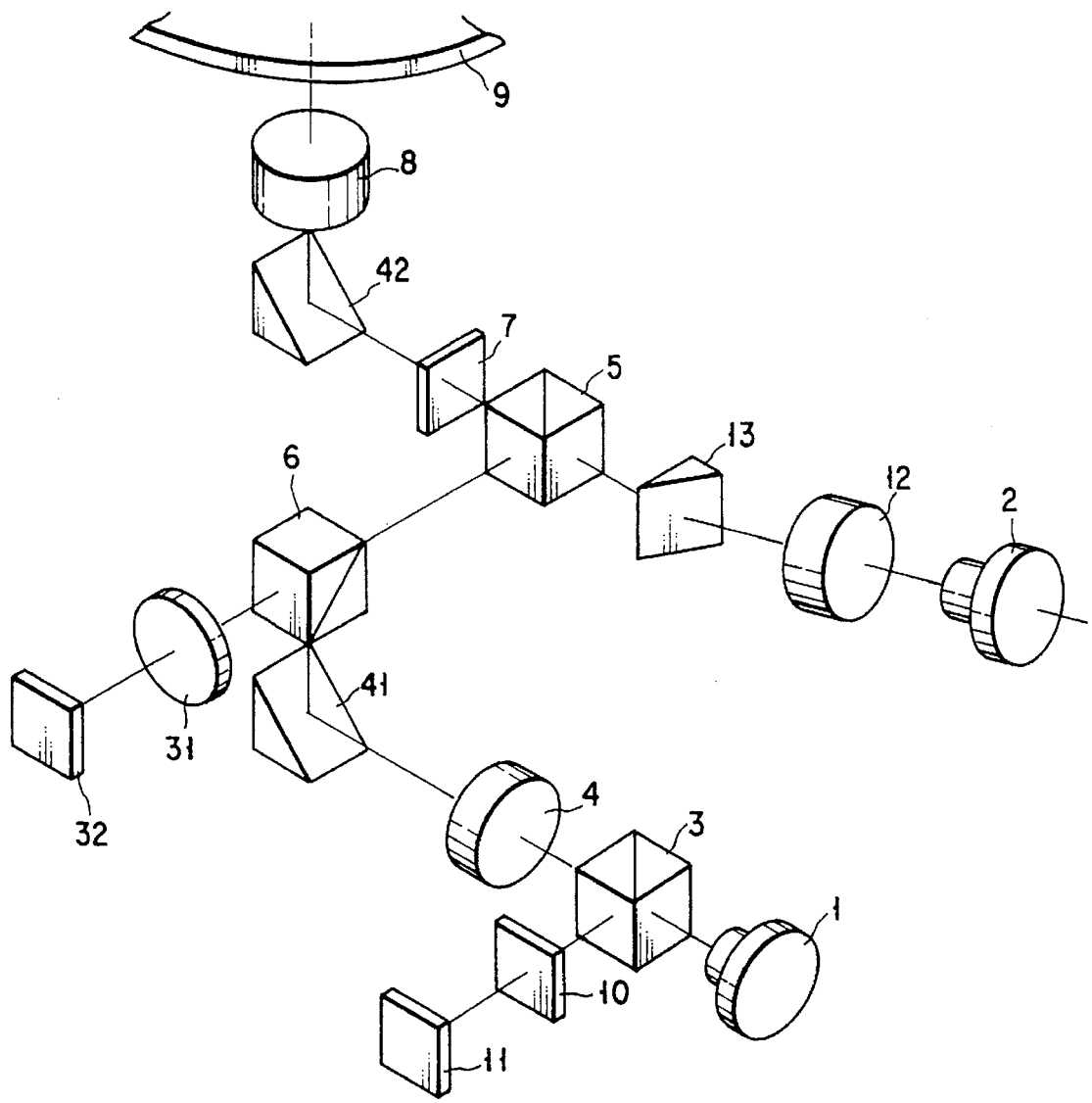
F I G. 13

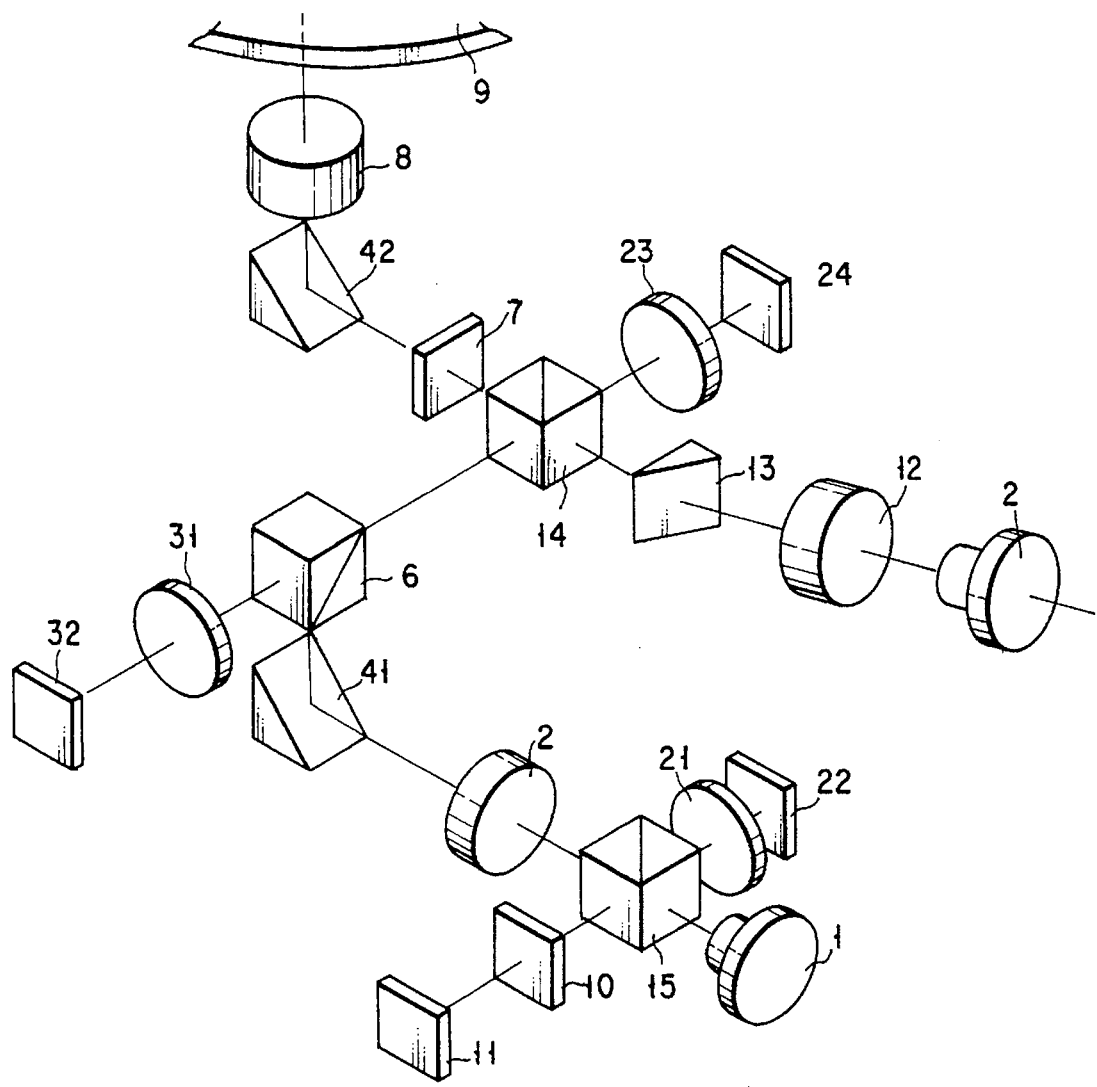
F I G. 14

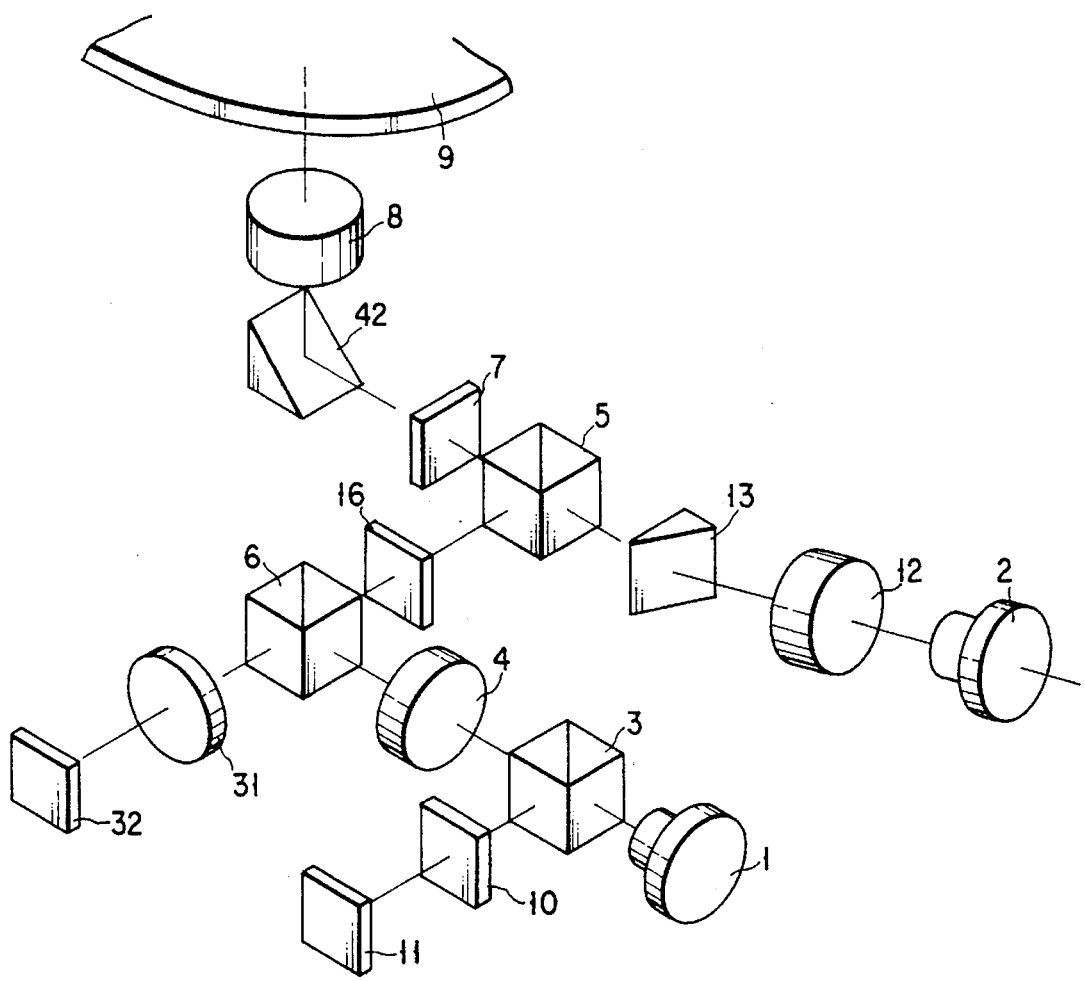
F I G. 21

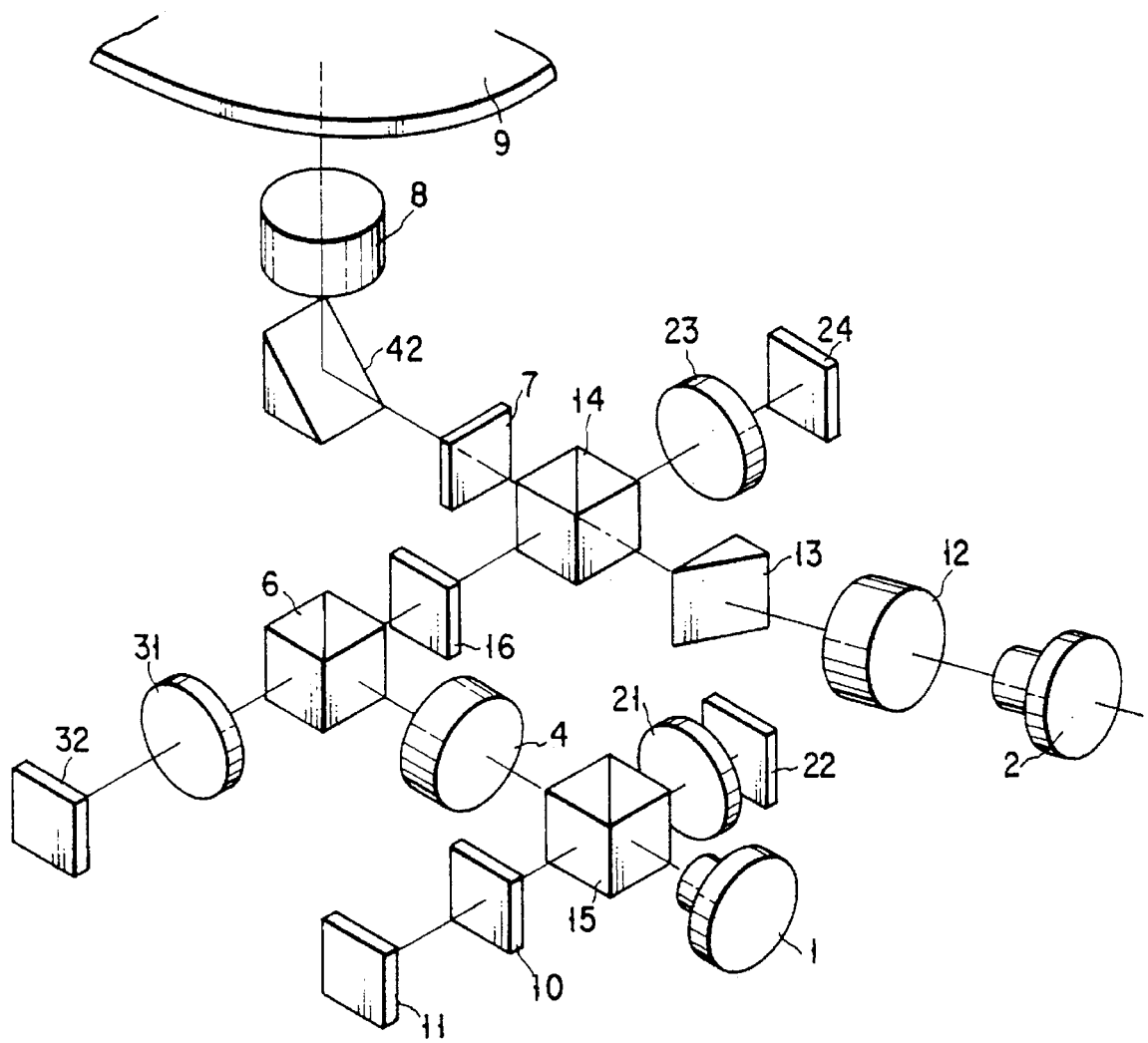
F I G. 22

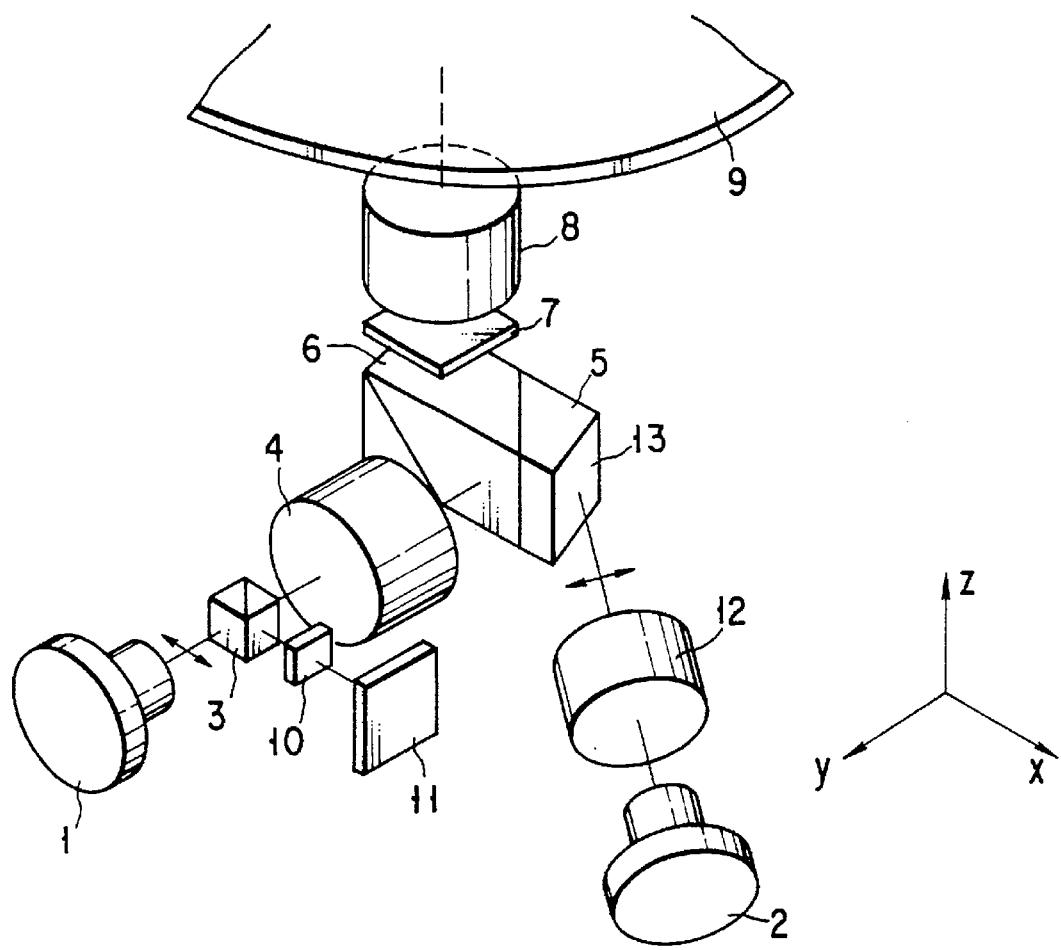
F I G. 23

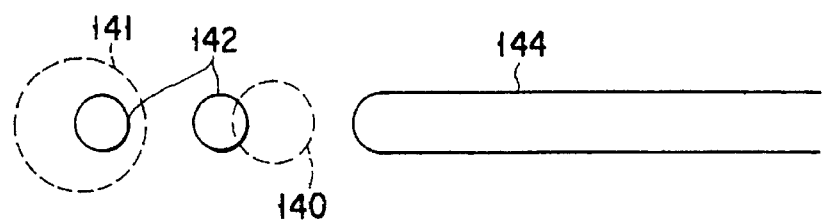
F I G. 25
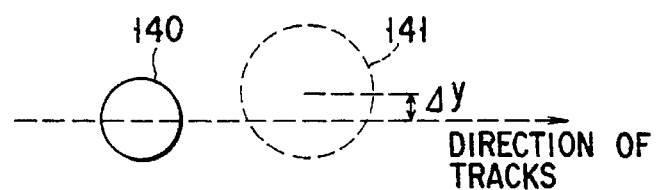
F I G. 26
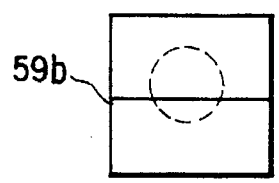 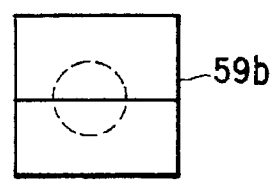
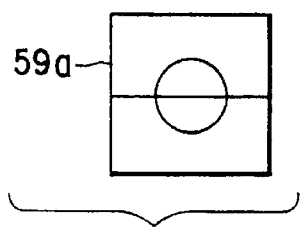 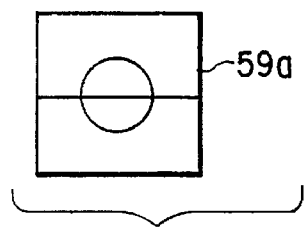
F I G. 27A    F I G. 27B

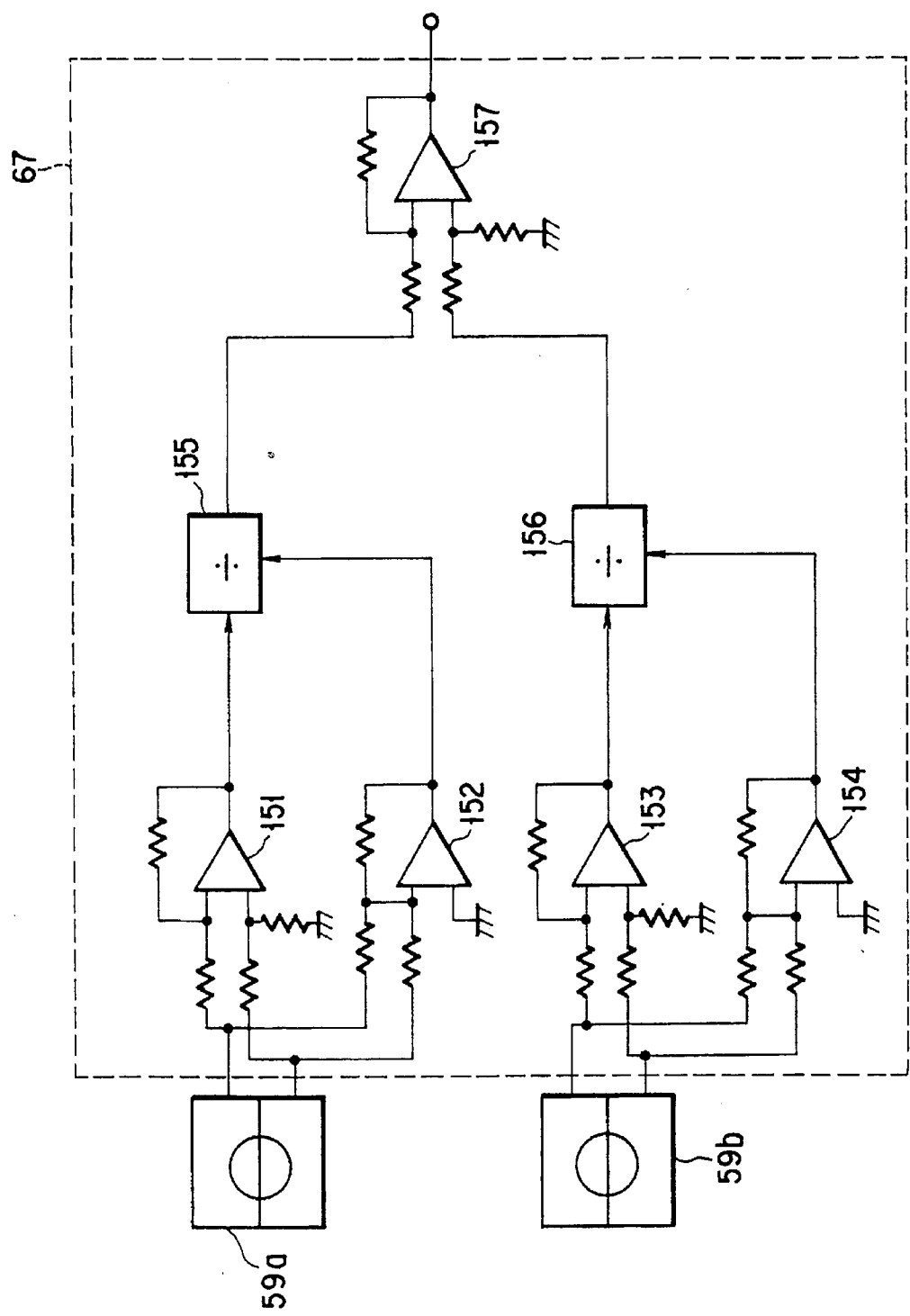
F I G. 28

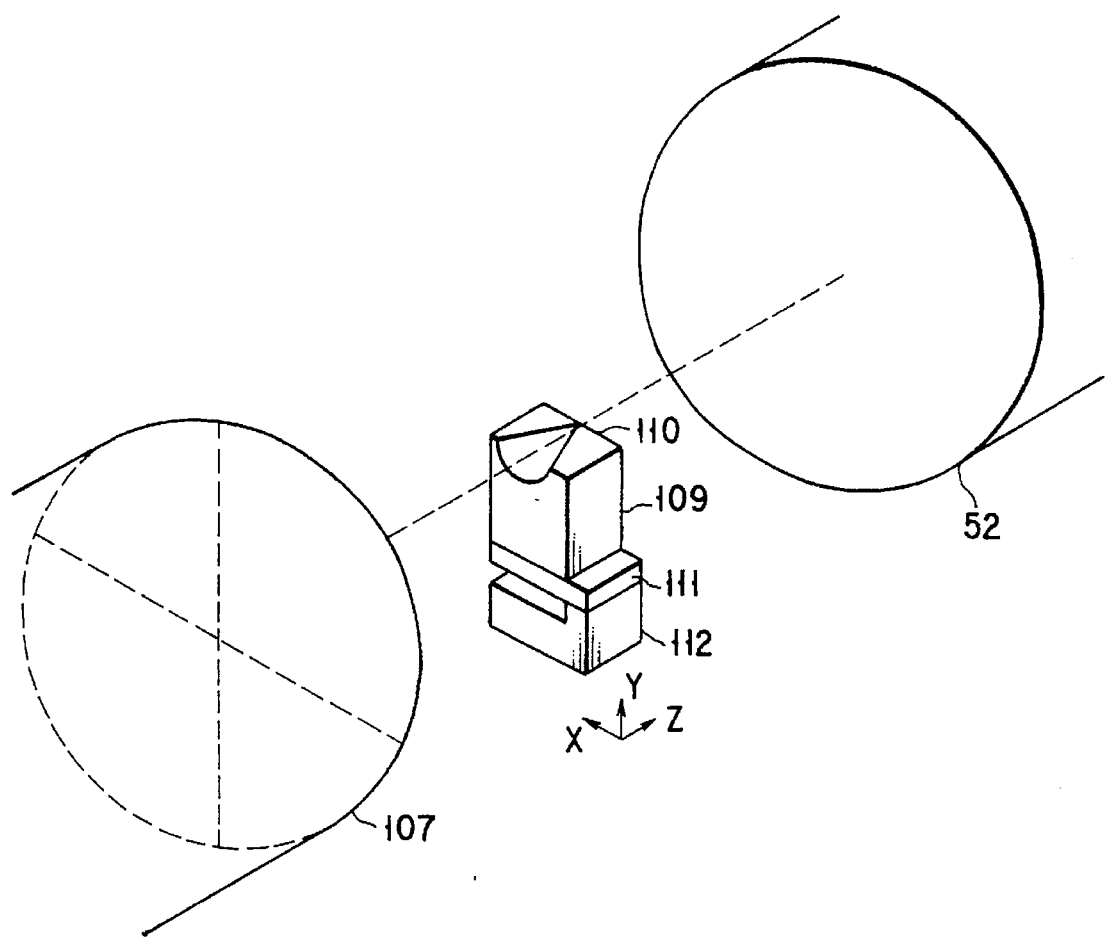
F I G. 35

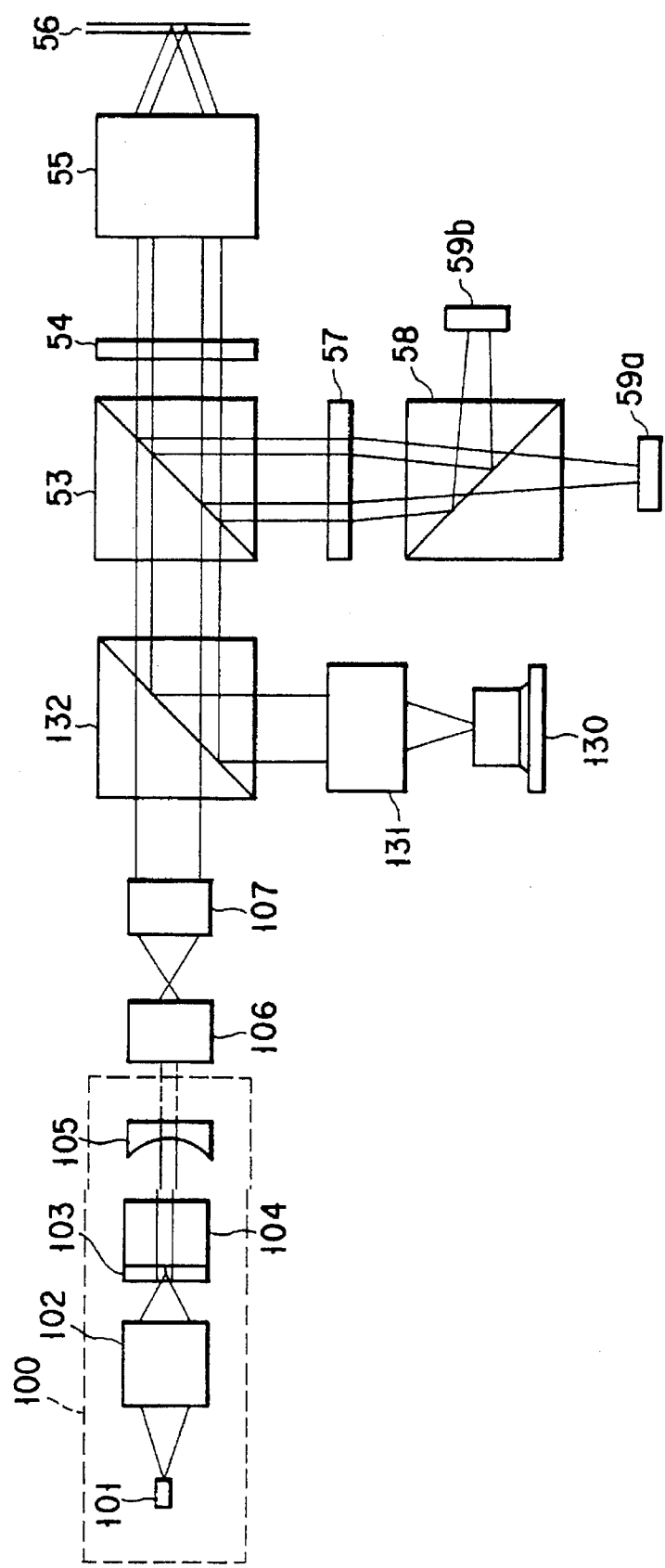
F I G. 40

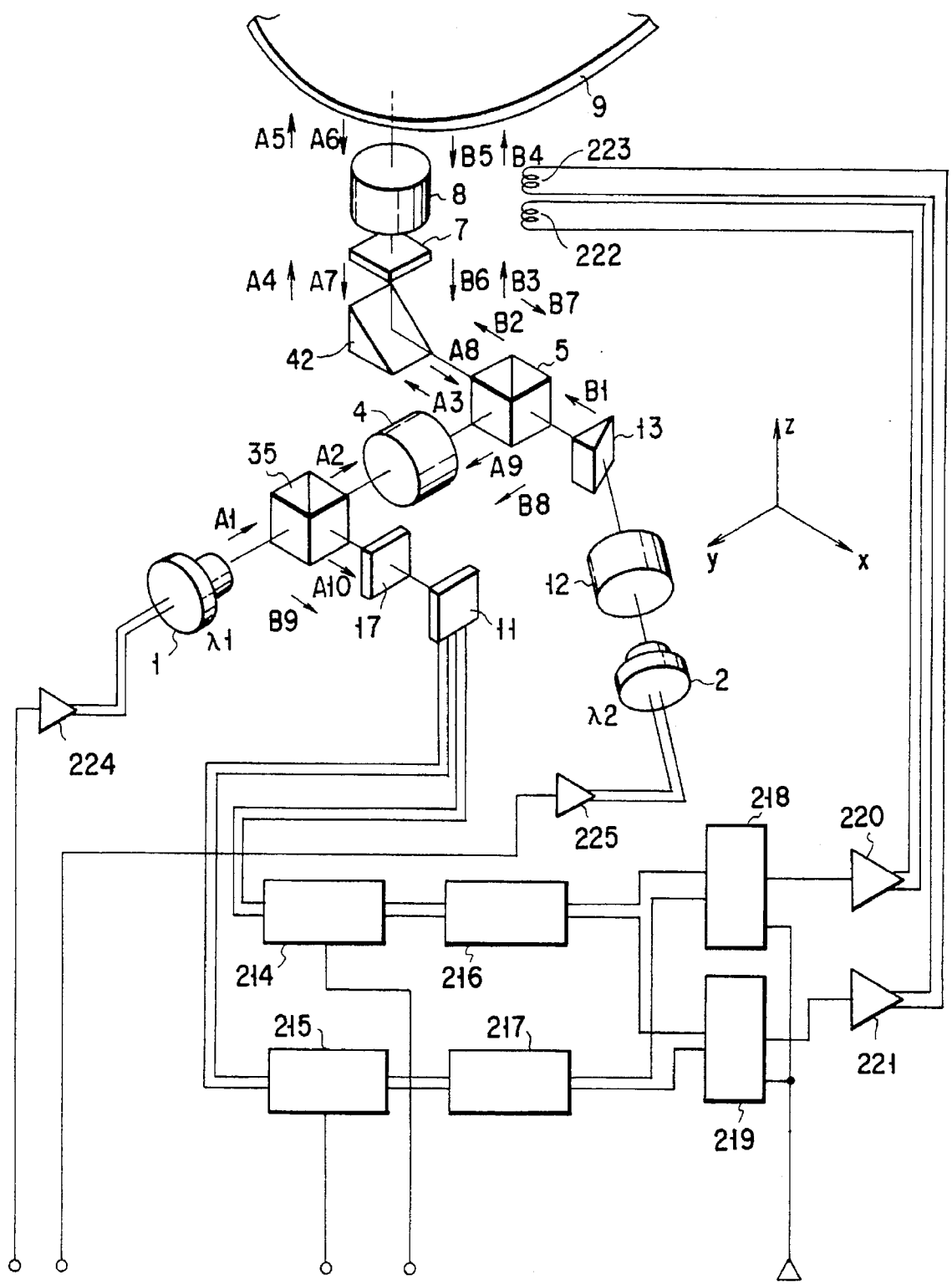
F I G. 41

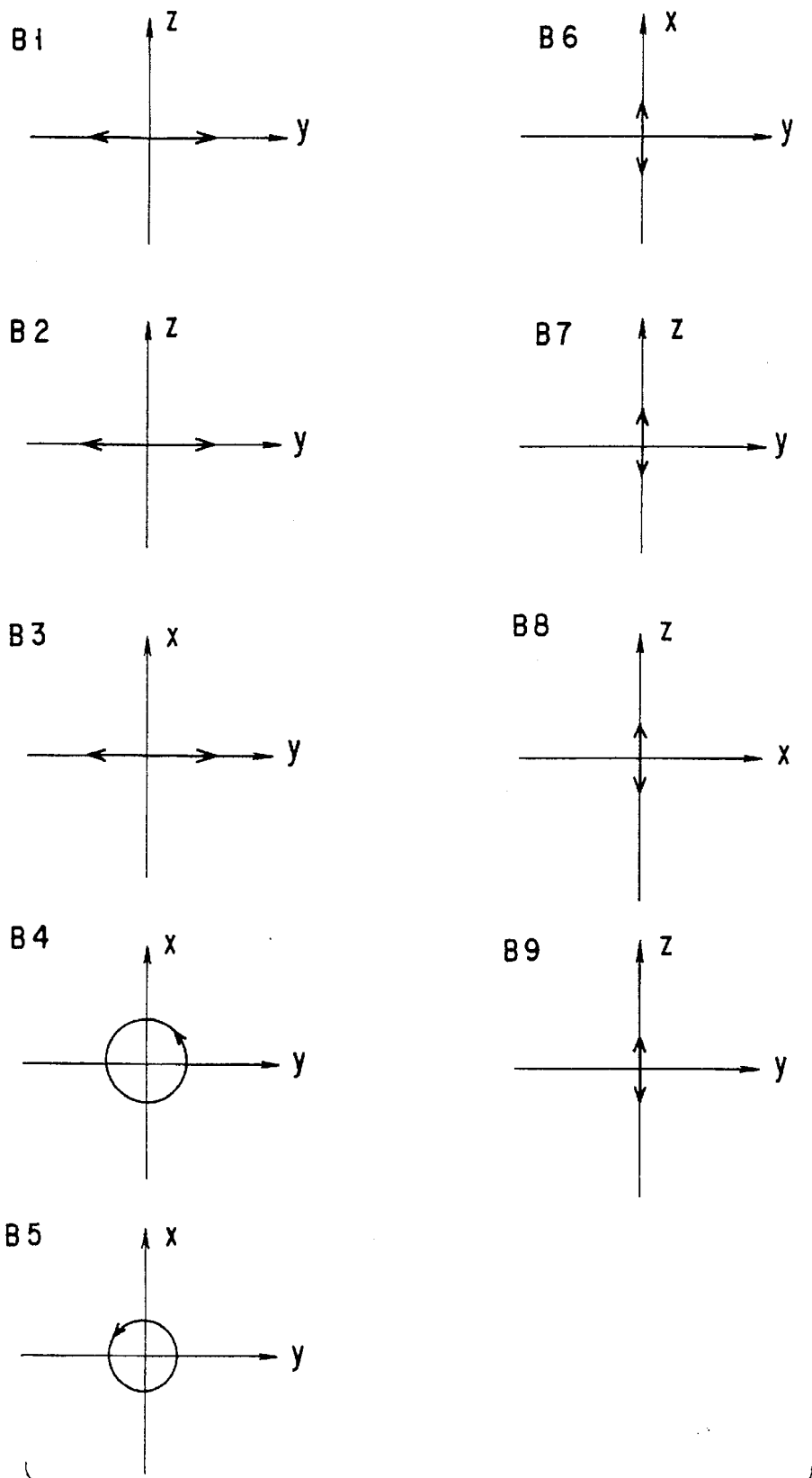
F I G. 42

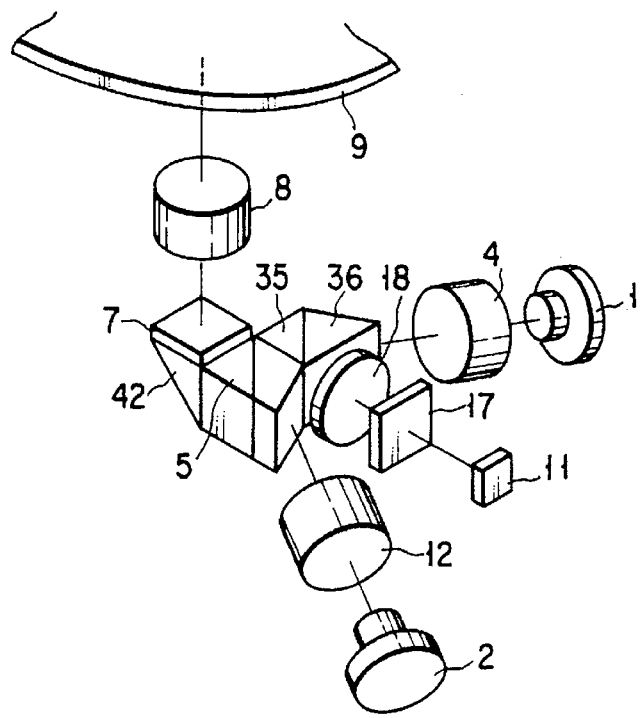
F I G. 46
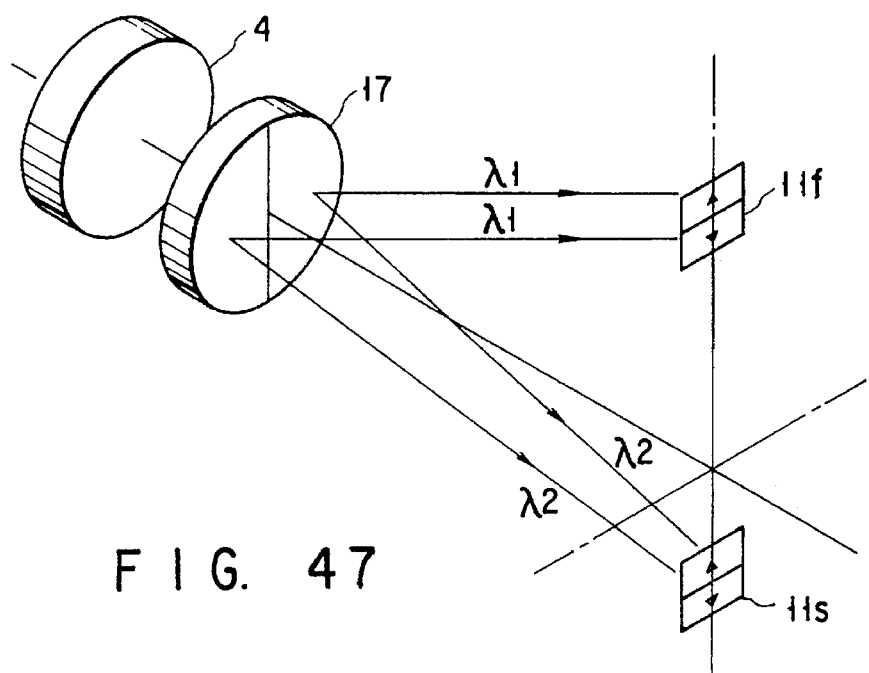
F I G. 47

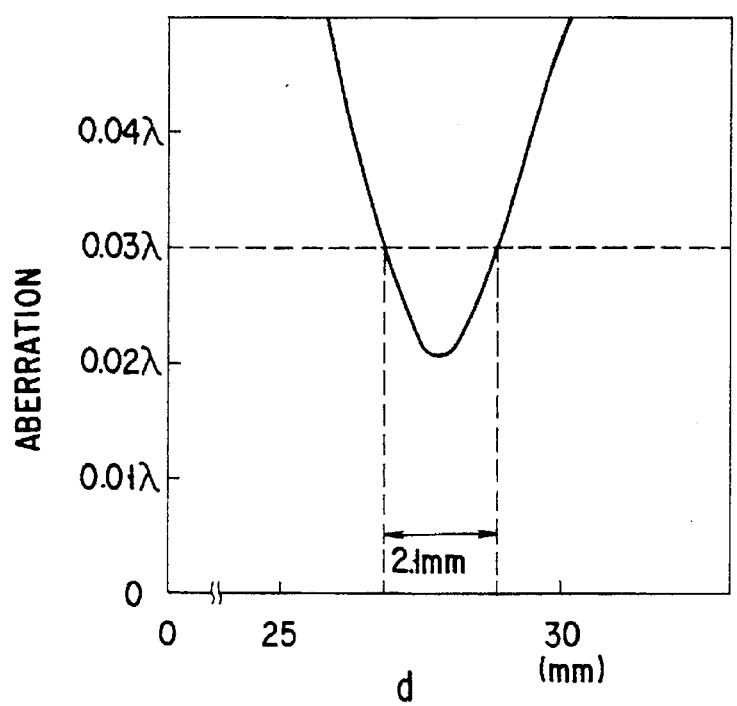
F I G. 54
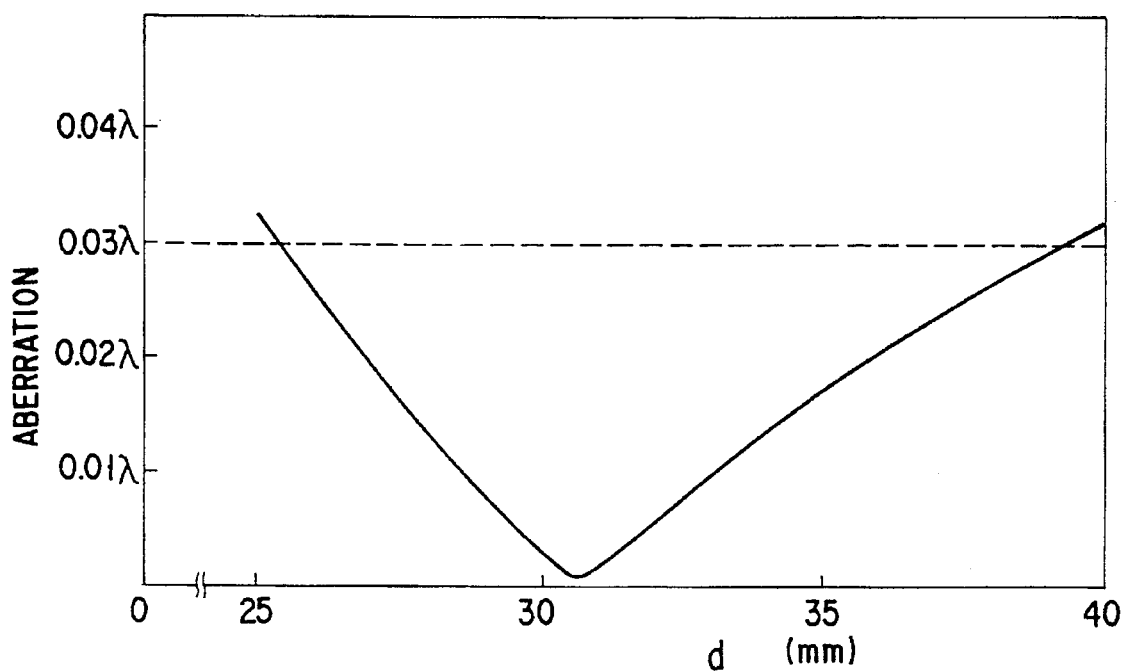
F I G. 55

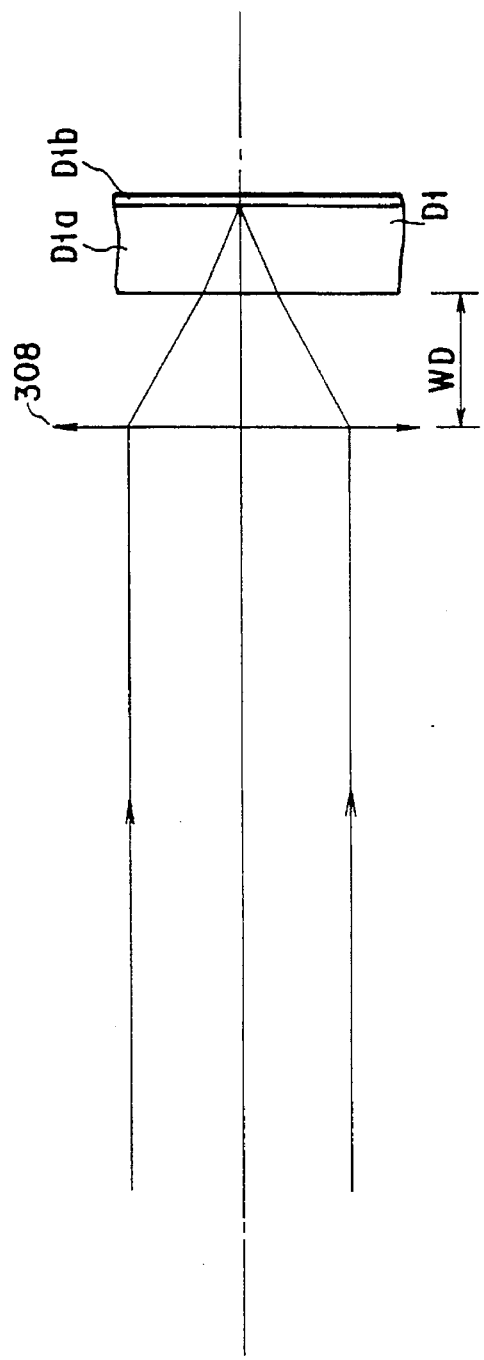
F I G. 58A
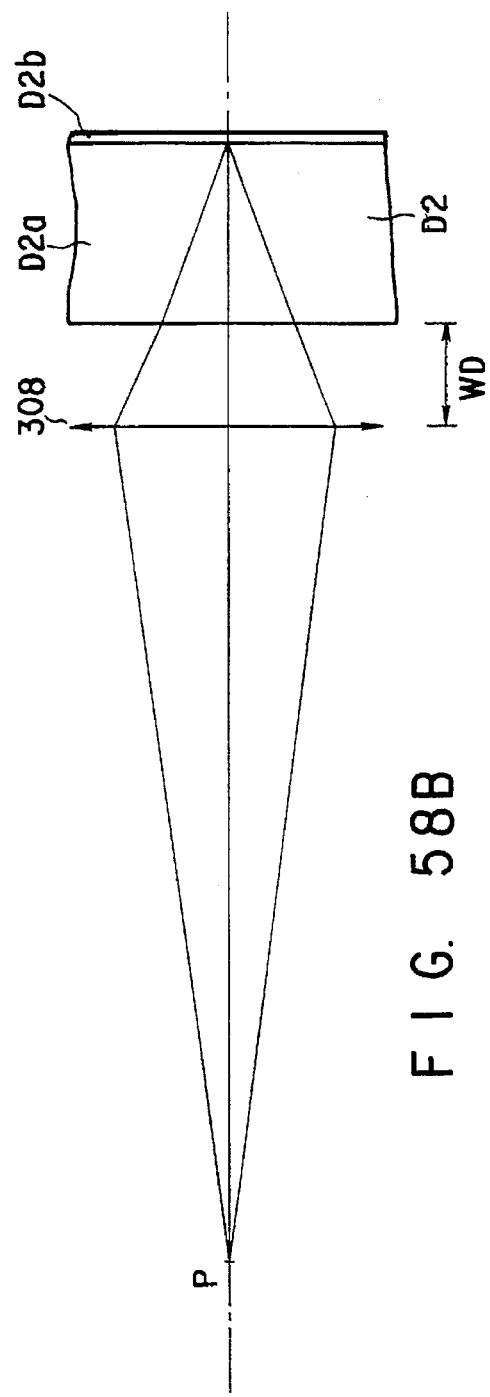
F I G. 58B

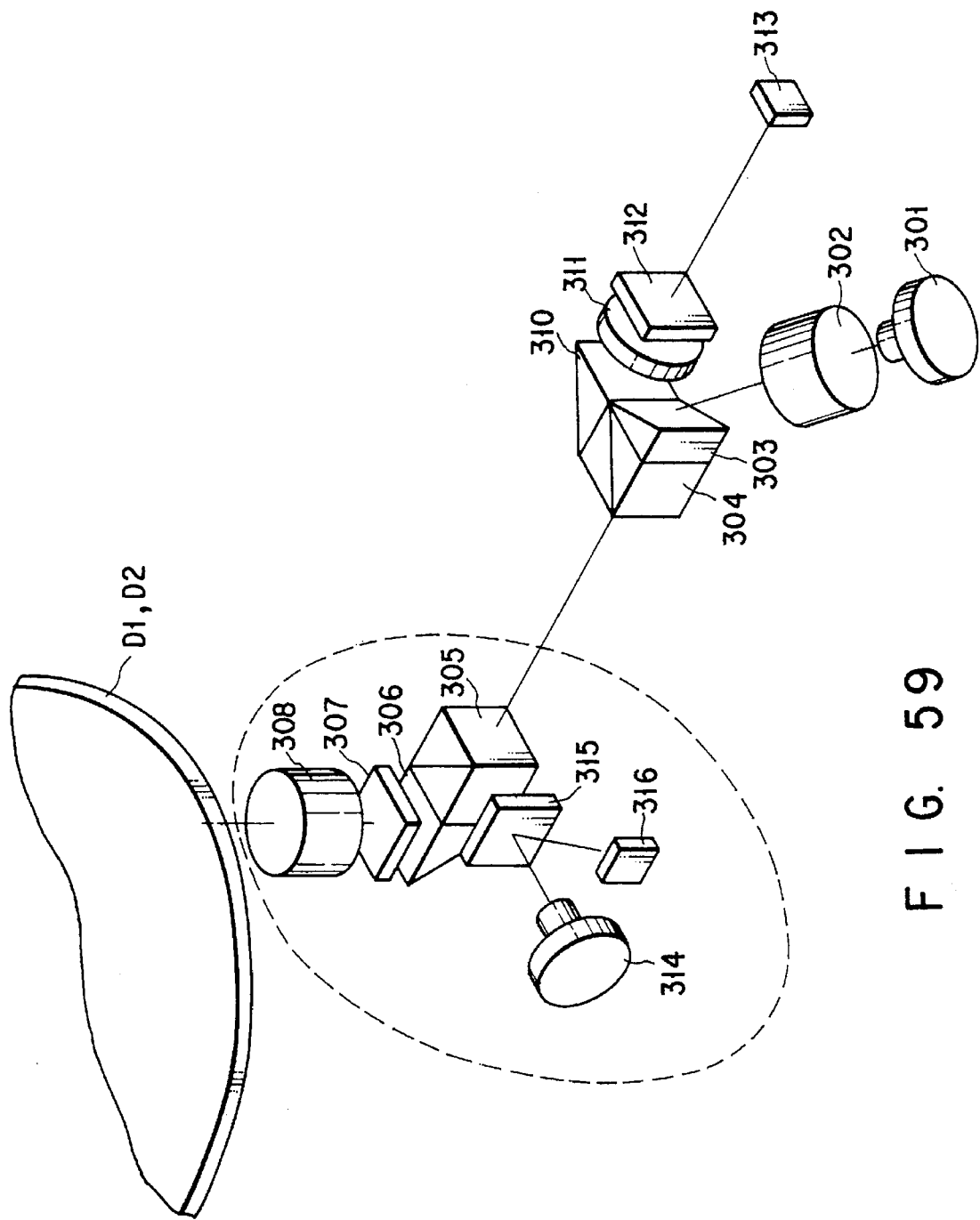
F I G. 59

OPTICAL RECORDING AND REPRODUCING APPARATUS

This is a continuation of application Ser. No. 08/407,034 filed on Mar. 17, 1995, now U.S. Pat. No. 5,513,164, which is a continuation of 08/118,336 filed on Sep. 9, 1993.

BACKGROUND OF THE INVENTION

1. Field of the Invention

This invention relates to an optical recording and reproducing apparatus, such as an optical disc apparatus, for effecting high density recording and reproducing and read/write compatible with media of different generations.

2. Description of the Related Art

Since optical discs not only have a high density and a large capacity but also are exchangeable like floppy discs, the optical discs have come to be noticed as storage memories to be used in the future. The exchangeability of the discs provides a merit in order to widen the fields of their uses, on one hand, but brings about a demerit in order to obtain higher density and larger capacity of the disc, on the other hand. Memories on an exchangeable disc always require read/write compatibility between a disc having a high density and a large capacity and a widely used disc. The widely used software system must be transmitted from the past to the future.

On the contrary, density has been made higher and capacity has been made larger rapidly for a fixed magnetic disc apparatus (which is usually a hard disc apparatus) on which no disc exchange is required. Rodime Corporation in England first commercialized 3.5" type hard disc apparatuses ten years ago. This apparatus is provided with two discs each having a capacity of 10 MB. The recent hard disc apparatus having the same size as this old apparatus is provided with 8 discs each having a capacity of 1 GB. The capacity has become as hundred times and the areal density has become as twenty-five times as those of the old apparatus.

The 3.5" floppy disc apparatus among the magnetic disc apparatuses has a problem about the read/write compatibility with different generations as mentioned above, and thus the capacity has been increased at an extremely slow speed. In order to ensure the read/write compatibility, the capacity of main floppy discs has been increased only by enhancing the gap lengths without changing the track widths. Usually, a floppy disc having an unformat capacity of 1 MB has a track density of 135 TPI and a linear density of 8.75 kBPI. The double capacity of 2 MB was obtained by making the linear density 17.5 kBPI and the further double capacity of 4 MB was obtained by making the linear density 35 kBPI. However, the gap length of the magnetic head having a capacity of 4 MB must be ¼ of the gap length of the magnetic head having a capacity of 1 MB. Since, therefore, the read/write compatibility has not been able to be obtained with the conventional magnetic head of tunnel erase type, a pre-erasing method has been used.

Since the density has been increased only by enhancing the linear density in the main floppy in this way, the record density of the main floppy disc has not been able to be increased to a value which meets with that of the hard disc. It is absolutely necessary to increase a track density in order to obtain a high recording density. In doing so, a sector servo system as a tracking servo technology has been studied, and floppy disc apparatus having a large capacity using this system has been put into practice. However, these apparatuses have not been commonly used because they cannot take read/write compatibility with the conventional apparatuses. Thereafter, various attempts have been made to give the read/write compatibility to apparatuses having a high track density (each of which has one read/write gap in general). One of the methods of erasing data is such that data recorded on wide tracks at a small gap is erased by turning the floppy disc twice, for example.

It became apparent that a head having a plurality of gaps is required for the floppy discs having different gaps in order to obtain complete read/write compatibility, and floppy discs having a format capacity of the order of 20 MB have been visualized now. The apparatus equipped with these floppy discs has two gaps consisting of a gap equal to the gap of the conventional head and a narrow gap such that this apparatus can take compatibility with the conventional apparatus.

On the other hand, 12"-size additional write type optical discs for optical disc apparatuses were first put into practice for document filing, ten years ago. The recording density and the capacity have become more four times or more larger than those of the first developed optical disc apparatuses. For optical discs having a size less than 12", 5.25" size optical discs using a WO medium or an MO medium (optical magnetic medium) has been standardized as an ISO standard and commercialized. Further, a recommended standard for 3.5" size optical discs using an MO medium, which is smaller than the 5.25" size optical discs, has been proposed and these optical discs have also been commercialized. The 5.25" size optical disc has a capacity of 600 MB on both surfaces, and the 3.5" size optical disc has a capacity of 128 MB on one surface. The optical discs of both sizes have the same track density of 15.9 k TPI (a pitch of 1.6K μm) and the same linear density (beam density) of 16.3 kBPI (a beam length of 1.56 μm).

In order to double the capacity of an optical disc apparatus, light spots must be reduced by using a light source having a short wavelength or by enhancing the NA of an objective lens. When the size of the light beams is reduced, not only the linear density but also the track density become higher. As understood from the structure of floppy discs, if the track density becomes higher, unerased portions are likely to appear on a low density disc. Thus, it becomes more difficult, in general, to take read/write compatibility, as the track density becomes higher.

For attaining compatibility on an optical disc apparatus, a method is considered for reducing the diameter of light beams emitted on the objective lens for the lower level disc so as to increase an effective λ/NA. In order to reduce the diameter of the light beams incident on the objective lens, it is considered that two kinds of apertures are disposed in the optical paths so as to be used alternately, or a liquid crystal aperture is placed in the related optical path. However, these methods lower the using efficiency of light. These methods, therefore, cannot be realized, now that the power of a high density light source is insufficient, and apparatuses using these methods have not yet been put into practice. There is another method using two independent heads, one being for a low density and the other one for a high density. Although the last method is the most reliable, it needs two heads (including actuators), leading to a high cost and requiring a large floor space. Further, this method has a problem that the servo system occupies a double space.

Semiconductor lasers having wavelengths of the order of 830 nm and 780 nm, respectively, and providing a power of 50 mW as recording light sources are actually used. Further, red lasers of 690 nm providing about 30 mW were started to be sold as samples. However, green and blue lasers having further shorter wavelengths have just recently been oscillated at the liquid nitrogen temperature, an thus cannot be used practically now. Since the light source used for recording requires power of about ten times more than the light used for the reading-only light source, their actual application will be delayed much later.

Attention is paid now to green-blue light sources of SHG as light sources of other short wavelengths. A semiconductor laser is oscillated as YAG or YVO at an exciting light source. Then, the wavelength of the near-infrared rays (1.06 µm) is doubled by an SHG element such as KTG provided in a resonator to form a 530 nm green light source, or the wavelength of the semiconductor lasers is directly doubled to form a blue light source. The former process provides a high exchange efficiency but cannot modify the doubled wavelength. On the other hand, the latter process has a defect that the exchange efficiency is low. Therefore, it is thought that it is more and more difficult to obtain powers of he light sources usable for recording in the order of green, blue and a near-ultraviolet rays having shorter wavelengths than them.

The diameter of the beam spots can also be reduced by increasing the NA of the objective lens. The recommended value of the NA for CD is 0.45, but the present NA provided by an apparatus using an optical magnetic medium (MO medium) which can perform recording and reproduction is 0.55 which is larger than the value given by the recommended value. The larger the NA, the smaller can be made the spots in reverse proportion with the NA. When the NA is made large, it becomes difficult to manufacture objective lenses at a low cost because of he difference of lens loads. Further, the value of NA is limited by a coma due to the tilt of the disc substrate. The NA is limited to around 0.55 for a conventional plastic substrate having a thickness of 1.2 mm. The NA can be made larger than 0.55 by providing a tilt compensation mechanism or by making the substrate thin. If the thickness of the substrate is reduced from 1.2 mm to 0.6 mm, a large allowance for the tilt is permitted such that NA can be made large to about 0.65. As the substrate is made thinner further, the allowance for the tilt is made larger. However, adverse effects caused by dusts attached to and flaws formed on the substrate increase and thus the thickness of the the substrate is limited. Further, the NA cannot be made so small because the objective lens must be manufactured at a low cost. As the wavelength is made shorter and shorter, working accuracy must be made higher and higher. Therefore, the thickness of the substrate and the size of the NA are limited to substantially 0.6 mm and substantially 0.65, respectively now and in the future.

An MO medium and a phase changing recording medium (PC medium) are visualized as a rewritable recording media. A TbFeCo is chiefly used as the former media and an optical disc using this medium is standardized as an ISO Standard. However, this has problems that it cannot effect overwriting and its reproduction C/N cannot be made high because noises are chiefly shot noises of the optical detector, preamplifier noises and thermal noises due to a low reproduction signal. If green or blue light of a low wavelength were used to make the density high, the C/N of the reproduction signals would be greatly lowered and the signals could not be accurately reproduced due to the reduction of the Kerr rotational angle of the medium and the detecting sensitivity of the optical detector. In consequence, ptCo using superlattice multiplying method by which the Kerr rotational angle can be increased at a short wavelength has recently been developed.

The PC medium has been recently noted because it can perform recording and erasing between crystal and amorphous phases so as to perform overwriting. There are two kinds of the PC media, one being a GeSbTe medium for proving a reproduction signal as a negative polar signal and the other being an InSbTe medium providing a reproduction signal as a positive polar signal. The former medium effects erasing in a solid phase and the latter effects erasing in a melting phase. The erasing ratio of the latter medium is higher than the former medium because the latter medium effects erasing in a melting phaser although the former medium is better than the latter medium as long as the number of rewriting is concerned because the latter medium is exerted with a higher thermal stress than the former medium is this respect, the realization of the latter medium has started before that of the former medium.

The normal disc made of a PC medium comprises a substrate, a lower protecting layer, a recording layer, an upper protecting layer and a light reflection layer (heat absorbing layer) spattered on the substrate, and a UV hardened layer as another protecting layer fixed to them. Since the heat conductivity of the recording layer is low, heat generated during the recording does not spread in the recording layer but is dispersed at the light reflecting layer through the upper protecting layer disposed on the recording layer for cooling. An amorphous state in which the signals are recorded on the disc is produced in the molten portion of the recording layer, and the solid erasing (crystal erasing) takes place in the portions whose temperature is lower than that of the portion in the amorphous state. The size of the recorded mark is smaller than the light beam spot, and this effect is called a self-sharpening effect.

An optical head which has two optical sources providing light beams having different wavelengths has been developed in order to function in multiple ways. Normally, laser beam sources are used as light sources. In this optical head, one of the light sources is used for reproduction and the other light source is employed for recording and erasing. In this case, light beams having a large power is used particularly for recording and erasing. Thus, it is important that the reflected light does not return to the light sources to be incident on it as light in order that the light sources operate stably.

An example of the head provided with two light sources emitting light beams having different wavelengths is disclosed in Published Unexamined Japanese Patent Application No. 61-214146. The head has a light source for recording and reproduction and a light source for erasing, in which two polarization beam splitters compound two kinds of light beams having different wavelengths and separate the compounded light beams, such hat the light beams from the optical disc travel toward the light source for recording and reproduction after their reflection. The position of the light source for erasing at which light beams are emitted is displaced horizontally from the position of the light source for recording and reproduction at which the other light beams are emitted such that the reflected light beams for erasing is prevented from returning to the light source for recording and reproduction in order to avoid adverse effects from the reflected light beams.

However, the erasing light beams pass a position out of the center of the lens system comprising an objective lens, a collimator lens and the like, and it is necessary to adjust displacement of the light emitting position.

The optical disc similar to other disc exchanging type storage memories requires a high density, a larger capacity and read/write compatibility with different generations. Since read/write is performed by circular beam spots with the optical disc, the density and the capacity cannot be enhanced by narrowing the gap along the line recording direction without changing the track width like the conventional floppy disc. With the optical disc, the density can, indeed, be made high by reducing the size of the beam spots but cannot be made low, whereby high density and large capacity cannot coexist with read/write compatibility.

A high density optical head requires recording light sources having such a high power as is required for recording. However, it is difficult to obtain inexpensive green or blue light sources now. Although two independent heads providing two different light beams spots may be considered, there may be brought about the problems on the increase of the cost and space.

With the optical disc apparatus having an optical head using two light sources of the conventional different wavelengths, light beams reflected from the optical disc does not bring about any adverse effect as returned light by displacing the light emitting position of one of the light sources from the light emitting position of the other light source, there occur the problems that the shape of the beam spots on the optical disc is deteriorated and the adjustment is cumbersome.

SUMMARY OF THE INVENTION

An object of this invention is to provide an optical recording and reproducing apparatus which can take read/write compatibility with conventional media by means of a single optical head and can effect recording and reproduction on an optical recording medium of a high density, without accompanying the conventional problems as mentioned above.

Another object of this invention is to provide an optical recording and reproducing apparatus which can effect stable recording, reproduction and erasing without loosing the shape of optical spots on an optical recording medium, without requiring complicated adjustment and without returning of reflected light beams emitted from two light sources having a large power to the light sources like the case where two light sources emitting light beams having different wavelengths are used.

According to a first aspect of the invention there is provided an apparatus for optically recording and reproducing information on and from first and second media having first and second areal densities, respectively, the first density being higher than the second density, comprising: a first light source for emitting a first light beam having a first wavelength; a second light source for emitting a second light beam having a second wavelength; and an optical system for guiding the first and second light beams from the first and second light sources to an optical recording medium and guiding the first and second light beams reflected by the optical recording medium to optical detecting means, the optical system including an objective lens for converging the first and second light beams on the optical recording medium as a first light spot and a second light spot, respectively; wherein information is recorded by the second light beam and reproduced by the first light beam when the optical recording medium is the first medium, and information is recorded and reproduced by the second light beam when the optical recording medium is the second medium.

According to a second aspect of the invention there is provided an apparatus for optically recording and reproducing information on and from first and second medial having first and second areal densities, respectively, the first density being higher than the second density, comprising: a first light source for emitting a first light beam having a first wavelength; a second light source for emitting second a light beam having a second wavelength larger than the first wavelength; an optical system for guiding the first and second light beams from the first and second light sources to an optical recording medium, separating the first and second light beams reflected from the optical recording medium and guiding the same to first and second optical detecting means, respectively; wherein the optical system including an objective lens for converging the first and second light beams as a first light spot and a second light spot on the optical recording medium, the optical system further including at least one beam splitter disposed between the first and second light sources and the objective lens, for reflecting all the first light beam, transmitting at least part of a P-polarized component of the second light beam, and reflecting all an S-polarized component of the second light beam, and a quarter wavelength plate disposed in an optical path between the beam splitter and the objective lens, and the optical system further including a diffracting element for diffracting the first and second light beams to allow the same to be incident on the first and second optical detecting means, respectively.

According to a third aspect of the invention there is provided an apparatus for optically recording and reproducing information on and from first and second media having first and second areal densities, respectively, the first density being higher than the second density, comprising: a first light source for emitting a first light beam having a first wavelength; a second light source for emitting a second light beam having a second wavelength larger than the first wavelength; an optical system for guiding the first and second light beams from the first and second light sources to an optical recording medium, separating the first and second light beams reflected from the optical recording medium and guiding the same to first and second optical detecting means, respectively; wherein the optical system including an objective lens for converging the first and second light beams as a first light spot and a second light spot on the optical recording medium, and the optical system further including a first beam splitter disposed between the first and second light sources and the objective lens, for reflecting all the first light beam, transmitting at least part of a P-polarized component of the second light beam, and reflecting all an S-polarized component of the second light beam, a second beam splitter disposed between the first and second light sources and the objective lens, for reflecting all the first light beam, transmitting all a P-polarized component of the second light beam, and reflecting all an S-polarized component of the second light beam, and a quarter wavelength plate disposed in an optical path between the beam splitter and the objective lens.

According to a fourth aspect of the invention there is provided an apparatus for optically recording and reproducing information on and from first and second media having different thicknesses and having first and second areal densities, respectively, the first density being higher than the second density, comprising: a first light source for emitting a first light beam having a first wavelength; a second light source for emitting a second light beam having a second wavelength longer than the first wavelength; and an optical system for guiding the first and second light beams to an optical recording medium and guiding the first and second light beams reflected by the optical recording medium to a first optical detector and a second optical detector, the optical system including an objective lens for converging the first and second light beams as a first light spot and a second light spot on the optical recording medium; wherein information is recorded and reproduced by the first light beam when the optical recording medium is the first medium and information is reproduced by the second light beam when the optical recording medium is the second medium.

Recording and reproduction are performed by using light beams having a second wavelength for a low density, when an optical recording medium for a low density is set on the apparatus, so that full read/write compatibility of data is attained for a low density optical recording medium. When, on the other hand, a high density optical medium is set on the apparatus, a light spot formed by light beams having a first wavelength and a light spot formed by the light beams having the second wavelength are aligned in the tracking direction so as to compensate the displacement between the positions of the two light spots. ID information or data, for example, is read out by the light beams having the first wavelength, and, when data recording is required, the data is recorded by the light beams having the second wavelength.

Where a PC layer is used as a recording layer of the optical recording medium, a recording mark of the data on the recording layer is formed smaller than the light spot due to the self sharpening effect. Thus, although the beams having the long second wavelength and providing a large light spot are used, a small recording mark can be formed, with the result that read/write compatibility with a low density recording medium, and high density recording on a high density recording medium and high density reproduction therefrom can be obtained by means of a single optical head.

The provision of a compounding-and-separating optical system for compounding light beams having the first and second wavelengths and guiding to an optical recording medium and for separating the reflected light having the first and second wavelengths facilitates the read/write compatibility, high density recording and high density reproduction without using the above-mentioned position matching means.

After having been reflected by a beam splitter in the compounding and separating optical system according to this invention, light beams having the first wavelength and emitted from the first light source are incident on an optical recording medium through a quarter wave plate by means of an objective lens. The P-polarized light of the light beams having the second wavelength and emitted from the second source passes through the beam splitter and is incident on the optical recording medium through the objective lens after having been converted into circularly polarized light by the quarter wavelength plate. The light beams having the first and second wavelengths are changed into P-polarized light by the quarter wavelength plate. Since, therefore, the reflected light having the second wavelength passes through the beam splitter having such a characteristic for allowing P-polarized light to pass therethrough, the reflected light is not returned to the first and second light sources.

When, therefore, the first light source is used for reproduction and the second light source is used for recording, erasing and reproduction, stable recording, reproduction and erasing can be performed, because the thus reflected second wavelength light beams which are emitted from the second light source having a large power for recording and erasing are not returned. Differently from the conventional art in which the light emitting positions of the two light sources are displaced from each other, the apparatus is not encountered with the problems that the beam shape on the optical recording medium is deteriorated an complicated adjustment is required.

This invention has the features that not only read/write compatibility with a low density optical medium is securely attained by a single optical head but also recording on and reproduction from a high density optical medium so that the apparatus occupies a small space and is manufactured at a low cost. Since the high density light source needs a power only required for reproduction, such a light source as provides a low power, does not require optical modulation and is manufactured at a low cost can be used as the high density light source.

With this invention, the wavelengths of the light beams of light sources can be made shorter and shorter by using red light as the light a first generation, green light as the light of second generation, blue light as the light of the third generation and near ultraviolet as the light of a fourth generation in turn, in order to elevate the recording densities in succession. In doing so, a red light source and a green light source only for reproduction are used in the second generation apparatus, a green light source and a blue light source only for reproduction are used in the third generation apparatus, and so on, whereby the recording density and capacity are increased by keeping compatibility with a low density medium.

With an optical head apparatus using first and second light sources providing light beams having first and second wavelength, respectively, according to this invention, reflected light beam having the second wavelength is not returned to the first and second light source. More specifically, when, for example, the first light source is used for reproduction and the second light source is used for recording and erasing or recording, erasing and reproduction, as will be explained in the description of the preferred embodiments, light beam of the second wavelength emitted from the second light source, requiring a high power for recording and erasing and reflected by an optical recording medium is not returned to the light sources. Thus, recording, reproduction and erasing can be carried out stably. Conventionally, the light emitting portions of two light sources are displaced from each other such that the light beams pass the portions out of the center of the lens system, thereby eliminating the effects from the returning light beams. However, this conventional arrangement deteriorates the shape of light beam spots on the recording medium. With this invention this, deterioration of the beam shape can be avoided and the positional adjustment of the optical system can be done easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view of the optical system of an optical head apparatus according to a first embodiment of this invention;

FIG. 4 is a graph showing transmission characteristics of a beam splitter 5 used in the apparatus shown in FIG. 1;

FIG. 5 is a graph showing transmission characteristics of a beam splitter 6 used in the apparatus shown in FIG. 1;

FIG. 12 is a perspective view of the optical system of an optical head apparatus according to a sixth embodiment of this invention;

FIG. 13 is a perspective view of the optical system of an optical head apparatus according to a seventh embodiment of this invention;

FIG. 14 is a perspective view of the optical system of an optical head apparatus according to an eighth embodiment of this invention;

FIG. 21 is a perspective view of the optical system of an optical head apparatus according to a fifteenth embodiment of this invention;

FIG. 22 is a perspective view of the optical system of an optical head apparatus according to a sixteenth embodiment of this invention;

FIG. 23 is a perspective view of the optical system of an optical head apparatus according to a seventeenth embodiment of this invention;

FIG. 25 shows how light beams from a high density light source and a low density light source form light spots on an optical disc, respectively;

FIG. 26 shows a state in which the light spot of the low density light beams is displaced from the light spot of the high density light beams on the optical disc;

FIGS. 27A and 27B show how high density and low density light beams are displaced from center lines in an optical detector;

FIG. 28 shows a concrete example of the relative positional displacement detecting circuit;

FIG. 35 is a perspective view of a light source used in the twentieth embodiment;

FIG. 40 shows an optical head apparatus according to a twenty-fourth embodiment of this invention;

FIG. 41 shows an optical system of an optical head apparatus according to a twenty-fifth embodiment of this invention;

FIG. 42 shows how a light beam of a second wavelength λ2 is polarized in each stage;

FIG. 46 is a perspective view of an optical head apparatus according to a twenty-seventh embodiment of this invention;

FIG. 47 is a perspective view of an optical head apparatus according to a twenty-eighth embodiment of this invention;

FIGS. 54 and 55 are graphs showing aberration characteristics;

FIGS. 58A and 58B show how parallel light beams and light beams from a point light source travel, respectively;

FIG. 59 is a perspective view of an optical head apparatus according to a thirty-second embodiment of this invention.

DETAILED DESCRIPTION OF THE PREFERRED EMBODIMENTS

The preferred embodiments of this invention will be described with reference to the accompanying drawings. The terms "high density" and "low density" used hereinafter for an optical disc as a medium relatively indicate degrees of areal density defined by track density (TPI) and linear density (BPI). In other words, a high density optical disc has an areal density higher than that of a low density optical disc.
(First Embodiment)

Figure 2:
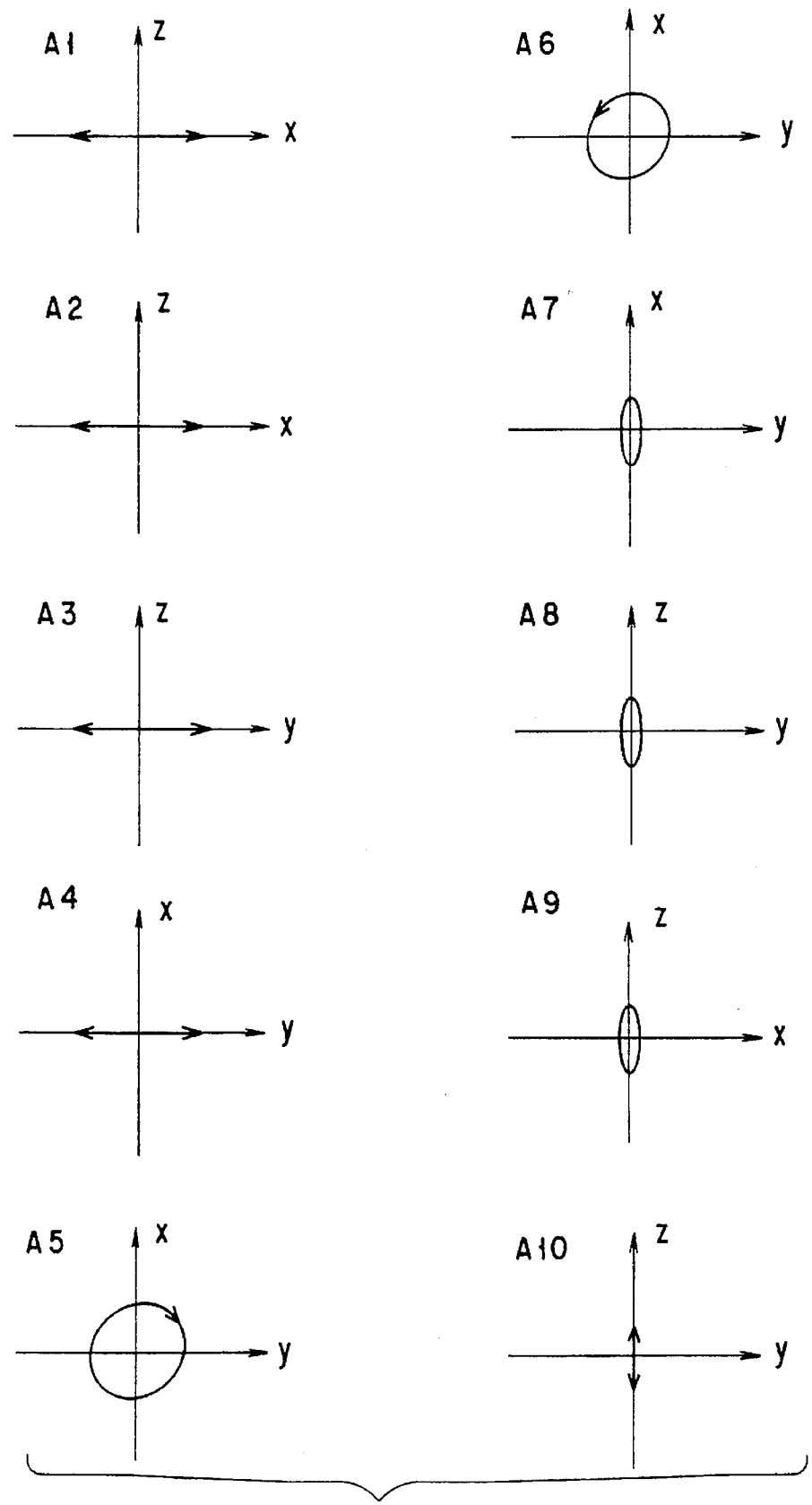
FIG. 2 shows how a light beam of a first wavelength $\lambda 1$ is polarized in each stage.
Figure 3:
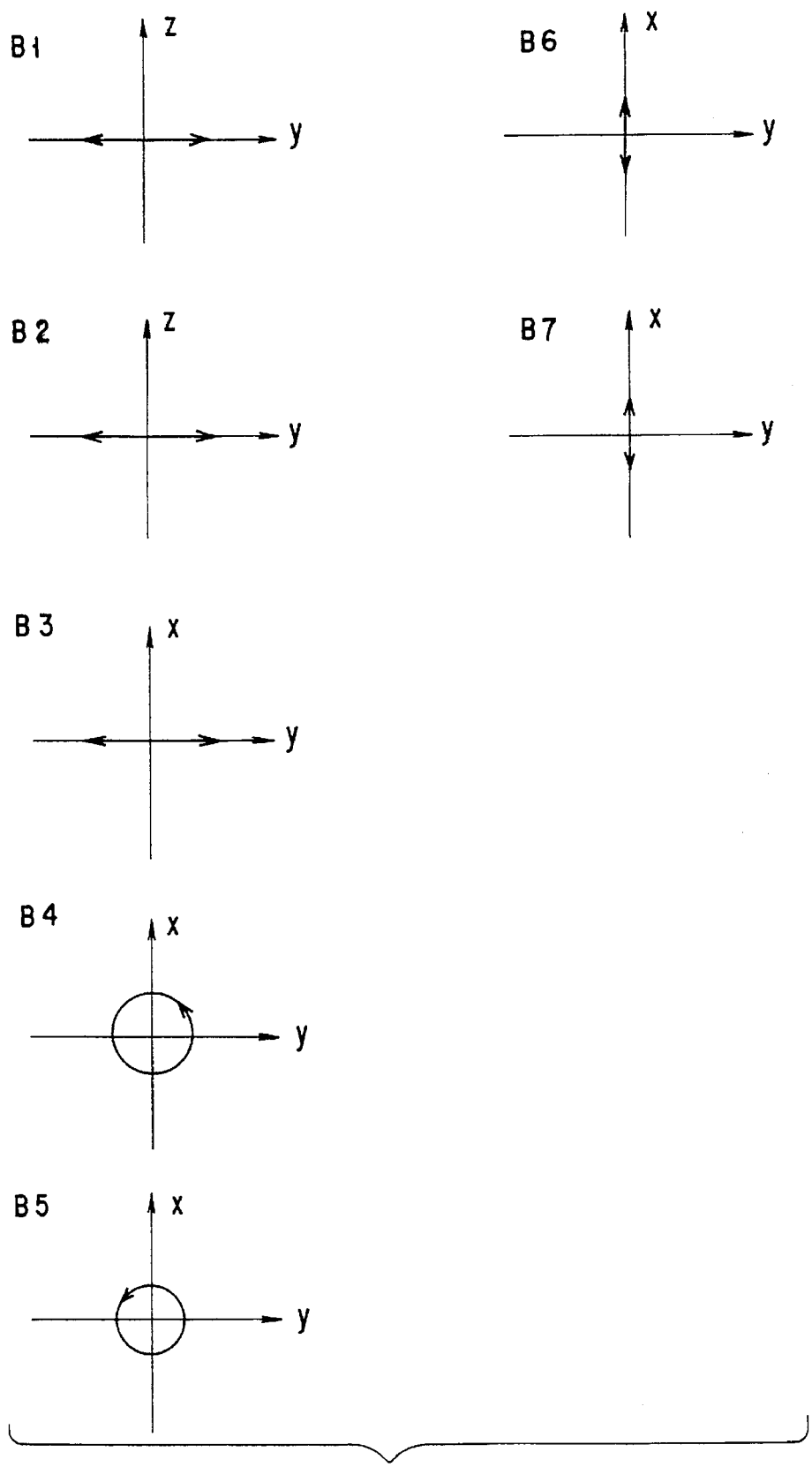
FIG. 3 shows how a light beam of a second wavelength λ2 is polarized in each stage.

FIG. 1 shows the optical system of an optical head apparatus according to a first embodiment of this invention, and FIGS. 2 and 3 show the polarized states of light beams having first and second wavelengths, respectively, in the corresponding stages.

The optical head apparatus shown in FIG. 1 comprises a first light source 1, a second light source 2, a beam splitter 3, a collimator 4, beam splitters 5 and 6, a quarter wavelength plate 7, an objective lens 8 disposed opposed to an optical disc 9, a detecting lens 10, an optical detector 11, a collimator lens 12 and a beam shaping prism 13.

The light sources 1 and 2 are, for example, of semiconductor lasers oscillated at wavelengths $\lambda 1$ and $\lambda 2$. The light source 1 emits P-polarized light whose polarization direction is along the x axis and is used to reproduce information recorded on the optical disc 9. The light source 2 emits P-polarized light whose polarization direction is along the y axis and is used to record information on the optical disc 9 and erase the recorded information therefrom. Thus, the power of the light beams emitted from the light source 2 is sufficiently higher than that of the light beams emitted from the light source 1.

The beam splitters 5 and 6 and the quarter wavelength plate 7 constitute a compounding-and-separating optical system for compounding light beams emitted from the light sources 1 and 2, guiding the composed light to the optical disc 9 and separating the light reflected from the optical disc 9 into the reflected light beams having wavelengths of $\lambda 1$ and $\lambda 2$. As seen from FIGS. 4 and 5 illustrating the relations of the P-polarized and S-polarized light and the transmission coefficients, the beam splitters 5 and 6 are so constructed as to have such characteristics that the transmission coefficients of the P-polarized and S-polarized components are 0 (zero) for the wavelength of $\lambda 1$, (this exhibiting a mirror characteristic), and the P-polarized component passes through the beam splitters 5 and 6 and the S-polarized component of the wavelength of $\lambda 2$ is reflected by the beam splitters 5 and 6.

The operation of the optical head apparatus will be described with reference to FIGS. 1 and 3.

First, it will be explained how the optical system operates when information on a high density optical disc, for example, is reproduced by using the light source 1 emitting a light beam having a wavelength of $\lambda 1$. After having passed through the beam splitter 3, the $\lambda 1$ wavelength light beam emitted from the light source 1 is made parallel by means of the collimator lens 4 so as to form a parallel light beam. The beam splitter 3 is designed to divide light into P-polarized light and S-polarized components.

The light beam having the wavelength of $\lambda 1$ collimated by the collimator lens 4 enters the beam splitter 5 which is designed such that, as shown in FIG. 4, P-polarized and S-polarized components are reflected for the wavelength of $\lambda 1$, and the P-polarized component passes through the beam splitter 5 and the S-polarized component is reflected thereby for the wavelength of $\lambda 2$. In this regard, the light beam emitted from the light source 1 is reflected by the beam splitter 5 at the wavelength of $\lambda 1$, and is guided to the beam splitter 6. The beam splitter 5 may be designed such that part of the P-polarized component passes therethrough at the wavelength of $\lambda 2$.

The beam splitter 6 is constructed such that the P-polarized component and S-polarized component are reflected for the wavelength of $\lambda 1$, and the P-polarized light passes through the beam splitter 6 and the S-polarized component is reflected for the wavelength of $\lambda 2$. Thus, the light beam reflected by the beam splitter 5 and passing through the beam splitter 6 is reflected again and guided to the quarter wavelength plate 7. The characteristics of the beam splitters 5 and 6 are the same as in FIGS. 4 and 5, but they may be different from each other as long as the characteristics satisfy the above conditions.

The quarter wavelength plate 7 is optimized at the wavelength of $\lambda 2$. When, therefore, the difference between $\lambda 1$ and $\lambda 2$ is small, the $\lambda 1$ light beam which has passed through the quarter wavelength plate 7 forms elliptically polarized light whose shape is close to a circle. The $\lambda 1$ light beam which has passed the quarter wavelength plate 7 is converged by the objective lens 8 and is incident on the optical disc 9.

The light beam having the wavelength of $\lambda 1$ reflected by the optical disc 9 passes through the object lens 8 in the reverse direction to the incident light beam and is changed into elliptically polarized light beam with a long axis extending along the x axis. The reflected light beam which has passed the quarter wavelength plate 7 is reflected again by the beam splitter 6 and further reflected by the beam splitter 5. The elliptically polarized light beam from the reflected light beam coming out of the beam splitter 6 has a long axis extending along the z axis and enter the beam splitter 3 after having passed the collimator lens 4. Since the beam splitter 3 reflects only S-polarized component, part of the reflected $\lambda 1$ light beam is reflected again by the beam splitter 3. The light beam reflected by the beam splitter 3 enter the optical detector 11 through the detecting lens 10.

The optical detector 11 reproduces information signals recorded on the optical disc 9, and detects focus errors and tracking errors. The optical detector 11, for example, comprises divided optical detector elements having divided receiving faces. After current-voltage conversion and amplification by means of an amplifier (not shown), output signals on the receiving faces are inputted to an operation circuit such that reproduced information signals, focus error signals and tracking error signals are produced. The detecting lens 10 is used to detect focus errors. In this case, a cylindrical lens is used as the detecting lens 10 when the focus errors are detected by means of the astigmatism method.

It will now be described how the optical system functions to record information on a low density optical disc and a high density optical disc and to erase the information by using the light source 2 for emitting light beam having the wavelength of $\lambda 2$. The $\lambda 2$ wavelength light beam emitted from the light source 2 is collimated by the collimator lens 13 and is formed into a parallel light beam, and then shaped into light beam having a circular cross section. The light beam shaped by the beam shaping prism 13 enters as P-polarized beam having the polarization direction along the y axis and pass through the beam splitter 5 at the transmission coefficient Tp for the P-polarized light as shown in FIG. 4. In an example shown in FIG. 4, the transmission coefficient Tp for the wavelength λ2 is approximately 100%. Almost all the λ2 light beam passes through the beam splitter 5.

The λ2 light beam which has passed the beam splitter 5 enter the beam splitter 6. The beam splitter 6 has such a characteristic, as shown in FIG. 5, that the P-polarized light beam whose polarization axis extends along the y axis and coming from the beam splitter 5 is reflected by the beam splitter 6. The λ2 light beam reflected by the beam splitter 6 is changed into circularly polarized light beam by the quarter wavelength plate 7 optimized at the wavelength λ2, and then converged by the objective lens 8 to be incident on the optical disc 9 to perform recording and erasing.

The λ2 light beam reflected by the optical disc 9 passes through the objective lens 8 in the reverse direction to the direction of the incident light beam is changed into a linearly polarized light beams and passes through the beam splitter 6. Thus, the reflected λ2 light beam from the optical disc 9 does not return to the optical sources 1 and 2.

Since the λ2 light beam having a large power, emitted from the light source 2 and reflected by the optical disc 9 does not return to the light sources 1 and 2, thereby does not make the light sources 1 and 2 unstable and ensure stable recording, reproduction and erasing.

Another embodiment of this invention will be described. The same parts of this embodiment as those shown in FIG. 1 are depicted by the same referential numerals and only the differences of this embodiment from the embodiment shown in FIG. 1 will be described.

(Second Embodiment)

Figure 6:
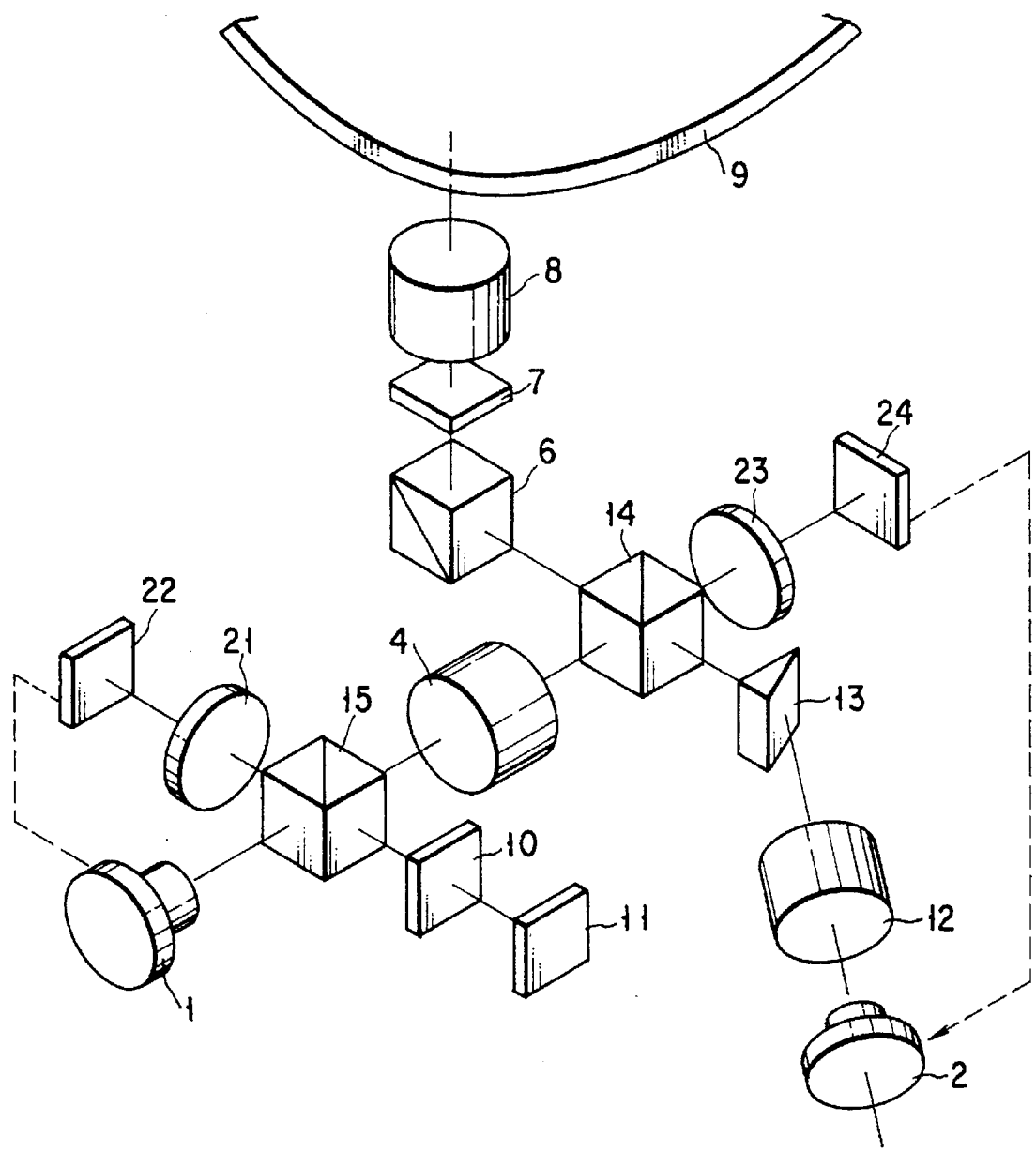
FIG. 6 is a perspective view of the optical system of an optical head apparatus according to a second embodiment of this invention.

FIG. 6 shows an optical head apparatus according to a second embodiment, to which are added convex lenses 21 and 23 and optical detectors 22 and 24 so as to make the outputs from optical sources 1 and 2 stable. The outputs from the sources 1 and 2 are controlled according to the outputs from the optical detectors 22 and 24 by means of a light output control circuit (not shown).

Figure 7:
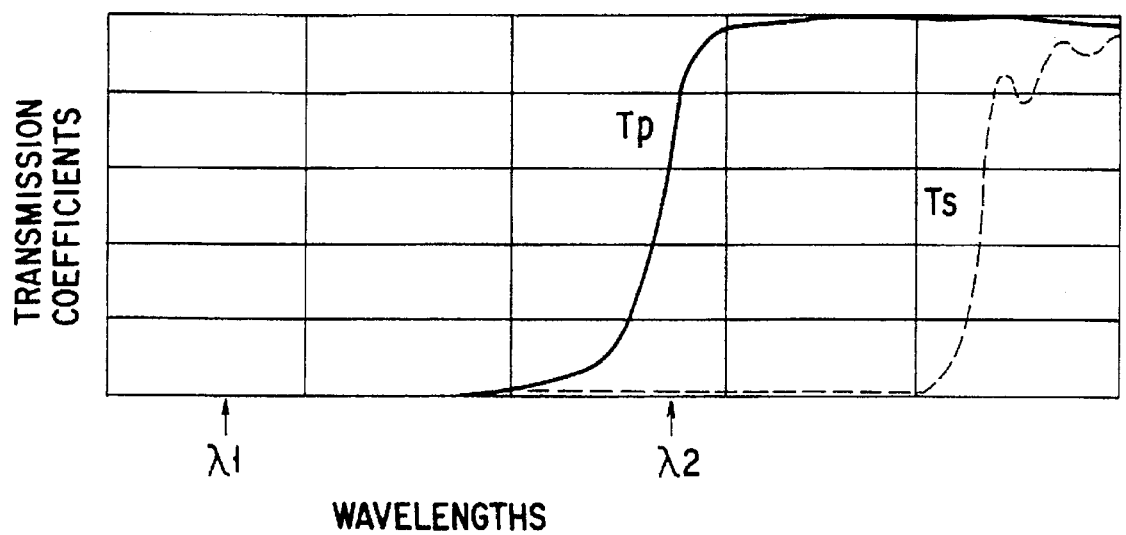
FIG. 7 is a graph showing transmission characteristics of a beam splitter 14 used in the apparatus shown in FIG. 6.

In order to always detect part of the λ2 wavelength light beam, a beam splitter 14 for allowing part of the P-polarized light to pass therethrough is used in place of the beam splitter 5 as shown in FIG. 1. The wavelength characteristic of the beam splitter 14 is shown in FIG. 7.

Figure 8:
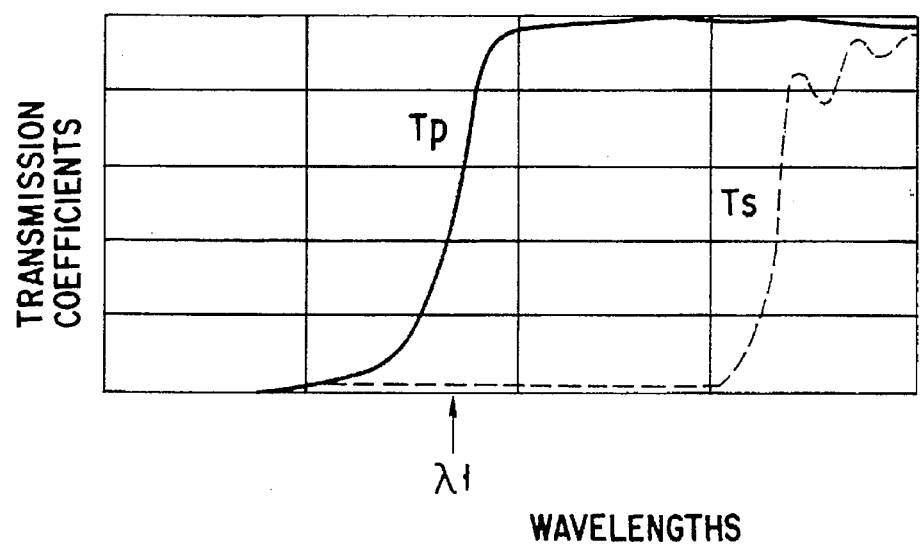
FIG. 8 is a graph showing the transmission characteristics of a beam splitter 15 used in the apparatus shown in FIG. 6.

As shown in FIG. 6, the second embodiment employs another beam splitter 15 in place of the beam splitter 3 shown in FIG. 1 so as to separate the P-polarized light at a predetermined intensity ratio and reflect all S-polarized light. The transmission characteristics are shown in FIG. 8.

(Third Embodiment)

Figure 9:
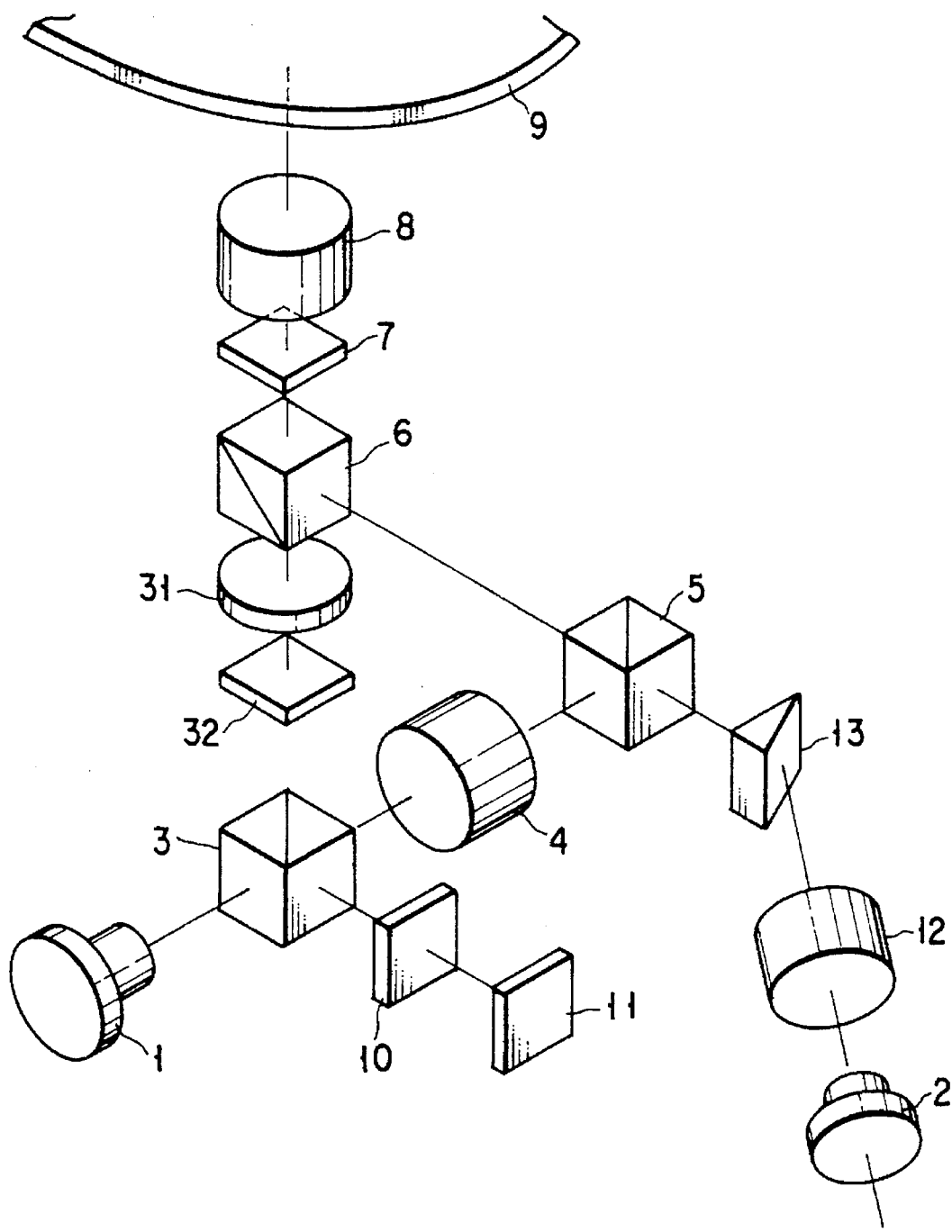
FIG. 9 is a perspective view of the optical system of an optical head apparatus according to a third embodiment of this invention.

FIG. 9 shows an optical head apparatus according to a third embodiment which is provided with a detecting lens 31 and an optical detector 32 in addition to the apparatus shown in FIG. 1 in order to reproduce information recorded on the optical disc 9 and detect servo error signals even by the λ2 light beam from the light source. Since only the λ2 light beam pass through he beam splitter 6 like in the first embodiment, the reproduced information signals, focus error signals and tracking error signals are detected by guiding to the optical detector 32 through the detecting lens 31 the λ2 wavelength reflected light which has come from the optical disc 9 and passed through the beam splitter 6.

The apparatus according to the third embodiment can reproduce information and detects focus errors and tracking errors independently by means of the λ1 light beam and the λ2 light beam.

(Fourth Embodiment)

Figure 10:
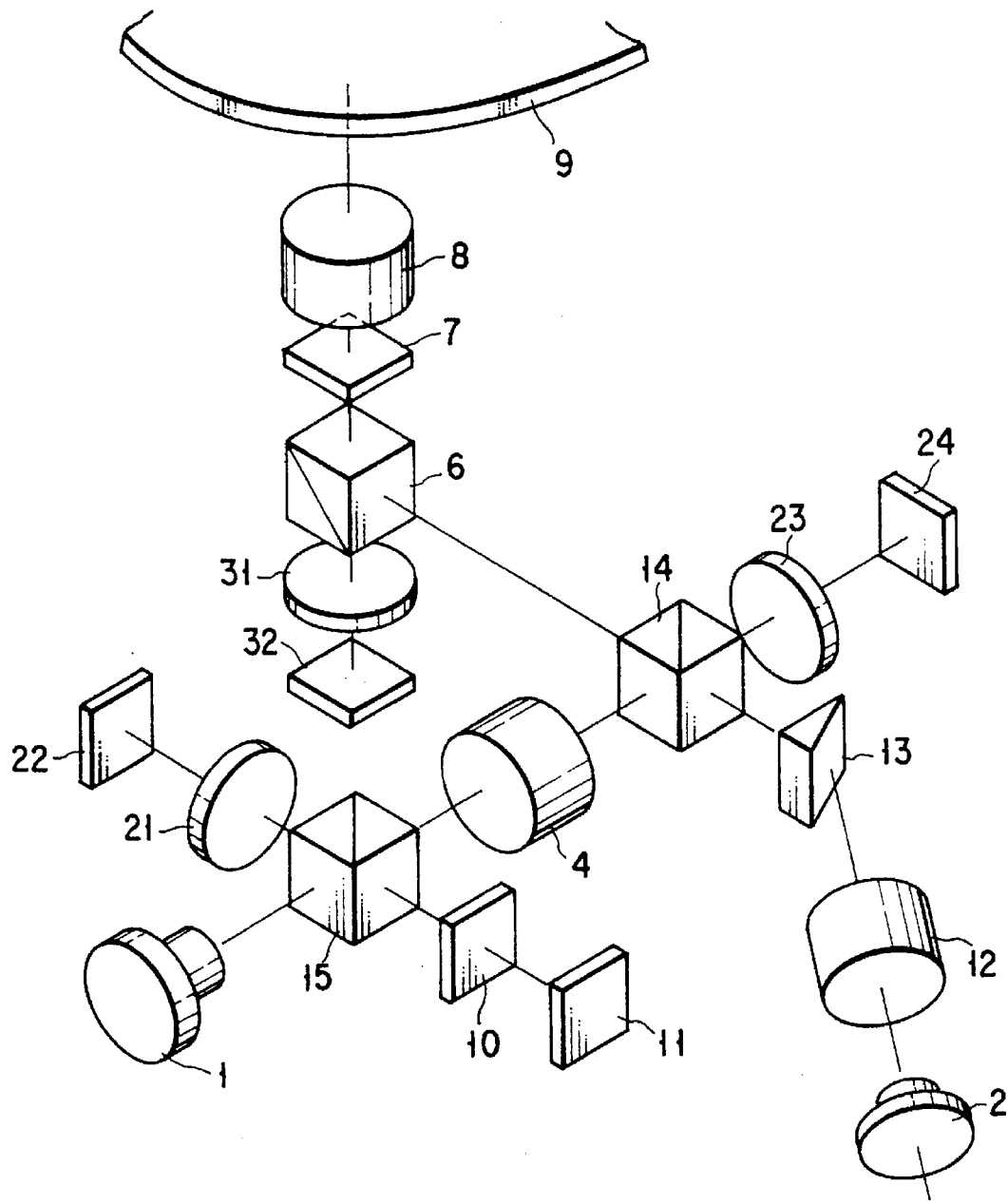
FIG. 10 is a perspective view of the optical system of an optical head apparatus according to a fourth embodiment of this invention.

FIG. 10 shows an optical head apparatus according to a fourth embodiment of this invention which is a combination of the apparatuses of the first and second embodiments.

(Fifth Embodiment)

Figure 11:
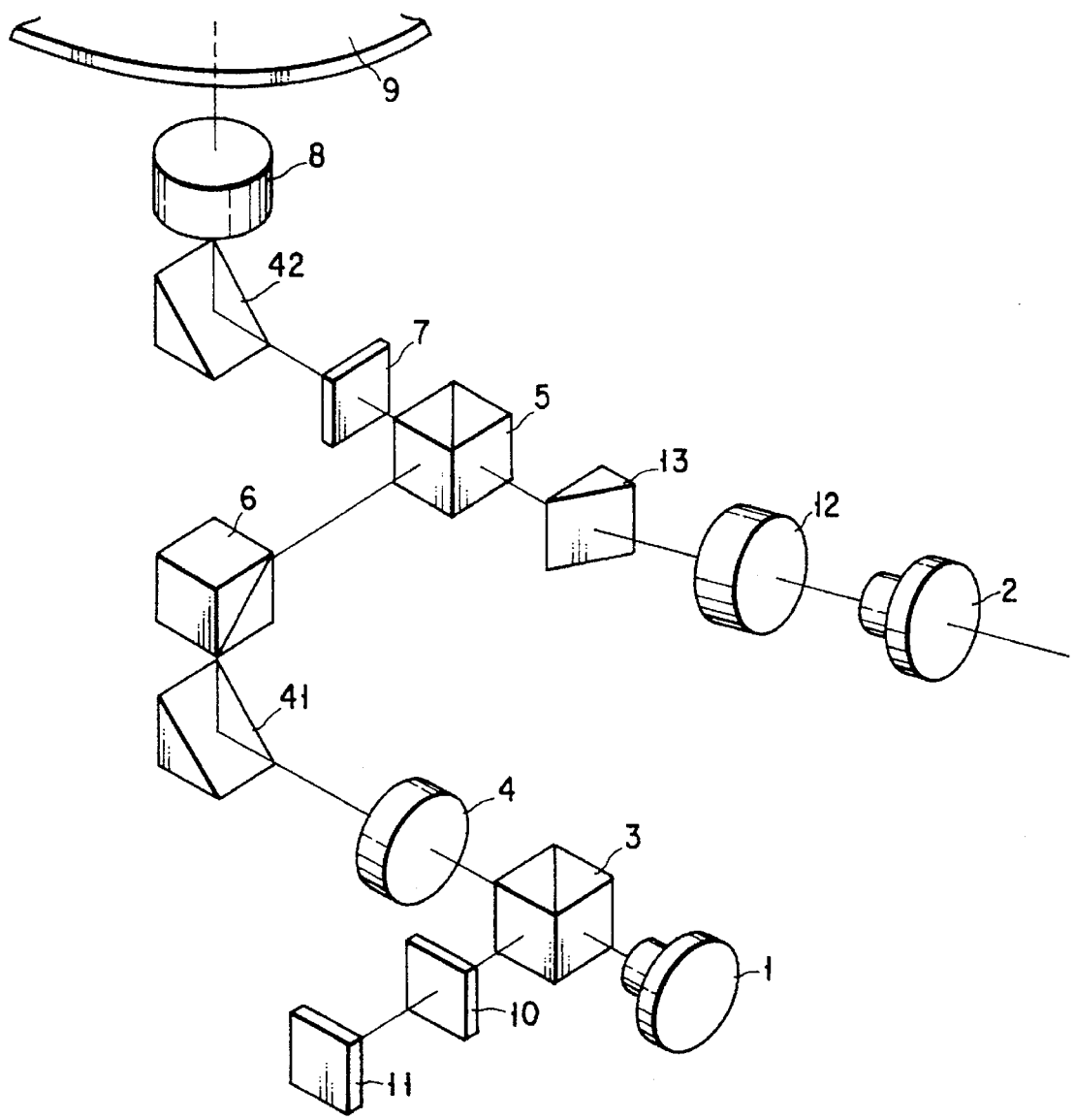
FIG. 11 is a perspective view of the optical system of an optical head apparatus according to a fifth embodiment of this invention.

FIG. 11 is an optical head apparatus according to a fifth embodiment of this invention, in which the light sources 1 and 2 and the beam splitters 5 and 6 are replaced from each other. Mirrors 41 and 42 are added.

(Sixth Embodiment)

FIG. 12 is an optical head apparatus according to a sixth embodiment of this invention, to which convex lenses 21 and 23 and optical detectors 22 and 24 are added like in the fifth embodiment such that the outputs from the first and second light sources 1 and 2 are controlled by the outputs from the detectors 22 and 24 by means of a light output control circuit (not shown).

(Seventh Embodiment)

FIG. 13 shows an optical head apparatus according to a seventh embodiment of this invention, to which a detecting lens 31 and an optical detector 32 are added like in the third embodiment. Reproduction information signals, focus error signals and tracking error signals are detected by guiding to the optical detector 32 through the detecting lens 31 the reflected λ2 light beam which has come from the optical disc 9 and passed through the beam splitter 6.

(Eighth Embodiment)

FIG. 14 shows an optical head apparatus according to an eighth embodiment of this invention, which is a combination of the sixth and seventh embodiments.

(Ninth Embodiment)

Figure 15:
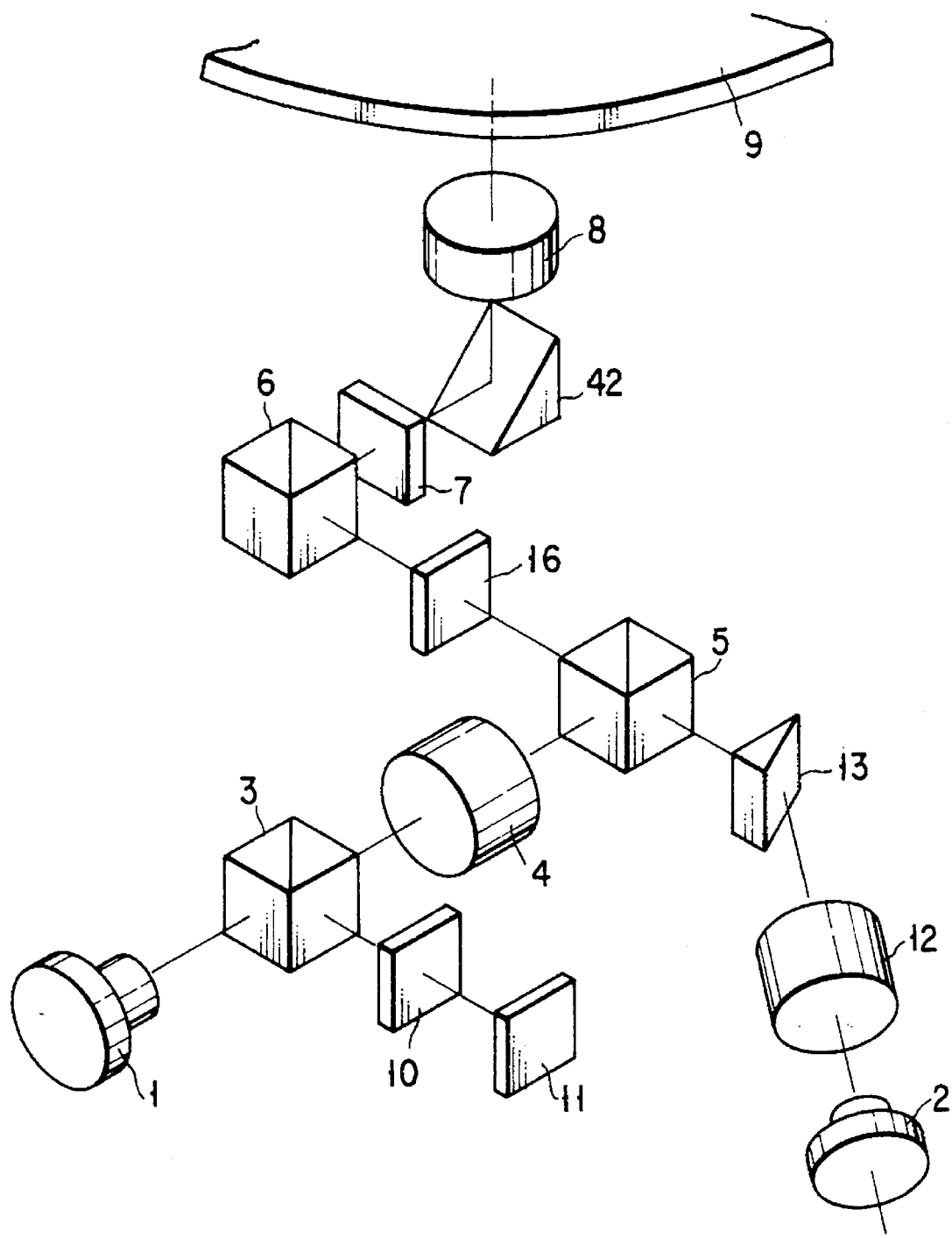
FIG. 15 is a perspective view of the optical system of an optical head apparatus according to a ninth embodiment of this invention.

FIG. 15 shows an optical head apparatus according to a ninth embodiment of this invention, in which the beam splitter 6 of the first embodiment is rotated through 90° about the x axis and a quarter wavelength plate 16 is provided between the beam splitters 5 and 6. The light beam traveling from the beam splitter 5 to the beam splitter 6 is rotated to move the polarization direction by 90°. This is the same as the phenomenon in which the beam splitter 6 is rotated through 90°. Even if the mirror 42 is omitted, no essential change occurs. Only the positional relation between the optical disc 9 and the optical system changes.

(Tenth Embodiment)

Figure 16:
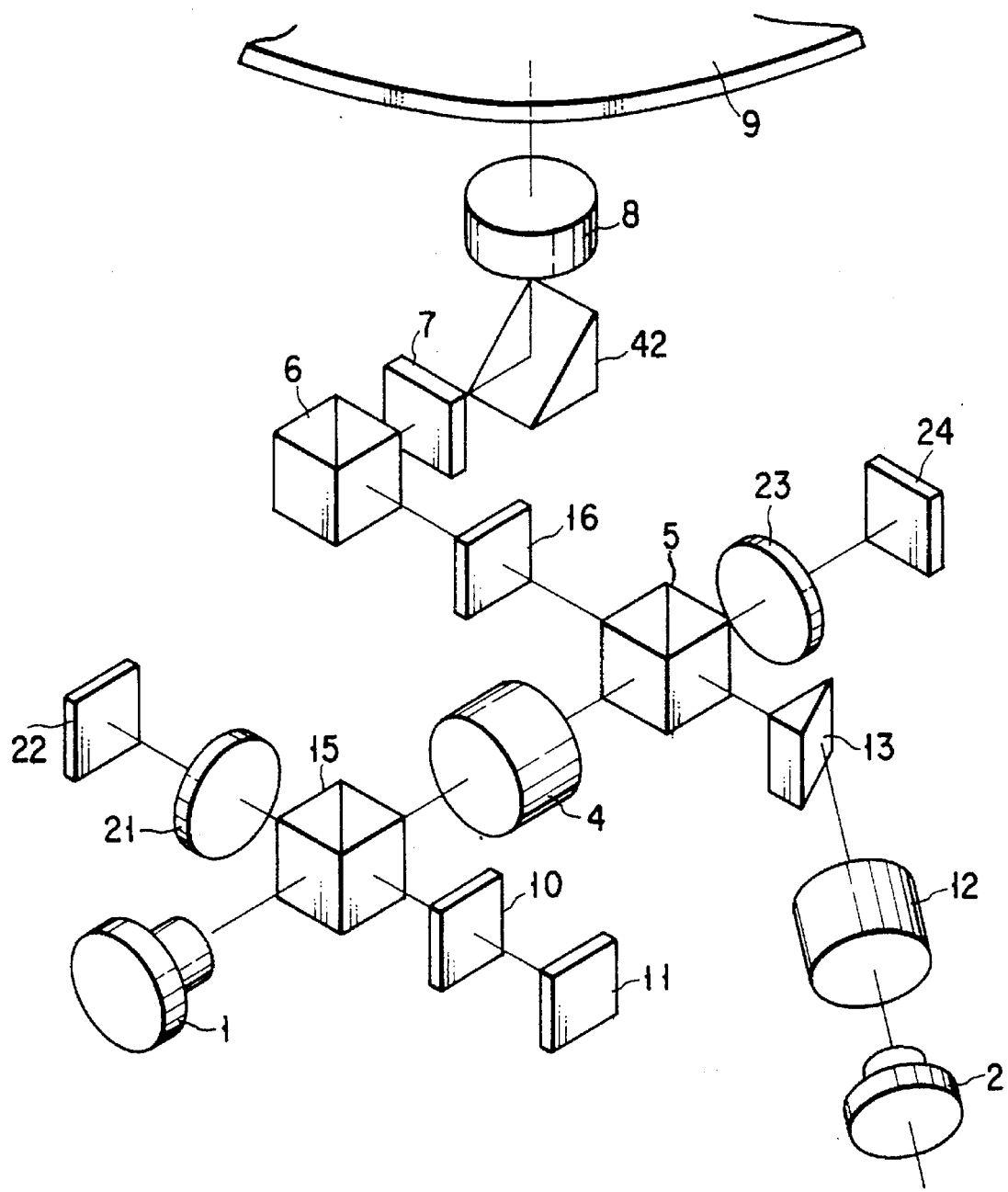
FIG. 16 is a perspective view of the optical system of an optical head apparatus according to a tenth embodiment of this invention.

FIG. 16 shows the optical head apparatus according to a tenth embodiment of this invention, to which convex lenses 21 and 23 and optical detector 22 and 24 are added to the ninth embodiment like in the second and sixth embodiments, such that the outputs from the light sources are controlled by the outputs from the optical detectors 22 and 24 by means of a light output control circuit (not shown).

(Eleventh Embodiment)

Figure 17:
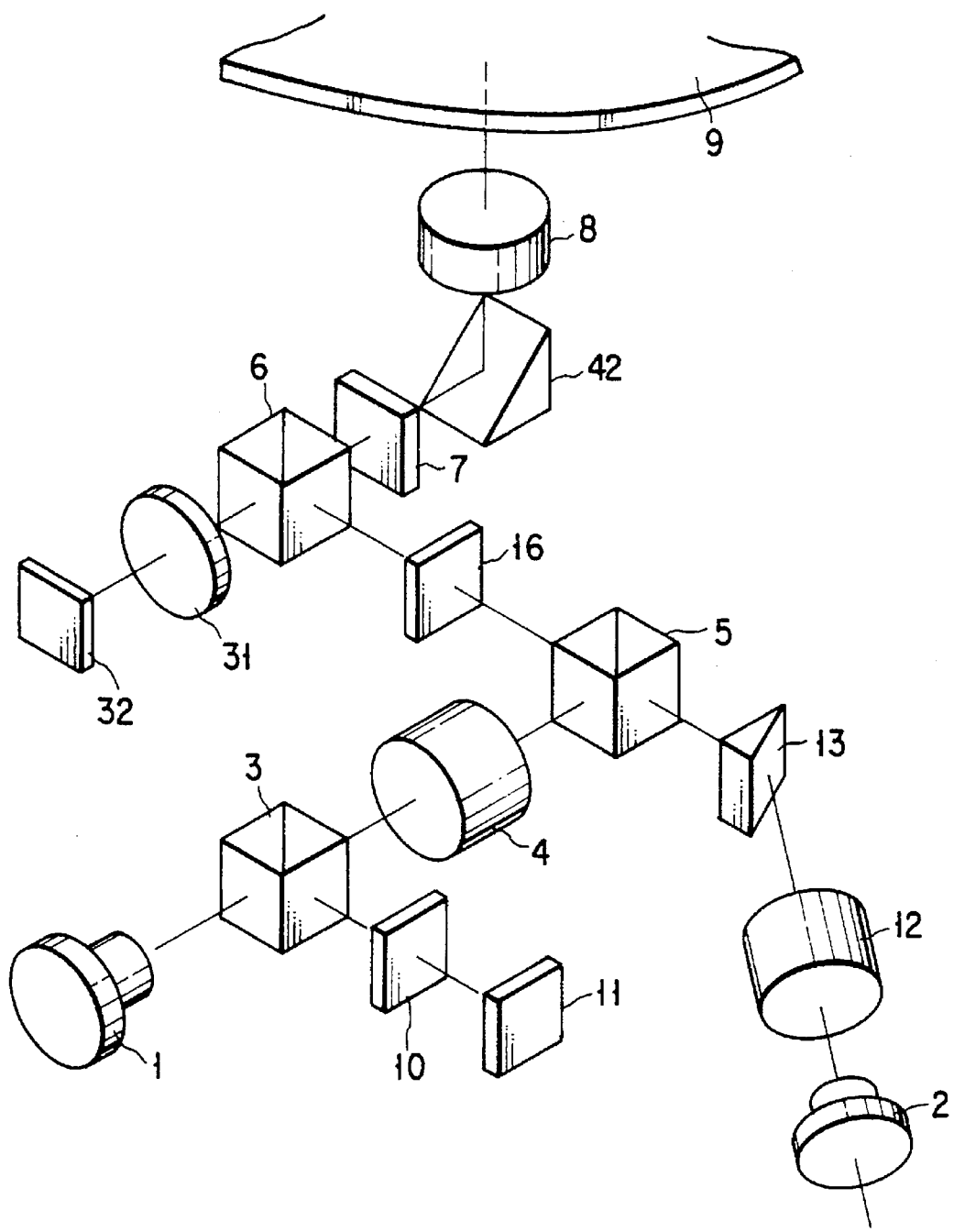
FIG. 17 is a perspective view of the optical system of an optical head apparatus according to an eleventh embodiment of this invention.

FIG. 17 shows an optical head apparatus according to an eleventh embodiment of this invention, in which a detecting lens 31 and an optical detector 32 are added to the ninth embodiment, like in the third and seventh embodiments. Reproduced information signals, focus errors and tracking errors are detected by guiding to the optical detector 32 through the detecting lens 31 the reflected λ2 wavelength light beams which has passed the beam splitter 6.

(Twelfth Embodiment)

Figure 18:
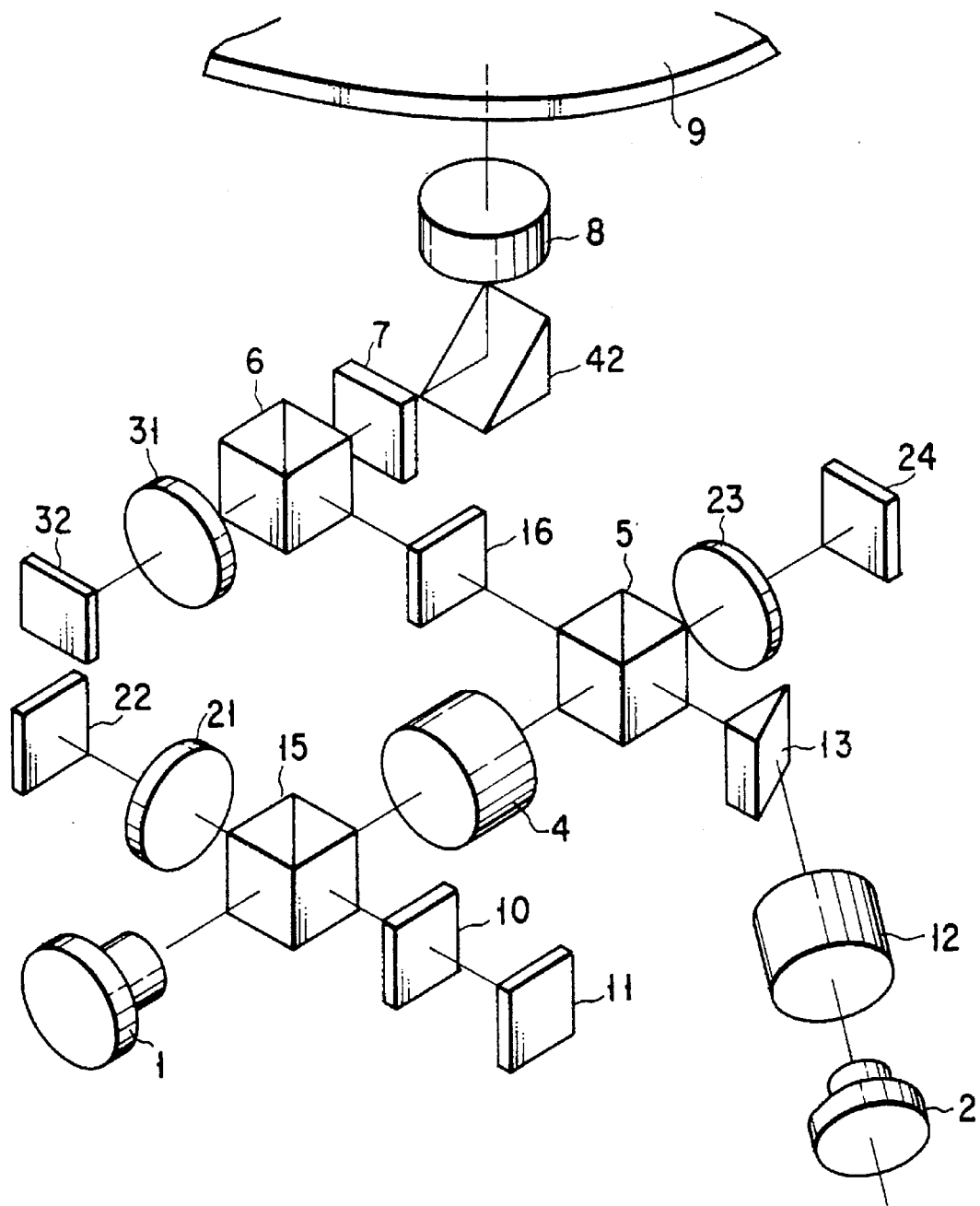
FIG. 18 is a perspective view of the optical system of an optical head apparatus according to a twelfth embodiment of this invention.

FIG. 18 shows an optical head apparatus according to a twelfth embodiment of this invention, which is a combination of the tenth and eleventh embodiments.

(Thirteenth Embodiment)

Figure 19:
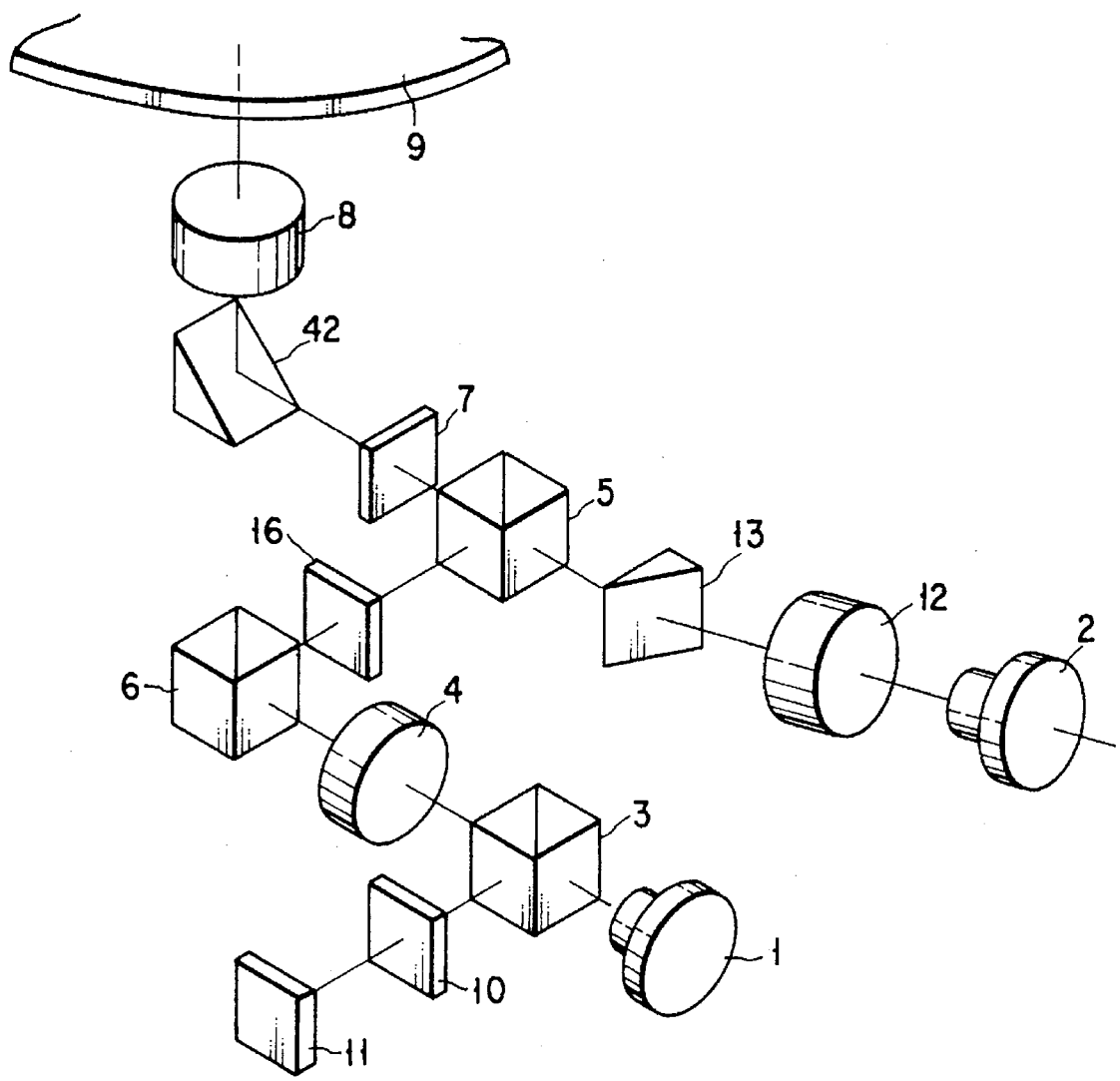
FIG. 19 is a perspective view of the optical system of an optical head apparatus according to a thirteenth embodiment of this invention.

FIG. 19 shows an optical head apparatus according to a thirteenth embodiment of this invention, in which the beam splitter 6 of the first embodiment is rotated through 90° about the x axis and a quarter wavelength plate 16 is provided between the beam splitters 5 and 6.

(Fourteenth Embodiment)

Figure 20:
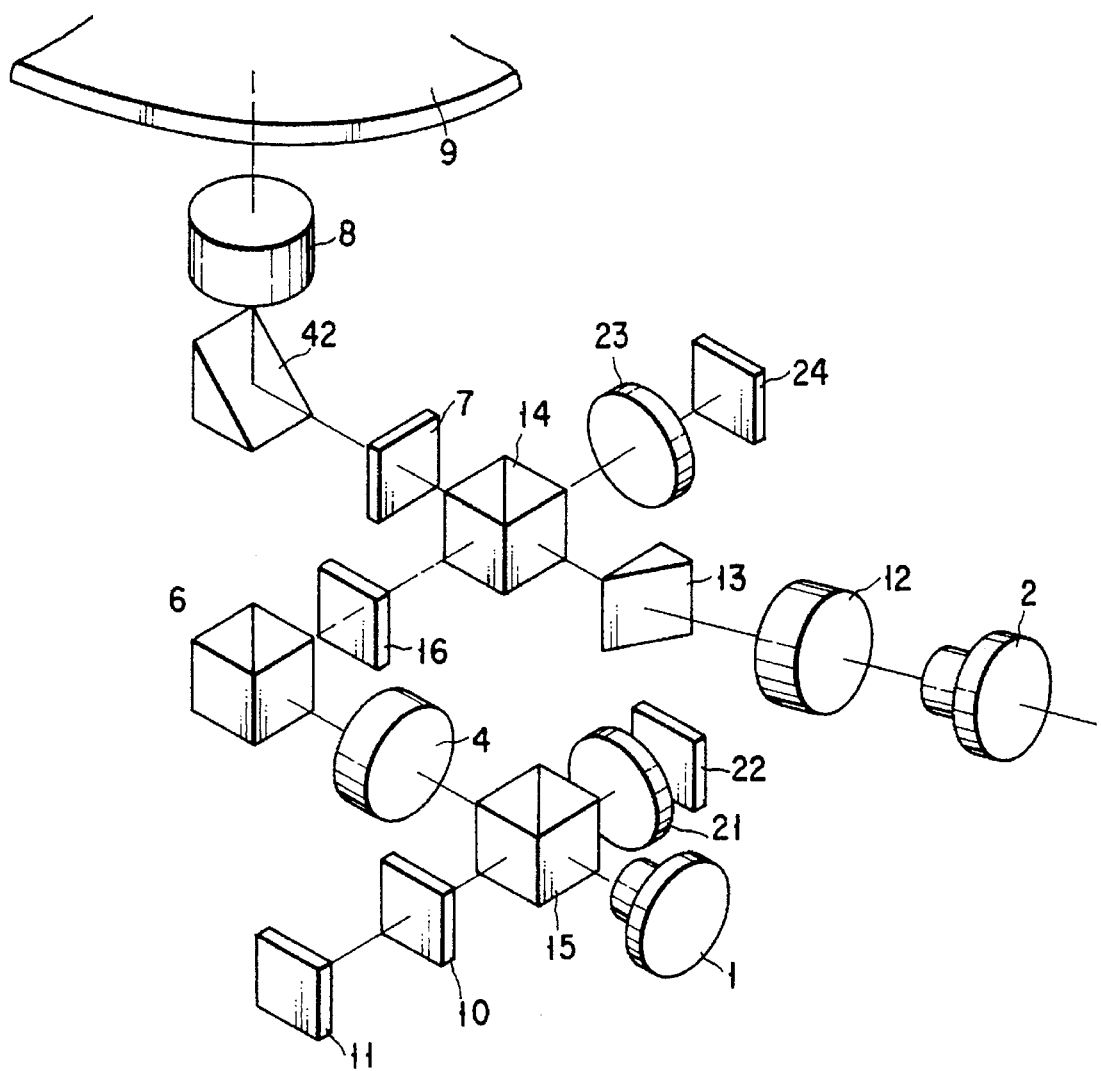
FIG. 20 is a perspective view of the optical system of an optical head apparatus according to a fourteenth embodiment of this invention.

FIG. 20 shows an optical head apparatus according to a fourteenth embodiment of this invention, to which convex lenses 21 and 23 and optical detector 22 and 24 are added to thirteenth embodiment like in the second and sixth and tenth embodiments, such that the outputs from the light sources 1 and 2 are controlled due to the outputs from the optical detectors 22 and 24 by means of a light output control circuit (not shown).

(Fifteenth Embodiment)

FIG. 21 shows an optical head apparatus according to an fifteenth embodiment of this invention, in which a detecting lens 31 and an optical detector 32 are added to the thirteenth embodiment like in the third, seventh and eleventh embodiments. Reproduced information signals, focus errors and tracking errors are detected by guiding to the optical detector 32 through the detecting lens 31 the reflected λ2 wavelength light beam which has passed the beam splitter 6.

(Sixteenth Embodiment)

FIG. 22 shows an optical head apparatus according to a sixteenth of this invention which is a combination of the fourteenth and fifteenth embodiments.

(Seventeenth Embodiments)

FIG. 23 shows an optical head apparatus according to a seventeenth embodiment of this invention, wherein the beam splitters 5 and 6 and the beam shaping prism 13 are unitarily combined together. By employing this structure, the size of the optical system can be reduced further.

In the second to sixteenth embodiments, the two beam splitters and the beam shaping prism can be unitarily combined. In the first to seventeenth embodiments, when the first light source can emit a light beam having a power strong enough to effect record, the first light source may be independently used for both of the recording and reproducing in relation to a high density optical disc, and the second light source may be independently used for both of the recording and reproducing in relation to a low density optical disc. In this case, one of the first and second light sources should be turned off when the other is used, so that a light beam from said one source does not affect a light beam from the other source, and reliable recording and reproducing can be performed.

Embodiments of optical disc apparatuses according to this invention will be described. Eighteenth and nineteenth embodiments described below each have two light beam axes deviated from each other and a mechanism for adjusting position of at least one of the axes. The adjusting mechanism, however, can be applied to first to the seventeenth embodiments described above, which have light beam axes coaxially aligned.

(Eighteenth Embodiment)

Figure 24:
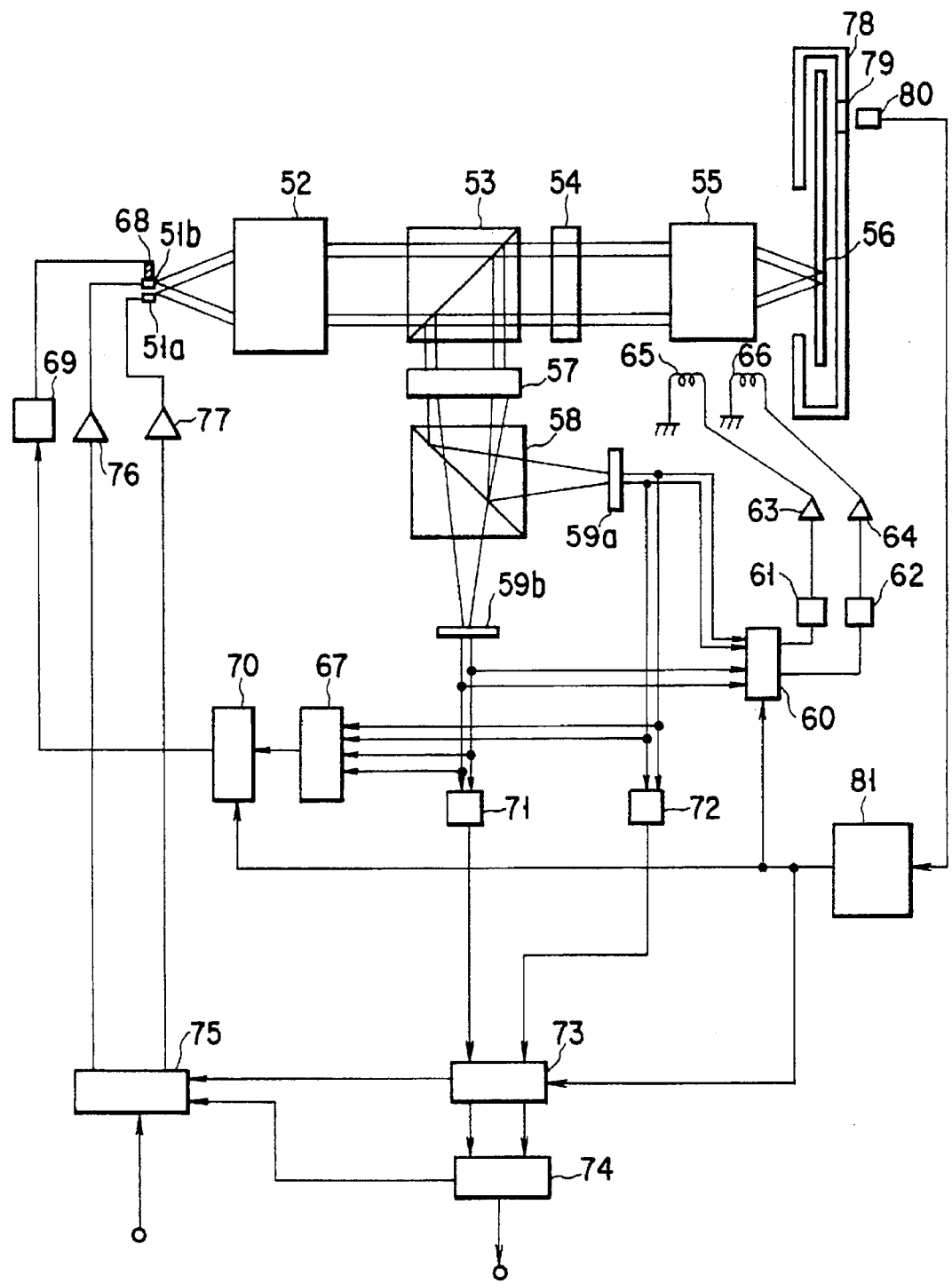
FIG. 24 is a view of an embodiment of the optical disc apparatus, which is an eighteenth embodiment according to this invention.

FIG. 24 shows an embodiment of an optical disc apparatus according to this invention. In this eighteenth embodiment, explanation will be made by using low power green SHG having a wavelength of 532 nm and producing constant DC light as a high density light source 51a, using a high power red semiconductor laser having a wavelength of 690 nm and capable of performing direct modulation as a low density light source 51b, and using a phase-changing medium as an optical disc (PC medium).

Light beams which are diverging linearly polarized light beams are emitted from the light sources 51a and 51b. The light beam emitted from the high density light source 51a and the light beam emitted from the low density light source 51b are hereinafter referred to as "high density light beam" and "low density light beam", respectively. The high density beam and the low density beam are first collimated by the collimator 52 to be formed into parallel light bundles. The parallel light beams pass through the polarization beam splitter 53. After linearly polarized, the light beams are converged on the optical disc 56 by means of the objective lens 55.

The high density light beam and the low density light beam, i.e., two kinds of light beams having different wavelengths pass through the collimator lens 52 and the objective lens 55. Thus, the collimator lens 52 and the objective lens 55 are designed such that aberrations at both wavelengths are limited to predetermined levels. This compensation is usually called the correction of chromatic aberration. The polarization beam splitter 53 and the quarter wavelength plate 54 can be adjusted to any wavelengths as long as required signal levels are obtained at both wavelengths. In this embodiment, however, the wavelength is matched to that of the optical detector having a lower spectral sensitivity, i.e., the oscillating wavelength of the high density light source 61a.

The size of the light spot formed by converging the light beam by the objective lens 55 is proportional to the wavelength of the light source. Thus, as shown in FIG. 25, the light beams from the high density light source 51a and the low density light source 51b form a small spot 140 and a large spot 141 on the optical disc 56, respectively. In FIG. 25, prepits on which ID information or the like is memorized are designated by 142, and a tracking group in which data information is recorded is shown by 144. The system for recording data information in the tracking group is called an in-group recording system.

The light beams converged on the optical disc 56 is reflected. The reflected high density light beams pass in reverse direction to the incident direction of the light beams through the objective lens 55 and the quarter wavelength plate 54 which is optimized at the wavelength of the high density light beams and are changed into linearly polarized light beams with their polarization direction being rotated through 90° from the polarized direction of the incident light beams. Thus, the reflected high density light beam from the optical disc 56 is reflected by the polarization beam splitter 53 and is guided to a focus error generating element 57.

The reflected low density light beam from the optical disc 56 also pass through the objective lens 55 and a quarter wavelength 54 in the reverse direction to that of the incident light beam. However, the quarter wavelength plate 54 is optimized at the high density light beam but does not operate at the wavelength of the low density light beam. In this connection, the polarization direction of the low density light beam does not rotate through 90° and the high density light beam enters the polarization beam splitter 53 as elliptically polarized light.

Since part of the reflected light beams from the optical disc 56 pass and return to the light source, the reproduction signal level is lowered to such an extent. As the reflected light is strong enough for the PC medium, however, the lowering of the reproduction signal level can be neglected. When the ratio of the oscillating wavelength of the high density light source 51a to that of the low density light source 51a is around 1.2 to 1.4, more than 80% of the light beams from the optical disc 56 are reflected by the polarization beam splitter 53. Where the light beams returned to the semiconductor laser causes any problem, the polarization beam splitter 53 and the quarter wavelength plate 54 may be designed so as to accord with the oscillating wavelength of the low density light source 51b.

The light beams which came from the optical disc 56, were reflected by the polarization beam splitter 53 and passed through the focus error generating element 57 enter the dichroic prism 58 and divided into high density light beam and low density light beam. The reflected low light beam is guided to the optical detector 59a and the reflected low light beam is guided to the optical detector 59b. For example, astigmatism optical system, a double knife edge or a mixed aberration HOE (a hologram element) is used as the focus error generating element 57. Two-divided optical detectors are used as the optical detectors 59a and 59b.

Each detecting output of the optical detectors 59a and 59b are branched into three and are input to a servosystem changing circuit 60, a relative position detecting circuit 67 and preamplifiers 71 and 72. The servosystem changing circuit 60 selects the output of any one of the optical detectors 59a and 59b, and a focus error signal and a tracking error signal are generated by the a focus error operation circuit 61 and a tracking error operation circuit 62. The focus error signal and the tracking error signal are supplied to a focusing actuator 65 and a tracking actuator 66 via a focus drive circuit 63 and a tracking drive circuit respectively. The objective lens 55 is servo-controlled in the focusing direction and in the tracking direction by means of the actuators 65 and 66.

Either the output of the optical detector 59a or the output of the optical detector 59b for controlling focus control and trucking control is selected by the servosystem changing circuit 60 according to the discrimination result obtained from a disc discrimination circuit 81 which detects the kind of the optical disc set on the optical disc apparatus. The disc discrimination circuit 81 will be described later.

In the optical system of the optical head according to this embodiment, the positions of the light spot 140 of the high density light beam and the light spot 141 of the low density light beam arranged in the radial direction of the disc (which direction is also called the tracking direction) are adjusted to agree with each other at the initial stage, as shown in FIG. 25, such that both light spots 140 and 141 scan the same track (guide group 144). When the temperature change, the humidity change and aging change occur, the two light spots 140 and 141 are likely to be displaced from each other in the radial direction of the disc beyond the allowed relative displacement (about ±0.05 μm for the track pitch of 1μ). Therefore, some means is required for matching together the positions of the light spots 140 and 141 in the radial direction of the disc.

The positions of the high density light source 51a and the low density light source 51b in the track direction cannot be made coincide with each other, and thus the positions of the light spot 140 formed by the high density light beam and the light spot 141 formed by the low density light beam are separated in the track direction to some extent. The distance between the light spots 140 and 141 changes with the positions of the light sources 51a and 51b and the multiplication of the optical system (usually not more than 1), and is normally several ten μm. A relative positional displacement in the tracking direction is produced between both the light spots 140 and 141 due to the distance between the two light spots 140 and 141. Thus, this displacement must be corrected.

A relative focus displacement of the two light spots 140 and 141 is produced by the displacement of the light sources 51a and 51b due to the temperature change, the humidity change and the aging change. The amount of the focus displacement is determined by the magnification of the optical system (usually not more than 1) and can be set to a value not more than the focal depth. Thus, it is unnecessary to correct the positional displacement along the optical axis.

Automatic adjustment is made to the relative positional displacement of the light spots 140 and 141 in the radial direction of the disc which displacement must be absolutely corrected, in the following way. Let it be assumed, as shown in FIG. 26, that the light spot 141 of the low density light beam is displaced by Δy from the light spot 140 of the high density light beam in the radial direction of the disc on the optical disc 56.

As shown in FIG. 27B, the high density and low density light beams on the optical detectors 59a and 59b are adjusted to be disposed at the centers of the dividing lines of the receiving faces of the detectors 59a and 59b of two-division type at the initial stage. Where, however, the light spot 141 of the low density light beam is displaced from the light spot 141 of the high density light beam as shown in FIG. 26, the spot 141 is disposed at the center of the dividing line on the optical detector 59a but is displaced from the center of the dividing line on the optical detector 59b.

In this embodiment, the positional displacement in the radial direction of the optical disc is detected from the detection outputs of the optical detectors 59a and 59b by means of a relative positional displacement detecting circuit 67 and the position of the light source 51b in the radial direction of the disc is adjusted such that the positional displacement becomes zero. More specifically, the low density light source 59b is provided with a piezoelectric element 68 and is designed to be movable in the radial direction of the disc with respect to the high density light source 51a such that the piezoelectric element 58 is driven by the output of the relative positional displacement circuit 67 through a piezoelectric element driving circuit 69. This structure makes it possible to always automatically cause the light spot 141 of the low density light beam and the light spot 140 of the high density light beam to coincide with each other when viewed in the radial direction of the disc.

FIG. 28 shows a concrete example of the relative positional displacement detecting circuit 67 and comprises subtracters 151, 153 and 157, adders 152 and 154 and dividers 155 and 156. The dividing line of each of the optical detectors 59a and 59b is set to divide the incident light beams equally in two parts along the radial direction of the disc when the light spots are not displaced from each other. In this case, the differences of the detecting outputs of the divided areas of the optical detectors 59a and 59b are obtained by the subtracters 151 and 153, and the difference signals are divided by addition signals of the detecting outputs of the optical detectors 59a and 59b obtained by the dividers 155 and 156 so as to be normalized. The difference between the normalized outputs from the dividers 155 and 156 is obtained by the subtracter 157. Then, the relative positional displacement by between the spots 140 and 141 in the radial direction of the disc as shown in FIG. 26 can be detected.

The description will be made as to how to treat the positional displacements of the light spot 140 of the high density light beam and the light spot 141 of the low density high beam in the track direction (the direction perpendicular to the radial direction of the disc). As described above, since the positional displacement between the light spots 140 and 141 is more than 10 μm, this displacement cannot be compensated by the GAP (gap portion) of the sector format of the optical disc. However, the positional displacements due to the temperature change, the humidity change and the aging change can be made small. Thus, such displacements can usually be compensated by the GAP. The fixed positional displacement can be measured when the head is adjusted. Thus, means for taking timing of the recording pulse per track number by using the fixed positional displacement provides a method of compensating the positional displacement. More practically, as will be described later, the positional displacement in the radial direction between the light spots 140 and 141 is detected on the time axis and the timing is delayed by such the extent at the time of recording.

Figure 30:
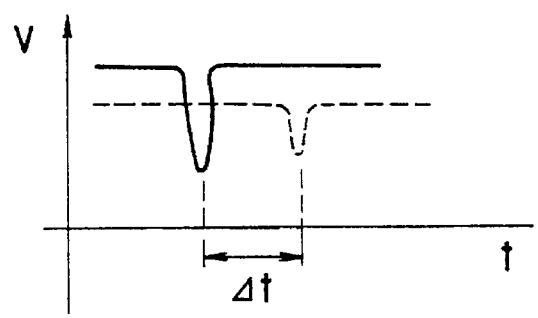
FIG. 30 shows the wave forms of detected outputs obtained by reading a datum pit.

Let it be assumed that the light spots 140 and 141 read the datum pit 160. The pit 160 is made so as to have such a shape that sufficient outputs can be obtained from the optical detectors 59a and 59b even when the pit 160 is read by the spot 141 of the low density light beam. FIG. 30 shows the wave forms of the detected outputs obtained by reading the datum pit 160. The time difference between the time of the output (shown by a solid line) of the optical detector 59a when the detector 59a corresponds to the center of the datum pit 160 and the time of the output (broken line) of the optical detector 59b when the detector 59b corresponds to the center of the datum pit 160 is $\Delta t$. The time interval $\Delta t$ is detected by a time delay detecting circuit 74 as shown in FIG. 24.

Figure 31:
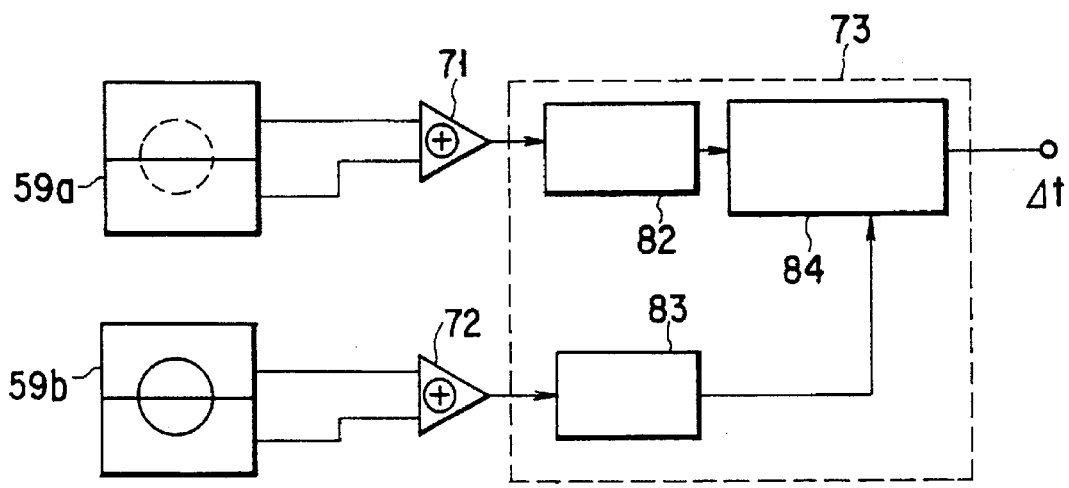
FIG. 31 is a block diagram showing a concrete structure of the time delay detecting circuit.

FIG. 31 shows a block diagram illustrating a concrete structure of the time delay detecting circuit 74. After the detecting outputs of the optical detectors 59a and 59b are added to form a binary level signal by means of binary coding circuits 82 and 83, the binary coded signal is input to a time interval measuring circuit 84 comprising a counter, thereby obtaining the time interval between the changing points of the output signals of the binary coding circuits 82 and 83 (the time interval between the time at which the light spot 140 corresponds to the center of the datum pit 160 and the time at which the light spot 141 corresponds to the center of the datum pit 160 in FIG. 30) as the time delay $\Delta t$.

Figure 32:
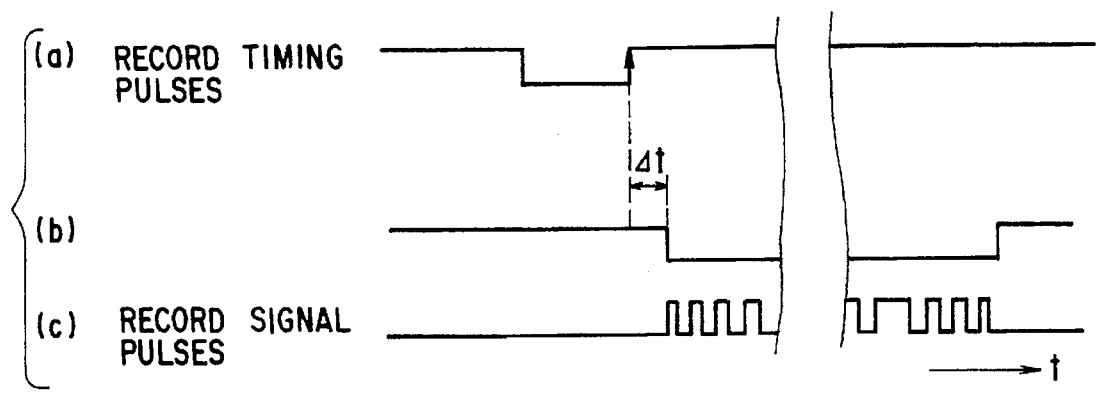
FIG. 32 is a diagram showing how to compensate the positional displacements of the optical spots due to the outputs of the time delay detecting circuit.

By using the recording time chart as shown in FIG. 32, it will be described how to compensate the positional displacements of the optical spots 140 and 41 in the track direction due to the outputs of the time delay detecting circuit 24. The signal processing circuit 74 as shown in FIG. 24 generates record timing pulses as shown FIG. 32, (a), which are obtained from built up from the reproduction signals obtained from the spots 140 of the high density light beam, i.e., the out-put signals from the binary coding circuit 82 in the time delay detecting circuit 73 (see FIG. 31) and built up at the time when the output signal corresponds to the center of the datum pit 160. The record timing pulses are supplied to a record timing compensation circuit 75. The record timing compensation circuit 75 delays the record timing pulses by the time delay $\Delta t$ (the output of the time interval measuring circuit 83 as shown in FIG. 31) produced in the detecting circuit 24, generates corrected record timing pulses as shown in FIG. 32, (b), and supplies them as gate signals to the light source drive circuit 56 for the low density light source Thus, data are accurately recorded without accompanying time delay of $\Delta t$ arising from the positional displacements of the light spots 140 and 141 in the track direction.

In the optical disc apparatus for recording and reproducing data per a sector unit, sector marks can be used as datum pits 160 for measuring the time delay $\Delta t$. Alternatively, a test zone track may be provided previously such that the datum pit 160 is recorded on it and the time delay on the other tracks can be determined from the time delay at measured by using the test zone track.

In this embodiment, the reproduction signals of the date recorded on the optical disc 56 are obtained by signal-processing the output signals of the binary coding circuits 82 and 83 (FIG. 31) in the time delay detecting circuit 73 by means of the signal processing circuit 74.

In this invention, when the optical disc 56 set on the optical disc apparatus is a high density disc, the recording is performed by using the low density light source 51b and the reproduction is performed by using the high density light source 51a. In contrast, when the optical disc 56 is a low density disc, both recording and reproduction are carried out by using the low density light source 51b. Thus, it is decided whether the low density light source or both the high and low density light sources should be used depending upon the case at which the disc is a high density disc or a low density disc.

The recording and reproduction will be described when a high density disc is used as the optical disc 56.

Discrimination of the optical disc 56 as to whether or not it is a high density disc is made by a sensor hole 79, a sensor hole detector 80 for optically detecting the sensor hole 79 and the disc discriminating circuit 81 connected to the output of the detector 80. Alternatively, such disc discriminating means is available as reads out information on a predetermined track by setting the servosystem of the optical disc apparatus in a condition suited for the high density disc. This discriminating means determines, on one hand, that the high density disc should be used if data can be read correctly and determines, on the other hand, that the low density disc should be used if the date cannot be read correctly.

When a high density disc is set on the optical disc apparatus as the optical disc 56, the servo operation of the focusing and tracking is carried out by using the reflected high density light beam. The output signal of the optical detector 59a is selected by a switching circuit 60 and is inputted to the focus error operating circuit 62 and the tracking error operating circuit 62. In this way, the focus error signal and the tracking error signal are obtained. Then, these errors are supplied to the focusing actuator 65 and the tracking actuator 66 through the drive circuits 63 and 64.

Only high density light beams are used for reproduction and servo control upon reproducing information from a high density disc. A switching circuit 70 is turned off in accordance with the discriminated result of the disc discriminating circuit 81. Upon recording information on the high density disc, on the other hand, the light spot 140 of the high density light beam and the light spot 141 of the low density light beam fall on the optical disc at the same time. Of course, focusing and tracking servo controls are performed by using the light spot 140 of the high density light beam.

When ID information is read by the light spot 140 of the high density light beam and the light spot 140 coincides with the sector to be recorded, the data is written on the sector. In this case, the positional displacement in the direction of the track between the light spots 140 and 141, i.e., the time delay $\Delta t$ as described before are measured by the method as described above, and the positions of the light sources 51a and 51b are determined such that the light spot 141 of the low density light beam is always delayed from the light spot 140 of the high density light beam. The light spot 141 of the low density light beam is delayed by the measured time delay $\Delta t$ or the time delay previously measured and known previously. The power of the spot 141 is increased and the data is recorded.

In this embodiment, a PC medium is used as the optical disc 56. Even if, therefore, recording is carried out by using a large light spot 141 of the low density light beam, a small recording mark is actually formed by the above-described self-sharpening effect of the PC medium. The recording mark is reproduced by the light spot 140 of the high density light beam. In such an embodiment, the recording on the high density disc is done by a red beam and the reproduction is made by a green beam, for example in this case, resolution is not lowered due to deterioration of the OTF (optical transfer function) of the beam spot of the low density light beam when the optical disc is found to be a lower density disc by the discrimination process, the servo system is changed to the low density one and recording and reproduction can be carried out in the conventional way.

In this embodiment, a green light source and a red light source are used as the high density light source 51a and the low density light source 51b, respectively. Alternatively, a red light source and a near infrared light source may be used as the high density light source and the low density light source respectively, when an optical disc on the market is used. For higher density, the combination of a red light source as the high density light source and a green light source as the low density light or the combination of a near ultraviolet light source as the high density light source and a blue light source as the low density light source can be used. In short, any combination of light sources can be used as long as the difference between the wavelengths of the high and low density light sources is approximately 1.2 to 1.4 times.

In this embodiment, the low density light source 51b is moved with respect to the high density light source 51a. Reversely, the high density light source 51a may be moved with respect to the low density light source 51b. A piezoelectric element is used for moving the light source, but means using electromagnetic forces obtained from a stepping motor or the like may be used instead. In place of moving the light source, the direction of the light beam may be changed before they enter the collimator lens 52. In this way, several modifications can be considered in order to match the positions, in the radial direction of the optical disc, of the spots of the high and low density light beams on the optical disc.

(Nineteenth Embodiment)

Figure 33:
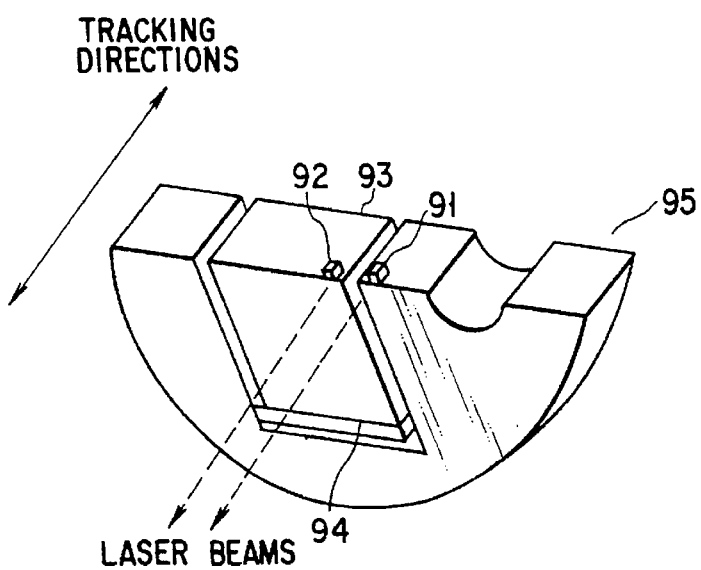
FIG. 33 is a perspective view of a light source used in an optical head apparatus according to a nineteenth embodiment of this invention.

Referring to FIG. 33, there will be described another embodiment of a light source for moving the high and low density light sources relatively in the radial direction of the optical disc (the tracking direction). A semiconductor lasers 91 and 92 in FIG. 33 correspond to the high density light source 51a and the low density light source 51b in FIG. 24, respectively. The semiconductor laser 92 is supported on a movable heat radiating base 93 and is movable with respect to a fixed heat radiating base 95 in the tracking direction. A small gap is provided between the movable heat radiating base 93 and the fixed heat radiating base 95.

This embodiment has an advantage that the temperature characteristic is stabler. When the temperature characteristic must be stabler further, it is effective to insert gelled material of silicone grease or the like having a good heat radiating characteristic in the gap.

(Twentieth Embodiment)

Figure 34:
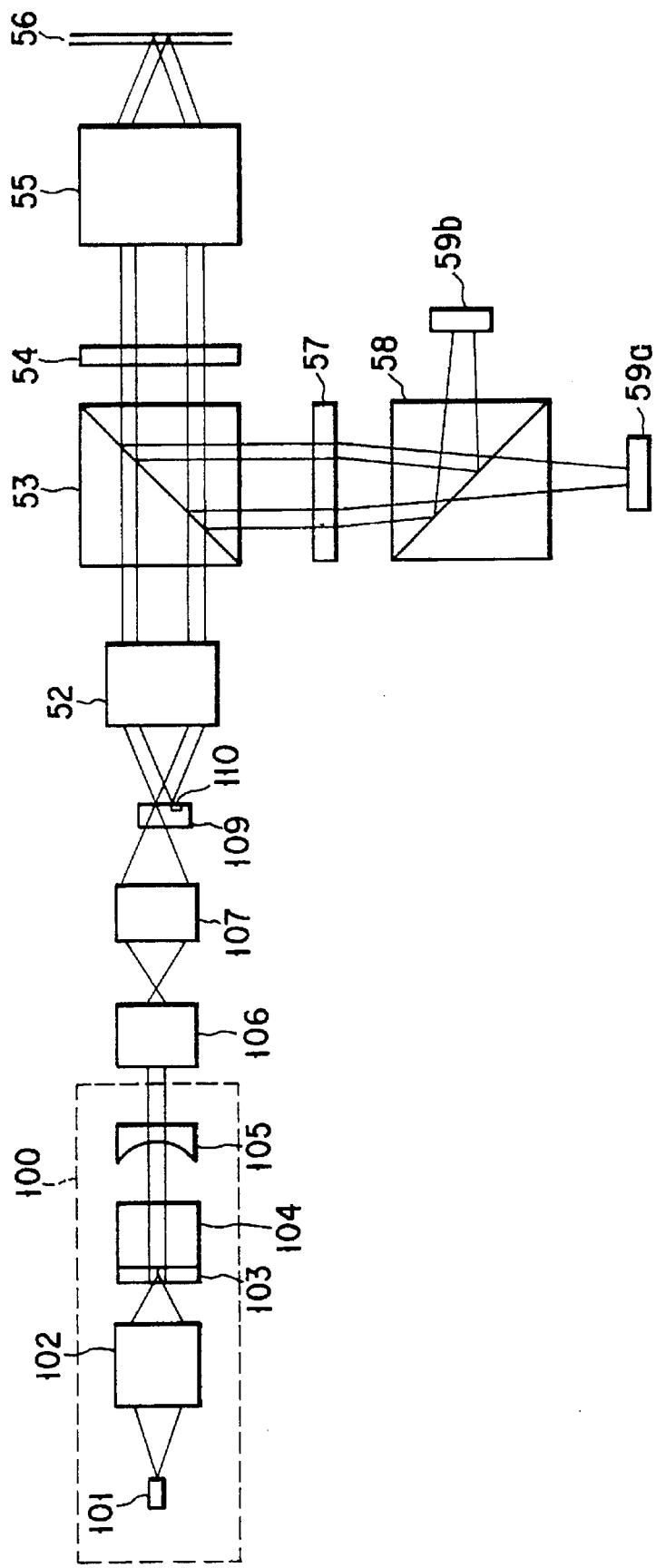
FIG. 34 shows an optical head apparatus according to a twentieth embodiment.

A further embodiment of the optical head according to this invention will be described with reference to FIG. 34. An SHG light source 100 and a semiconductor laser 110 in FIG. 34 correspond to the high density light source 51a and the low density light source 51b in FIG. 24, respectively. The output light beam from an exciting semiconductor laser 100 of the SHG light source 100 is converged on a solid laser 103 by a collimator lens 102. A YVO4 crystal is used as the solid laser 103, for example. The solid laser has a wavelength of 1064 nm and its resonator comprises an end surface of the YVO4 crystal and an output mirror 105. In the resonator is disposed a non-linear optical crystal 104 from which a light beam having a wavelength of 532 nm, a half of the oscillating wavelength of 1064 nm of the solid laser 103, is generated through the output mirror 105. KTP is used as a non-linear optical crystal, for example. Two light sources arranged at an arbitrary distance are visualized by converging the output light beams of the SHG light sources 100, by converging lenses 106 and 107, on a position corresponding to the position of the light source 51a in FIG. 24.

The semiconductor laser 110 is placed on the heat radiating base 109. As shown in a large scale in FIG. 35, a low density light source portion including the semiconductor laser 110 is provided between the converging lens 107 and a collimator lens 112. The heat radiating base 109 is formed with a conical escapement portion whose angle is wider than the extended angle of the light beam from the SHG light source 100 such that the light beam is converged by the converging lens 107 on the position separated by an arbitrary distance from the position of the light source of the semiconductor laser 110 on the heat radiating base 109. This structure of the light source portion can suppress the lowering of the heating characteristic of the semiconductor laser 110 to a minimum.

The adjustment of the relative position of the light spots 140 and 141 on the optical disc 56 is performed by moving the semiconductor laser 110 along the Y axis which direction corresponds to the radial direction of the disc. A piezoelectric element 111 is adhered to the heat radiating base 109. The heat radiating base 109 and the semiconductor laser 110 are moved at the same time by the piezoelectric element 111 to adjust the oscillating position of the semiconductor laser 110. A base 112 supports the overall optical light portion.

Figure 29:
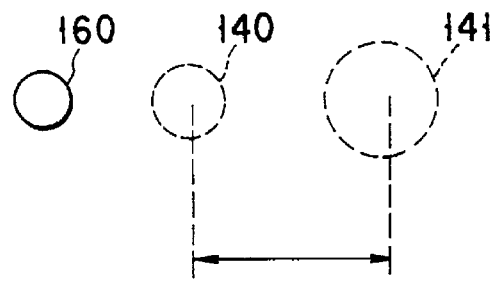
FIG. 29 is a view showing how to adjust the position of the light spots on the optical disc.

The positions of the light source 51b in FIG. 24 and the semiconductor laser 110 are adjusted to regulate the position of the large spot 114 on the optical disc 56, but the position of the small spot 140 on the optical disc 56 may be adjusted. In the case of FIG. 24, the position of the light source 51a is adjusted to control the position of the small spot 140 on the optical disc 56. In the case of FIG. 29, the position of the light beam converged by the converging lens 107 is adjusted.

(Twenty-first Embodiment)

In place of moving the low density light source 51b with respect to the high density light source 51a, the high density light source 51a may be moved with respect to the low density light source 51b. In the case of FIG. 24, the position of the light spot 140 on the optical disc 56 may be controlled by adjusting the light source 51a. In the case of FIG. 29, the position of the light beams collected by the converging lens 107 may be adjusted.

Figure 36:
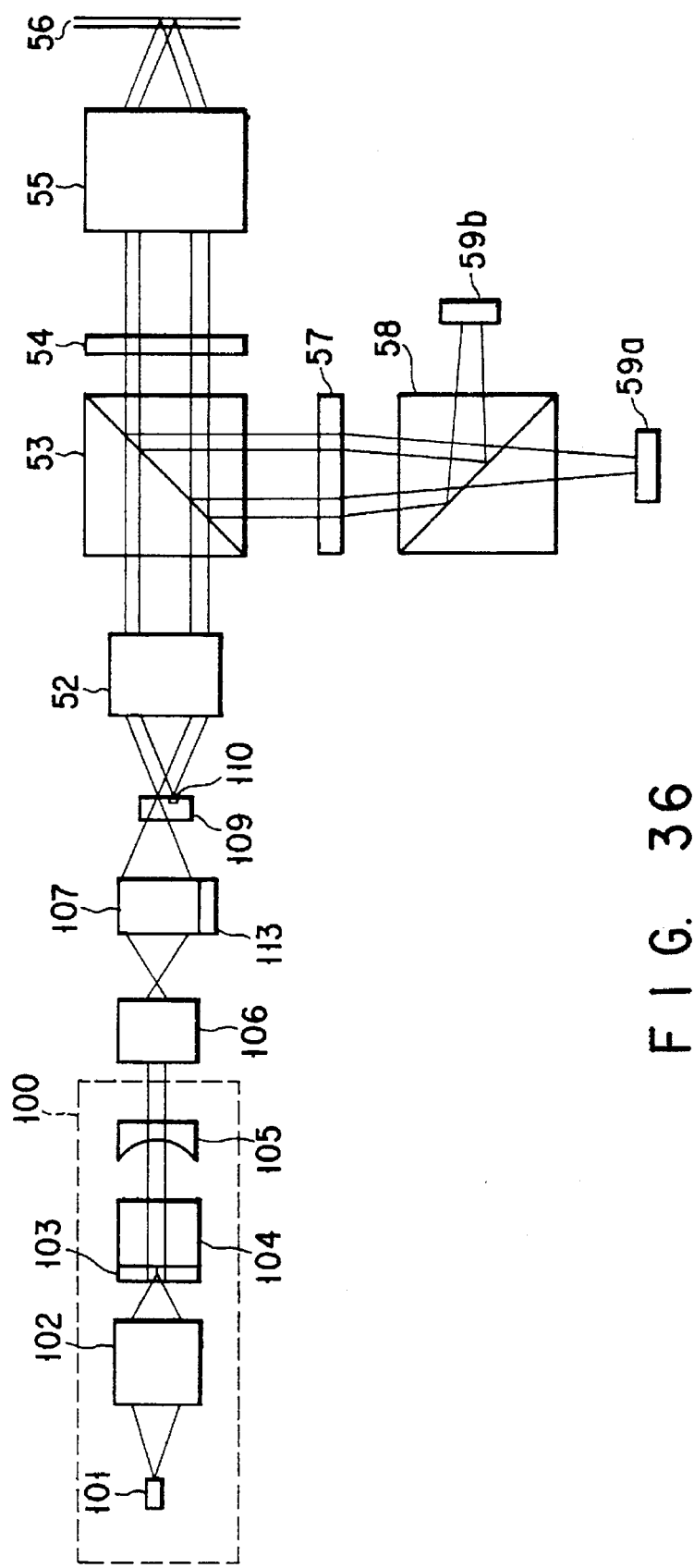
FIG. 36 shows an optical head apparatus according to a twenty-first embodiment of this invention.

More specifically, as shown in FIG. 36, the converging lens 107 is made to move vertically to the paper surface of FIG. 36 by means of the piezoelectric element 113, whereby the high density light source is moved to the required position by adjusting the position of the light beam collected by the converging lens 107. In place of the converging lens 107, the converging lens 106 to which the piezoelectric element 113 is adhered may be used. Fundamentally, any means may be used to drive the converging lenses 106 and 107. An electromagnetic drive mechanism or the like can be used for it. In place of moving the converging lenses 106 and 107, they may be tilted slightly.

(Twenty-second Embodiment)

Figure 37:
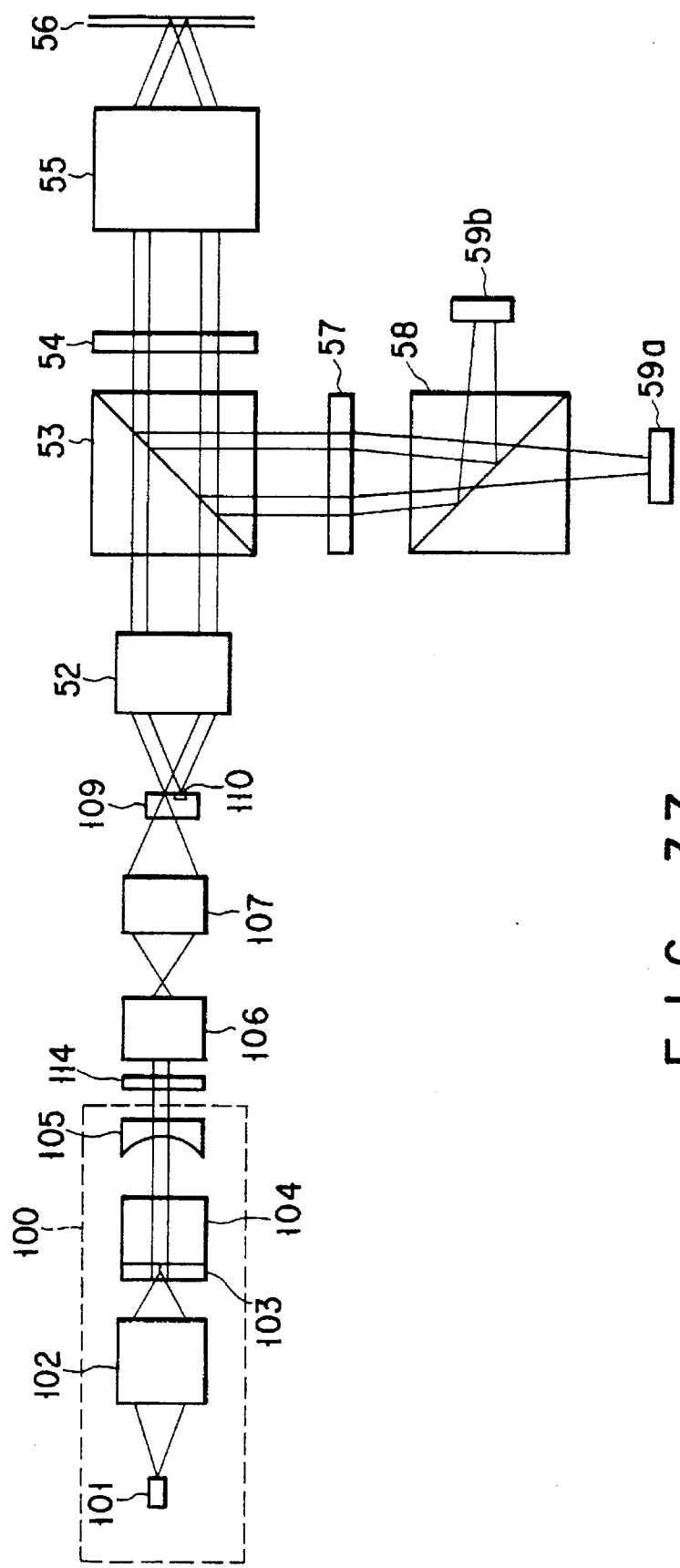
FIG. 37 shows an optical head apparatus according to a twenty-second embodiment of this invention.

FIG. 37 shows an embodiment wherein an optical system 114 is arranged to tilt the traveling direction of the collimated light beam from the SHG light source 100 in the light beams so as to move the high density light source.

Figure 38:
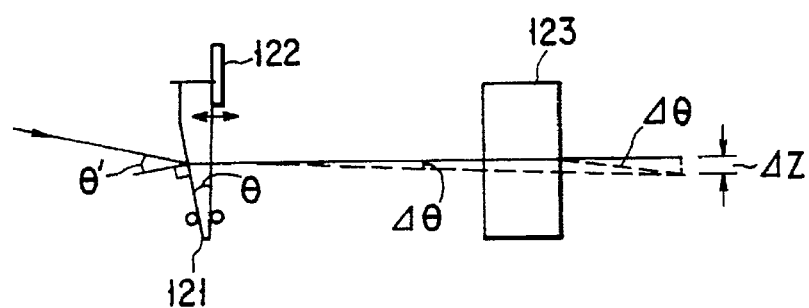
FIG. 38 shows an optical system of the twenty-second embodiment.

FIG. 38 shows a concrete embodiment of the optical system 114. A prism 121 having an angle of deflection θ is tilted slightly by a piezoelectric element so as to deviate the traveling direction of the light beams coming out from the prism 121 by Δθ, whereby the position at which the light beams are collected by a converging lens 123 is shifted by ΔZ. This makes it possible to adjust the position of the light spot 140 of the high density light beam in the radial direction of the disc on the optical disc 56. In this case, the piezoelectric element 111 as shown in FIG. 35 is not required.

The explanation has been made by considering that the temperature change, the humidity change and the aging change in the focusing direction are small. When, however, these changes are relatively large, the positions of the light sources may be shifted along the optical axis. In this case, the displacement in the focusing direction between the light spots 140 and 141 on the optical disc 56 is found from the focus error signal given by the light spot which is not focus-controlled, and the light sources are displaced relative to each other along the optical axis.

For example, the focus error signal is obtained from the optical detector 59b for detecting the reflected light beams from the light spot 141 while the optical spot 140 is focus-controlled, and the displacement between the optical spots 140 and 141 in the focusing direction is obtained. Then, the light source corresponding to the light spot which is not focus-controlled is moved along the optical axis.

(Twenty-third Embodiment)

Figure 39:
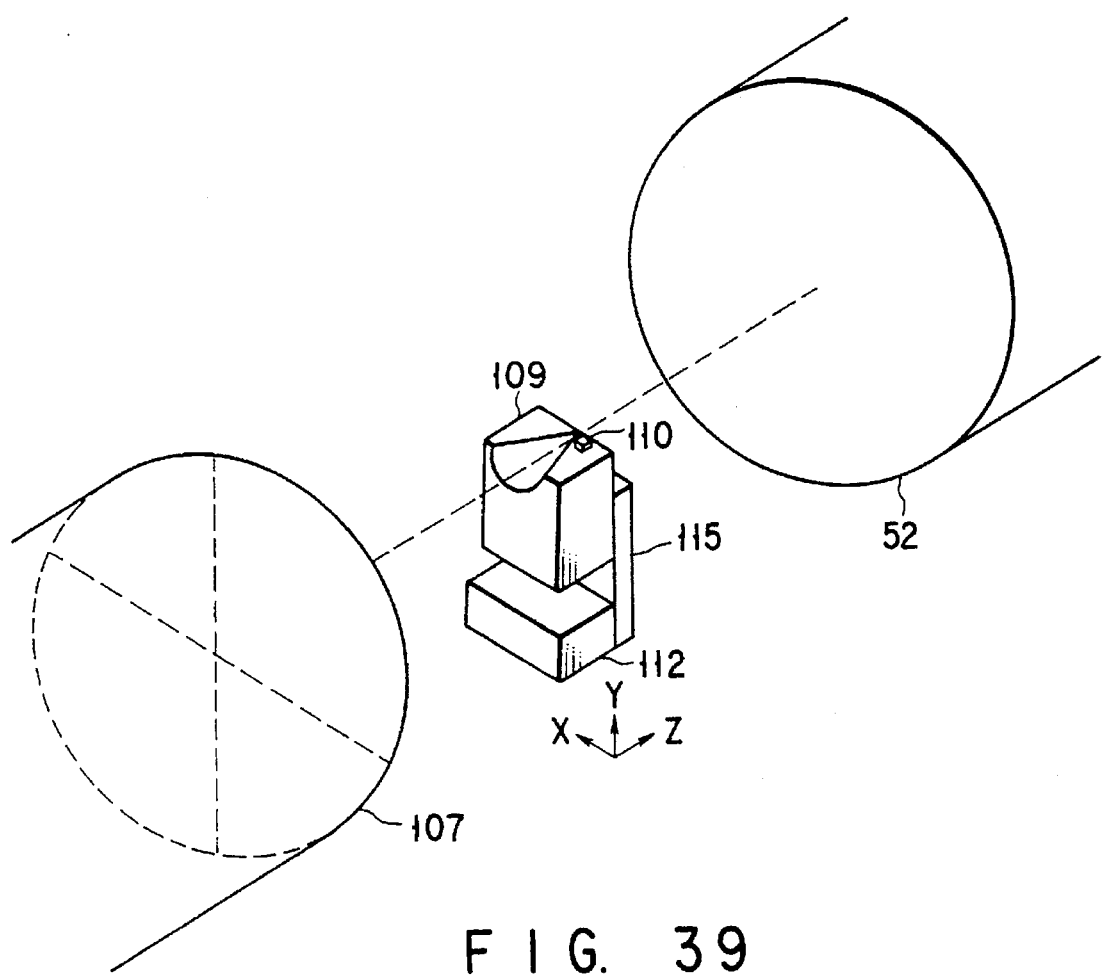
FIG. 39 is a perspective view of a light source used in an optical head apparatus according to a twenty-third embodiment of this invention.

FIG. 39 shows a structure of a light source portion in which a semiconductor laser 110 which is not focus-controlled is made movable along the optical axis (Z axis) by means of a piezoelectric element 115. The piezoelectric element shown in FIG. 37 may be made movable along the optical axis so as to move the converging lens 107 along the optical axis. The same effect is attained by moving the converging lens 106. The driving means is not always a piezoelectric element but may be another element movable along the optical axis.

(Twenty-fourth Element)

Referring to FIG. 40, an embodiment in which two light sources are not disposed close to each other. The SHG light source 100 of this embodiment is the same as that of FIG. 34. The converging lenses 105 and 106 are constructed and arranged such that the light beam coming out from the converging lens 107 is collimated. On the other hand, the light beam emitted from a semiconductor laser 130 is collimated by a collimator lens 131 and reflected by a dichroic prism 132. The light beams emitted from the two light sources are compounded. The relative positions of both the light sources can be adjusted in the same as mentioned above. The SHG light source 100 may be replaced by a semiconductor laser.

(Twenty-fifth Embodiment)

FIG. 41 shows the optical system of a twenty-fifth embodiment of the optical head apparatus, which is a modification of the first embodiment. The parts of this embodiment shown in FIG. 41 which are the same as the parts of the first to seventeenth embodiments shown in FIGS. 1 to 23 are designated by the same reference numerals and only necessary portions will be described.

Figure 43:
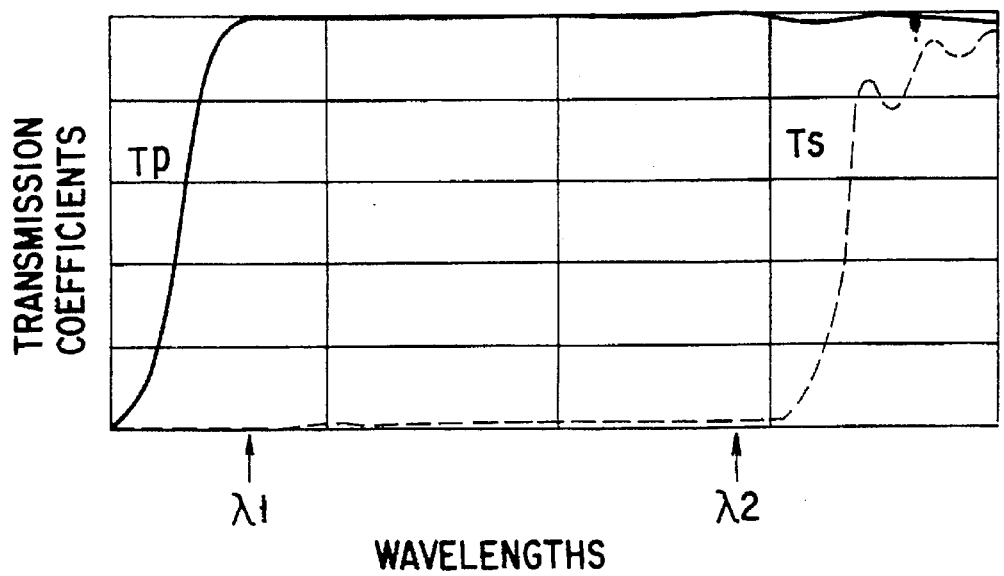
FIG. 43 is a graph showing transmission characteristics of a beam splitter 35 used in the apparatus shown in FIG. 41.

In this embodiment, a polarization beam splitter 35 is used in place of the polarization beam splitter 3. As shown in FIG. 43, the beam splitter 35 allows all P-polarized light to pass therethrough and reflects the S-polarized light at the wavelengths λ1 and λ2. A mirror 42 is used in place of the polarization beam splitter 6t and a diffracting element (HOE) 17, for example, instead of the detecting lens 11 is provided at the entrance of the optical detector 11. The mirror 42 changes the direction of the light beams and can be omitted without giving adverse effects on this invention.

The operation of the optical head apparatus shown in FIG. 41 will be described.

First, it will be explained how the optical system operates when the reproduction from the high density optical disc is made by using the optical light sources of the wavelength λ1. The light beam of the wavelength λ1 emitted from the light source 1 as shown in FIG. 2 arrives at the optical detector 11 in substantially the same way as the optical head apparatus of the first embodiment shown in FIG. 1. Namely, after having passed through the beam splitter 35, the light beam from the light source 1 is collimated by the collimator 4 to be shaped into a parallel light beam. Since the beam splitter 35 allows all P-polarized light to pass therethrough, all the light beam from the light source 1 passes through the beam splitter 35.

The light beam of the wavelength λ1 collimated by the collimator lens 4 enters the beam splitter 5. As shown in FIG. 4, the beam splitter 5 reflects both P-polarized and S-polarized components having the wavelength λ1, and allows the P-polarized component to pass and reflects all S-polarized light component having the wavelength λ2. Thus, the light beam of the wavelength λ1 is reflected by the beam splitter 5 and guided to the mirror 42.

The light beam reflected by the mirror 42 is incident on the optical disc 9 through the quarter wavelength plate 7 and the objective lens 8 in the same way as in the first embodiment shown in FIG. 1, and the reflected light beam is returned to the mirror 42. The light beam reflected by the mirror 42 is reflected again by the beam splitter 35, passes through the collimator lens 4 and is incident on the beam splitter 35. Since the beam splitter 35 reflects only the S-polarized light, part of the reflected light beams of the wavelength of λ1 is reflected by the beam splitter 35. The light beams reflected by the beam splitter 35 enters the optical detector 11 through the diffracting element 17. In this regard, the information signals recorded on the optical disc 9 are reproduced and the focus errors and tracking errors are detected by the output signals from the optical detector 11.

It will be described how the optical system operates in order to record information on and erase the same from the high density optical disc or the low density optical disc by using the light sources of the wavelength λ2. The light beam of the wavelength λ2 emitted from the light source 2 reaches the optical detector 11 in the course of the changes of the light beam as shown in FIG. 42. The light beam from the light source 2 is collimated by the collimating lens 12, formed into a parallel light beam, and shaped into a circular form by means of the beam shaping prism 13. The light beam shaped by the beam shaping prism 13 is incident on the beam splitter 5 as P-polarized light whose polarization axis is along the y axis, and passes the beam splitter 5 at the transmission coefficient Tp of the beam splitter 5, as shown in FIG. 4. In the example shown in FIG. 4, Tp is approximately 100% at the wavelength λ2. Thus, almost all the light beam of the wavelength λ2 passes. The beam splitter may allow part of the P-polarized light as long as it reflects all S-polarized light.

The light beam of the wavelength λ2 which has passed through the beam splitter 5 is emitted on the mirror 42. After having been reflected by the mirror 42 and changed into a circularly polarized light beam by the quarter wavelength plate optimized at the wavelength λ2, the light beam of the wavelength λ2 is converged by the objective lens 8 and is incident on the optical disc 9 so as to perform recording and erasing.

The light beam of the wavelength λ2 reflected by the optical disc 8 passes through the objective lens 8 in the reverse direction to that of the incident light beam, and is changed into linearly polarized whose polarization axis is along the x axis by the quarter wavelength plate 7. Then, the light beam is reflected by the mirror 32 to be changed into a linearly polarized light beam whose polarization axis is along the z axis and is incident on the beam splitter 5. Because the beam splitter 5 reflect the S-polarized component of the wavelength λ2, the light beam from the mirror 42 are reflected by the beam splitter 5, passes through the collimator lens 4 and is incident on the beam splitter 35. Since the beam splitter 35 reflects the S-polarized component of the wavelength λ2, the light beam from the collimator lens 4 is reflected by the beam splitter 35. Thus, the light beam of the wavelength λ2 is not returned to the light sources 1 and 2. The light beam reflected by the beam splitter 35 passes through the diffracting element 17 and arrives at the optical detector 11.

Due to the fact that the high powered light beam of the wavelength λ2 emitted from the light source 2 and reflected by the optical disc 9 is not returned to the light sources 1 and 2, the light sources 1 and 2 cannot become unstable, leading to stable recording, erasing and reproduction.

Figure 44:
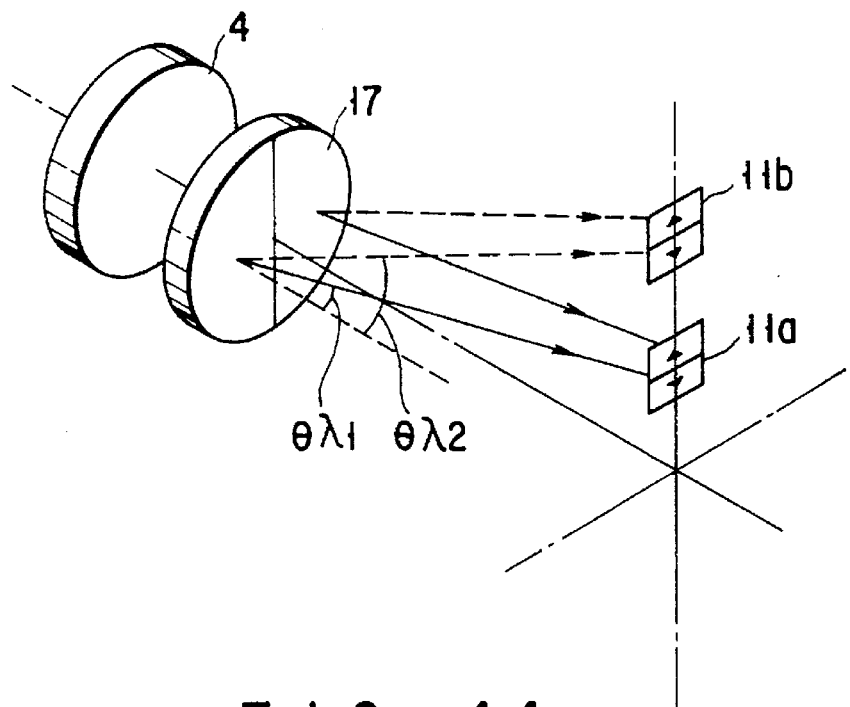
FIG. 44 is a perspective view showing how a diffracting element operates.

The operation of the diffracting element 17 will be described with reference to FIG. 44. In this figure, the beam splitter 35 is omitted for simplicity. Such omission, however, does not give any adverse effects to the apparatus. The light beams of the wavelengths λ1 and λ2 enter the diffracting element 17 and then diffracted.

As the wavelengths of the two kinds of incident light beams are different, their angles of diffraction θλ1 and θλ2 are also different. In general, θ=λ/T, where θ is the angle of diffraction, λ is the wavelength and T is the pitch of the grating of the diffracting element. FIG. 44 shows only the plus first order diffracted light beams. The two kinds of light beams having the wavelengths λ1 and λ2 are incident on the detecting surfaces 11a and 11b of the detector. Therefore, the plus first order diffracted light beams of the wavelengths λ1 and λ2 can be detected independently.

When the grating pattern of the diffracting element 10 is formed so as to change the shapes of the light beams on the optical detector 11 in accordance with the relative positional displacement between the objective lens 8 and the optical disc 9, the focus error signals can be obtained by operating the output signals of the divided optical detecting surfaces. The diffracting element of the optical head apparatus as disclosed in Published Unexamined Japanese patent Application No. 3-257 may be used, for example. As a matter of fact, reproducing signals can be obtained. In FIG. 44, the plus first order diffracted light beams are shown. However, the diffracted light beams of other orders can be used. In this invention, the diffracted light beams of the wavelengths λ1 and λ2 can be separated completely on the optical detector. The detected faces 11a and 11b are not always in the same optical detector but may be in different optical detectors.

The reproduction of information signals can be carried out from the outputs of the optical detectors 11 corresponding to the light beams of the respective wavelengths. The focus errors and the tracking errors can be detected by operating the outputs of the divided detecting surfaces. Returning to FIG. 41, the signals from the optical detector 1 are amplified by amplifying circuits 214 and 215. The amplifying circuit 214 amplifies the signals which have detected the light beam of the wavelength λ1, and the amplifying circuit 215 amplifies the signals which have detected the light beam of the wavelength λ2. The focus error signals and the tracking error signals at the wavelengths of the respective wavelengths are produced by error signal operating portions 216 and 217 following the amplifying circuits. In the next step, switching circuits 218 and 219 select the required error signal obtained from the light beam having the required wavelength. The objective lens 8 is moved along the optical axis and in the radial direction by means of a focus drive circuit 220, a tracking drive circuit 221, a focus drive coil 222 and a tracking drive coil 223, whereby stable recording, erasing and reproduction of information are performed by controlling the relative positions of the very small beam spots converged on the information recorded on the optical disc. The reproduction signals are obtained from the amplifying circuit 214 or 215. The drive circuits 224 and 225 control the outputs of the light sources 1 and 2.

Twenty-sixth to twenty eighth embodiments which are modifications of the twenty-fifth embodiment will be described with reference to FIGS. 45 to 47. The parts of these embodiments which are the same as those of the twenty-fifth embodiment are depicted by the same reference numerals and only the differences will be described.

(Twenty-sixth Embodiment)

Figure 45:
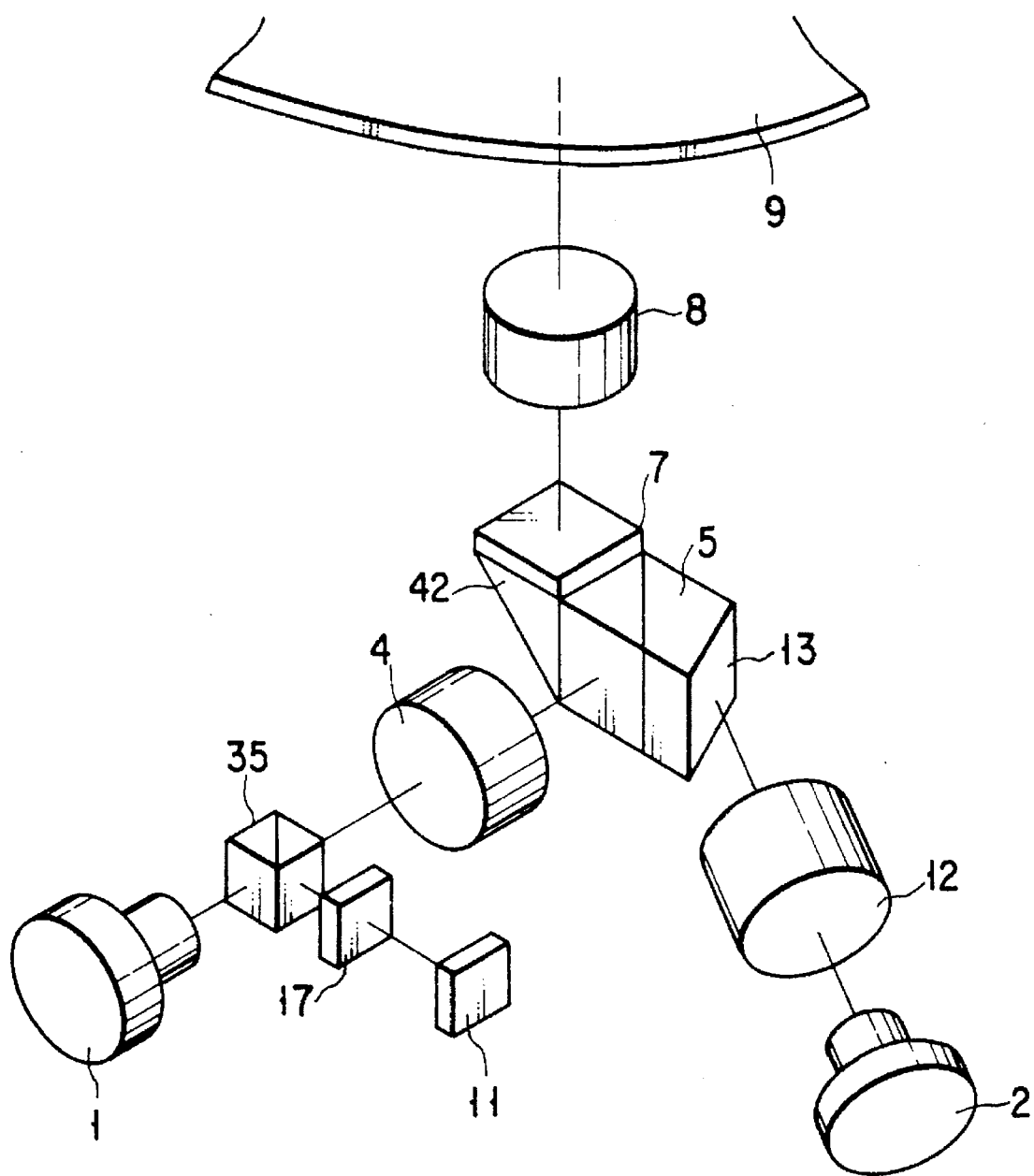
FIG. 45 is a perspective view of an optical head apparatus according to a twenty-sixth embodiment of this invention.

FIG. 45 shows an optical head apparatus according to a twenty-sixth embodiment of this invention, wherein several elements of the twenty-fifth embodiment are connected unitarily. This structure makes the optical system smaller.

(Twenty-seventeenth Embodiment)

FIG. 46 shows an optical head apparatus according to a twenty-seventh embodiment of the this invention, wherein the collimator lens 4 and the beam splitter 35 are replaced by each other, the beam shaping portion 36 is added to the beam splitter 35 and a concave lens 18 is added to the detecting system. This structure improves the utility efficient of the light beam from the light source 1. It is not always necessary to effect recording by using the light source of the wavelength λ2 and reproduce the information on the high density optical disc by using the light source 1 of the wavelength λ1. Because of high utility efficiency of the light beam issued from the optical source 1, the use of the high powered light source 1 of the wavelength λ1 ensures sufficient recording on and sufficient erasing and reproduction from the high density optical disc. Further, the quarter wavelength plate 7 may be optimized at the wavelength λ1 in order to increase the detecting efficiency of the light beams from the optical discs.

(Twenty-eighth Embodiment)

FIG. 47 shows an optical head apparatus according to a twenty-eighth embodiment, which has two separate optical detectors. Separately provided detectors 11f and 11s detect the plus first order diffracted light beam of the wavelength λ1 and the minus first order diffracted light beam of the wavelength of λ2 and the minus first order diffracted light beam of the wavelength λ1 and the plus first order diffracted light beam of the wavelength λ2, respectively. The independent positional adjustment of the optical defectors is possible, and this makes it possible to detect the error signals accurately.

In the twenty-fifth to twenty-eighth embodiments, when the first light source can emit a light beam having a power strong enough to effect record, the first light source may be independently used for both of the recording and reproducing in relation to a high density optical disc, and the second light source may be independently used for both of the recording and reproducing in relation to a low density optical disc. In this case, one of the first and second light sources should be turned off when the other is used, so that a light beam from said one source does not affect a light beam from the other source, and reliable recording and reproducing can be performed.

The adjusting mechanism of eighteenth and nineteenth embodiments, which have two light beam axes deviated from each other, can be applied to the twenty-fifth to twenty-eighth embodiments, which have light beam axes coaxially aligned.

The description will made to an embodiment which performs the recording on and erasing and reproduction from optical discs having different thicknesses. Normally, the high density and low density optical discs are different from each other. The interchangeability or the compatibility is enhanced by combining the following embodiment with the above-mentioned embodiment.

FIGS. 48 to 56 shows an embodiment which operates by inserting a compensation element in the optical path when the thicknesses of the optical discs differ from each other. These embodiments are preferably used for the recording information on and erasing the same from the high density optical disc and for the recording information on and the erasing and reproduction from the low density optical disc. In describing this embodiment, the parts of the twenty-fifth embodiment which are the same as those of the twenty-fifth embodiment are designated by the same reference numerals. (Twenty-ninth Embodiment)

Figure 48:
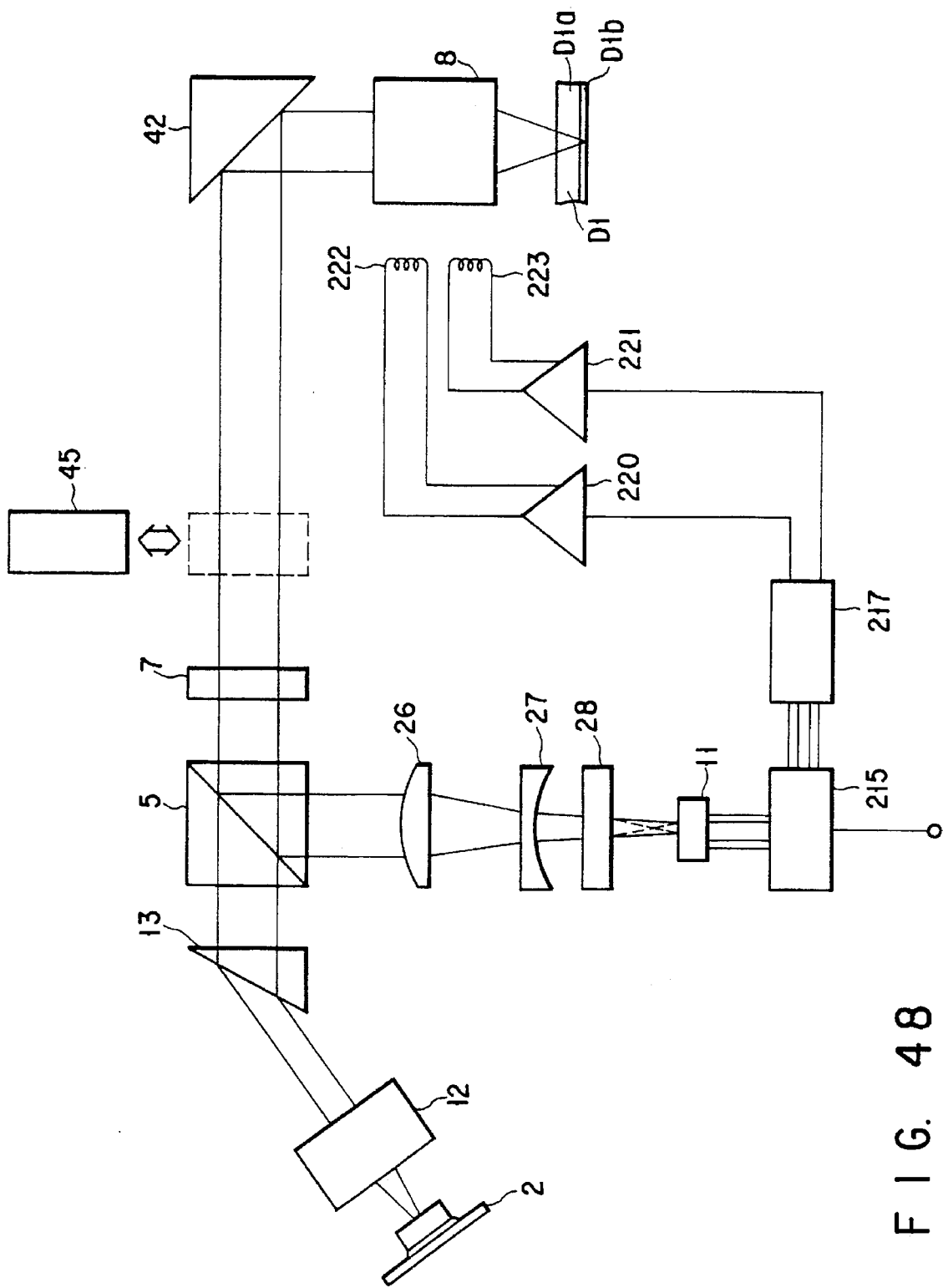
FIG. 48 shows an optical head apparatus according to a twenty-ninth embodiment of this invention.

FIG. 48 shows an optical head apparatus according to a twenty-ninth embodiment, wherein a compensation element can be inserted into and removed from the optical path. At the entrance of the optical detector 1 are arranged a converging lens 26, a concave lens 27 and cylindrical lens 28. The quarter wavelength plate 7 may be disposed between the beam splitter 5 and the objective lens 8, and its position is non limited to the position shown in FIG. 48. The mirror 42 is used to change the direction of the light beams and no adverse effects are given to the operation of the light head apparatus even if the mirror 42 is not provided It will be described how to process the high density disc D1 (effect recording and erasing reproduction if necessary). In this case, the compensation element 45 is not in the optical path. The light beam from the light source 2 passes through the collimator lens 12, the beam shaping prism 13, the beam splitter 5 and the quarter wavelength plate 7, and is collected as a very small spot by the objective lens 8 on a recording layer D1b through the substrate D1a of the optical disc D1. The lens 8 is designed to have aberrations less than the standard values at the portion where the light beam is collected by considering the aberrations produced on the substrate D1a. The light beam reflected on the recording layer D1b of the optical disc D1 passes through the objective lens 8 and the quarter wavelength plate 7, reflected again by the beam splitter 5 and enters a signal detecting system comprising the converging lens 26, the concave lens 27, the cylindrical lens 28 and the optical detector 11.

The focus errors are detected by the astigmatism method and the tracking errors are detected by the push-pull method. Both detection is made by operating the outputs of the four divided faces of the optical detector 11. The focus errors and the tracking errors are generated from the output signals of the optical detector 11 in an amplifying circuit 215 and an error signal operating portion 217. The reproduction signal is obtained by adding, by the amplifying circuit 215, all signals of all divided faces of the optical detector 11.

A focus drive coil 222 and a tracking drive coil 223 are driven by a focus drive circuit 220 and a tracking drive circuit 221 in accordance with the focus error signal and the tracking error signal from the error signal operating portion 217 so as to move the objective lens 8 along the optical axis and in the direction perpendicular to the tracks on the optical disc D1. By doing so, the very small light spot can be collected by the objective lens 8 at the predetermined position of the recording layer D1b of the optical disc D1 so as to record, erase and reproduce information stably.

The focus error signals are detected by the astigmatism method and tracking error signals are detected by the pushpull method. However, any other method using HOE or the like can be employed without losing the effects of this invention. The detecting surfaces can be arbitrarily divided according to said other method.

A concrete specification of the objective lens 8 will be given. Let it be assumed that the numerical aperture NA of the objective lens is 0.6, the focal length f is 2.1 mm, the working distance W is 0.9 mm and the wavelength $\lambda$ is 690 nm. For the optical disc D1 having the substrate D1a of a thickness of 0.6 mm, the aberration of the light beam at light collecting position of the objective lens 8 is 0.027 $\lambda$ which is less than the standard value (0.03 $\lambda$), and the optical spot determined by $\lambda$/NA is obtained.

Figures 49A, 49B:
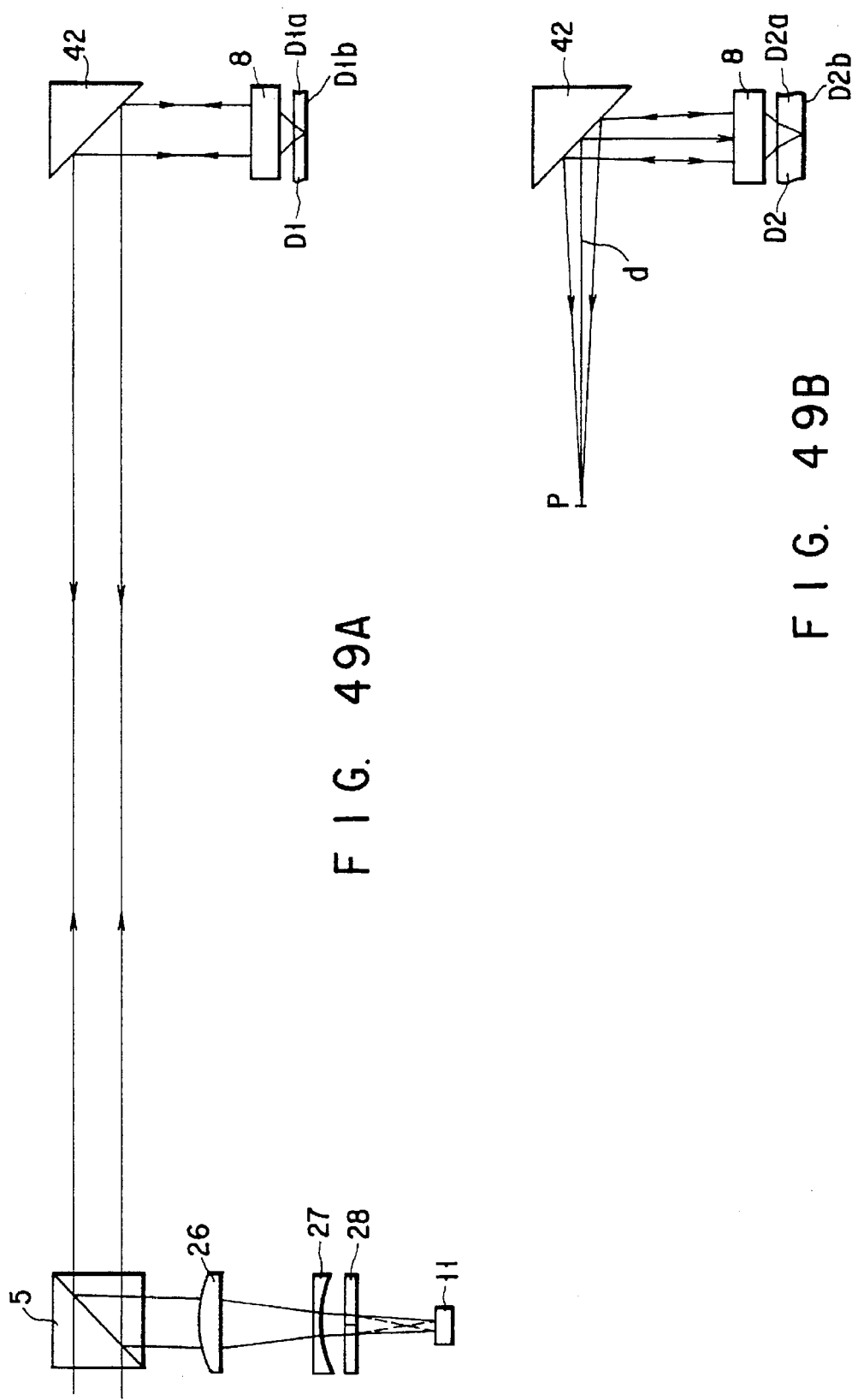
FIGS. 49A and 49B show how light beams from light sources travel, respectively.

Explanation will be made how the low density optical disc D2 which has a different thickness from the high density disc D1 performs recording, erasing and reproduction. As shown in FIG. 49A, when a parallel light beam is incident on the objective lens 8, the aberration of the light beam at the light collecting position of the objective lens 8 for the optical disc D1 having the 0.6 mm substrate D1a is less than the standard value. However, if the thicknesses of the substrate D1a of the disc D1 and the substrate D2a of the disc D2 are different from each other, the aberration does not become less than the standard value, and the light spot determined by $\lambda$/NA is not formed by the objective lens 8.

However, as shown in FIG. 49B, there exists a point (point optical source) P from which the light beam is emitted and an which the aberration of the light beam at the light collecting position of the objective lens 8 is less than the standard value. FIG. 54 shows the calculated results of aberrations of the light beam at the light collecting position of the objective lens 8, taking d as the distance from the point P to the objective lens 8. The thickness of the light substrate D2a is 1.2 mm d is 27.8 mm and the aberration of the light beam at the light collecting position of the objective lens 8 is 0.02 $\lambda$. The range of the position of the point optical source P in which the aberration is less than the standard value is about 2.1 mm.

Even if, therefore, the thickness of the substrate is 1.2 mm, a very small light spot can be formed by the objective lens 8 by adjusting the position of the point optical source within the range in which the aberration is less than the standard value. In other words, aberration caused by difference in substrate thickness is decreased by altering the radius of curvature of the light beam incident on the objective lens 8. Usually, the objective lens 8 is moved along the optical axis by normally about ±0.3 mm at the maximum so as to perform focus control. In this case, the aberration can be also made less than the standard value. By providing the point light source at or in the vicinity of the center of the range of the point light in which the aberration is less than the standard value, the allowance for the movement of the objective lens 8 along the optical axis is determined such that the light beam is collected as a very small light spot by the objective lens 8.

In this case, the working distance WD is 0.71 mm and the focal length f is 2.4 mm. Thus, the light spot formed by the objective lens 8 is displaced. The displacement can be corrected by sending an offset corresponding to the displacement to an objective lens drive coil 222 by the focus drive circuit 220. The effective numerical aperture NAe is about 0.55. Thus, the record density is determined by $\lambda$/NAe.

There will be described several means for allowing light beams to be emitted from the point P. Fundamentally, this is visualized by inserting the compensation element 45 into the parallel beams traveling from the beam splitter 5 to the objective lens 8 as shown in FIG. 48. In this case, the quarter wavelength plate 7 may be in the parallel beam.

Figure 50:
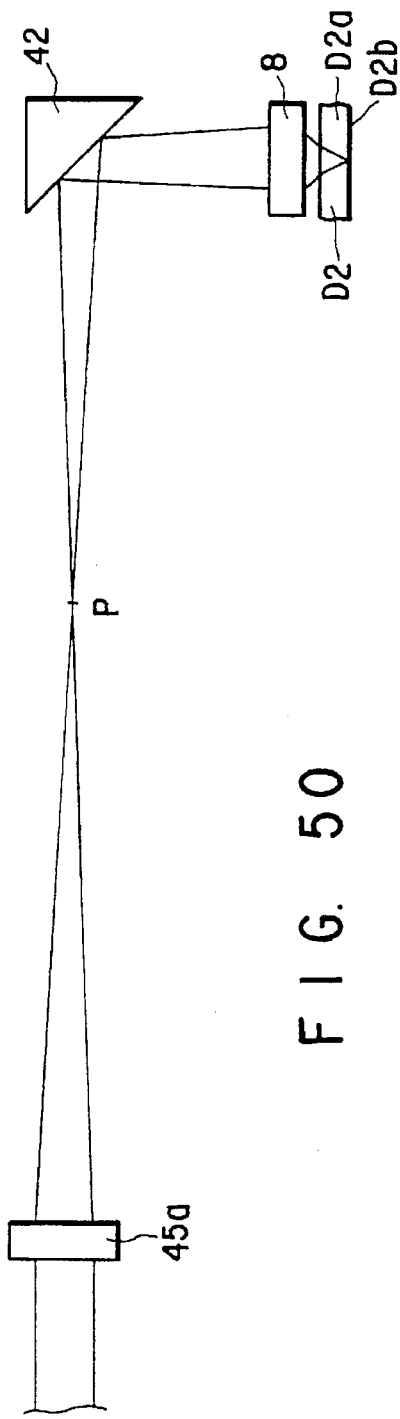
FIGS. 50 to 53 show concrete examples of a correction elements used in the apparatus shown in FIG. 48.

As shown in FIG. 50, a convex lens 45a is placed in the parallel beam which has passed the beam splitter 5 so as to collect the light beam on the point P. The focal length f is equal to d. In this case, the quantity of the light beam shaded by the apertures of the optical elements such as the objective lens is equal to that of the incident parallel beam, and the optical power efficiency ranging from the light source to the optical disc is little changed. Since the diameter of the light beam reflected by the optical disc is not changed by inserting the compensation element 45, the focus error signals and the tracking errors signals are not affected. It is, therefore, preferable that the method as shown in FIG. 48 be used to perform recording and reproduction.

Figure 51:
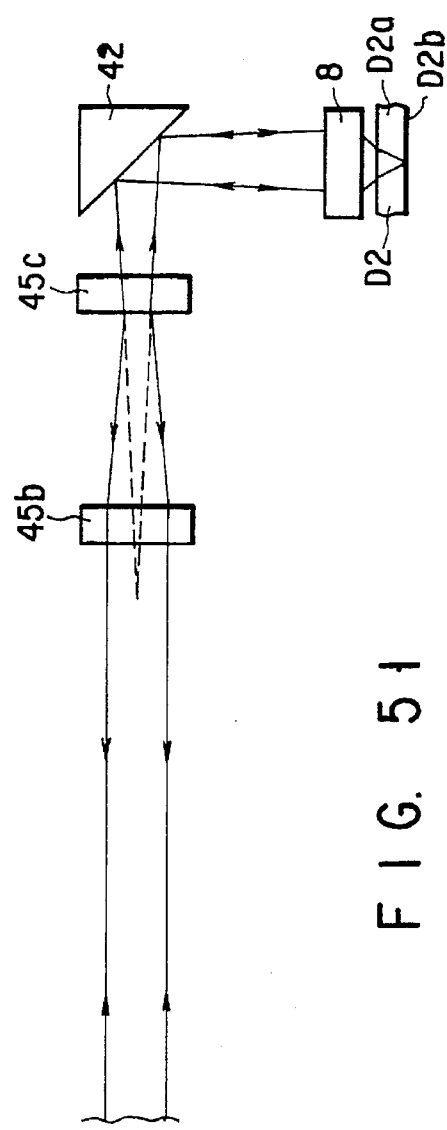

FIG. 51 shows another means for forming a light beam emitted from the point P, wherein a convex lens 45b and a concave lens 45c are used as compensation elements. This has a feature that the optical system is shorter than the optical system shown in FIG. 50. The other controlling system, the signal recording system and the signal reproducing system are the same as those shown in FIG. 50. FIGS. 49A, 49B, 50 and 51 illustrate how to compensate for the aberrations of the objective lens and the optical system not shown in these figures is the same as that shown in FIG. 48.

Figure 52:
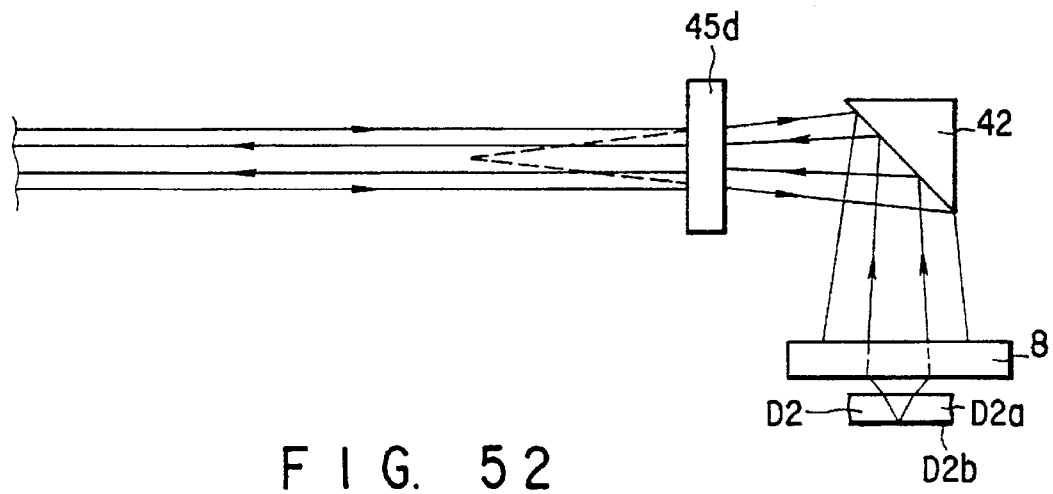
Figure 53:
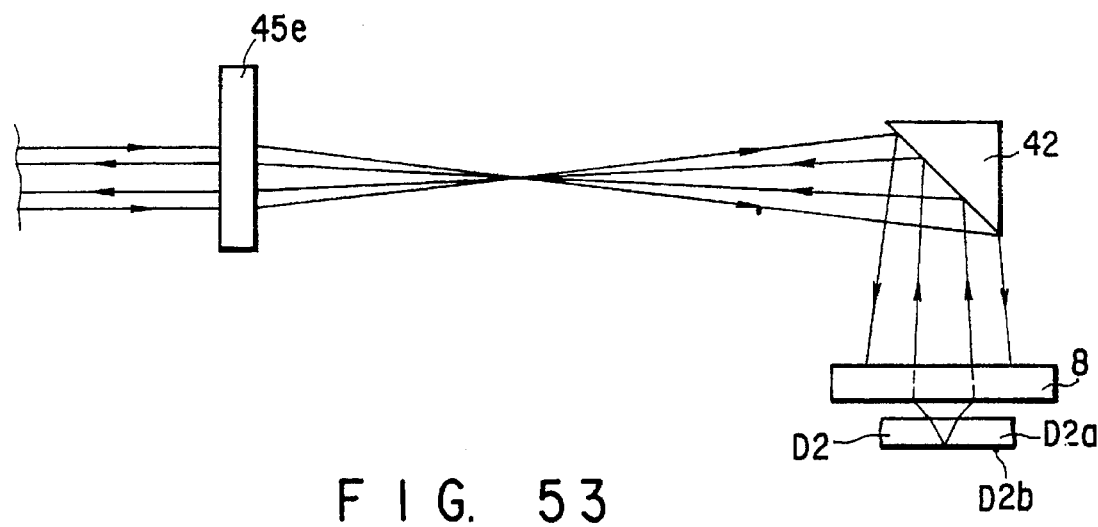

FIGS. 52 and 53 show further means for forming a light beam emitted from the point P. A concave lens 45d is used as the commensation element in the embodiment shown in FIG. 52 in FIG. 53 is used, as the compensation element, a convex lens 45e whose focal length f is not equal to d. The optical system can advantageously be made short in the embodiments shown in FIGS. 52 and 53 in these cases, the light beam reflected by the optical disc D2 and returning from the beam splitter 5 to the optical disc D2 have a smaller beam diameter than the light beam traveling from the beam splitter 5 to the optical disc D2. The optical system not shown in these figures is the same as that shown in FIG. 48.

In these cases, the beam diameter on the optical detector 11 is small and the power of light detected by the detector 11 is reduced. However, this is compensated by adding to the amplifier 215 means for changing the gain according to the optical disc for recording, erasing and reproduction. The following signal reproducing circuit does not require any change. The focus error signal sensitivity and the tracking error signal sensitivity are changed. However, means for changing the gain of the closed loop of each control is provided to compensate these changes. For example, an automatic gain adjusting circuit is provided in front of an error signal operating device 217.

The detecting optical system is designed such that the signals can be reproduced by the smallest diameter of the beam on the optical detector 11. The optical detector is made large enough to detect the largest diameter of the beam.
(Thirtieth Embodiment)

Figure 56:
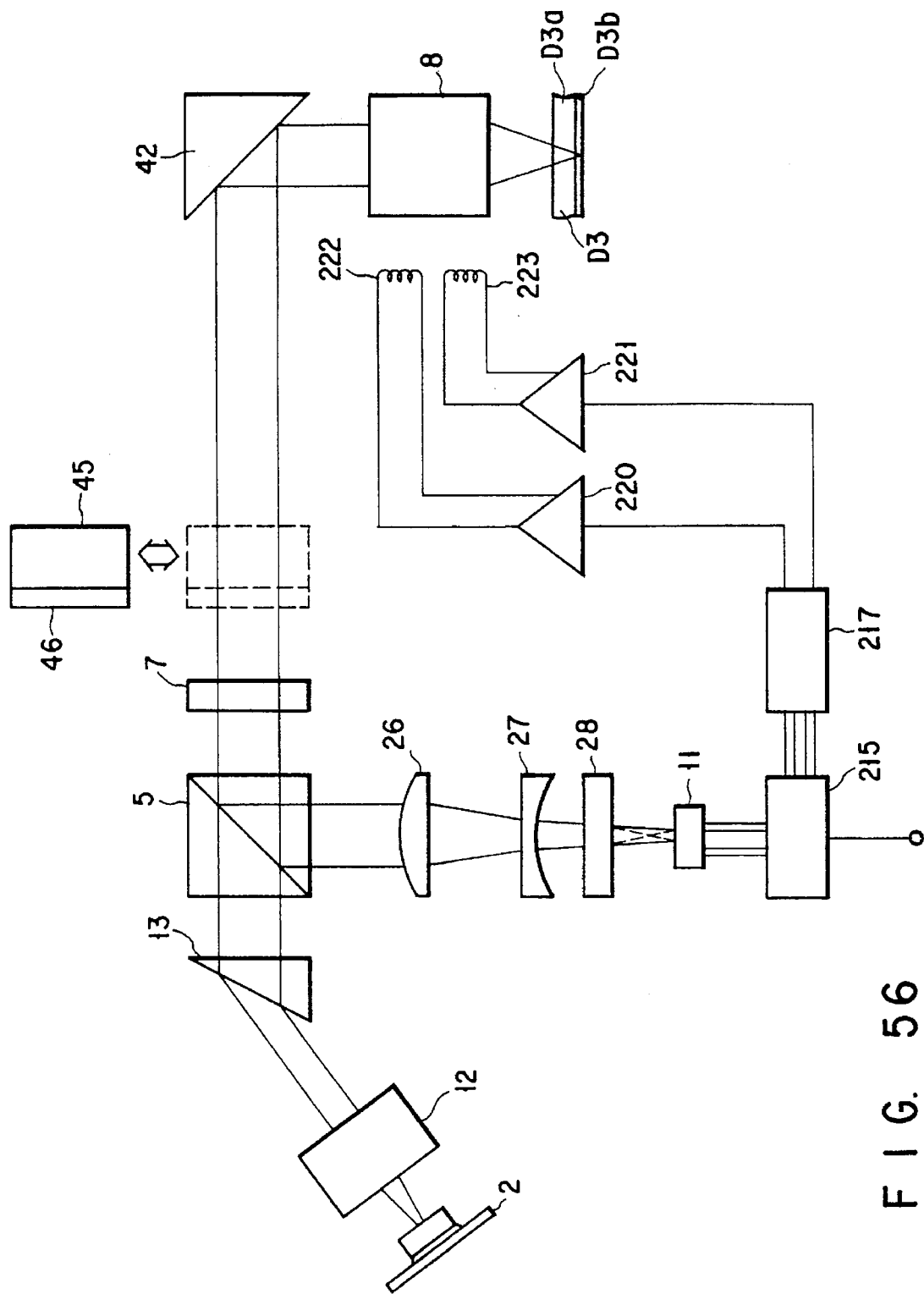
FIG. 56 shows an optical head apparatus according to a thirtieth embodiment of this invention.

FIG. 56 shows an optical head apparatus of a thirtieth embodiment for recording information on and erasing and reproducing the information from optical discs whose substrate thicknesses are different greatly from each other and whose record densities are also different greatly from each other. When the light spot diameter is too small with respect to the recording mark on the optical disc and the track intervals, the focusing control and the tracking control become unstable and sometimes information cannot be recorded, erased or reproduced accurately. In this case, it is necessary to optimize the diameter of the light beam converged by the objective lens of the optical head apparatus in connection with the recording mark on the optical disc to be processed and the track interval. This is done by enlarging the light spot diameter by means of the objective lens by reducing the effective numerical aperture NAe of the objective lens. An example of this means is shown in FIG. 56.

In this embodiment, the effective numerical aperture NAe is reduced and the spot formed by the objective lens is enlarged by changing the compensation element 45 and the element 46 for changing the dimension of the aperture, at the same time. In doing so, information can be recorded on and erase and reproduced from the optical discs whose substrate thicknesses are different from each other and whose recording densities are also different greatly from each other.

Where the element 46 for limiting the aperture is inserted, the diameter of the parallel beam traveling toward the objective lens is small as compared with that when only the compensation element 45 is used, and therefore the light beam incident on the detecting optical system is also small. When the compensation element 45 is constructed as shown in FIGS. 50 and 51, the diameter of the light beam on the optical detector 11 becomes small and the quantity of light is reduced. However, if means for changing the gain of the amplifier 215 is provided, the reduction of the light beam diameter and the quantity of light is compensated. Thus, no change is required for the following signal reducing circuit when the compensation element 45 is constructed as shown in FIGS. 52 and 53, the focus error signal sensitivity and the tracking error signal sensitivity are also changed. However, these changes can be compensated by means for changing the gain of the closed loop of each control.

There will be described an example of the actual optical disc apparatus which uses the objective lens 8 shown in FIG. 48 and an optical disc whose substrate thickness is 1.2 mm. This apparatus visualizes the recording density corresponding to the effective numerical aperture NAe of about 0.4. In order to make the effective numerical aperture NAe of the objective lens 8 be 0.4, the diameter of the light beams incident on the objective lens 8 may be limited by the aperture corresponding to the numerical aperture NA of 0.4. Here, the effective numerical aperture NAe is 0.45 for the radius of the aperture of 0.95 mm. When the thickness of the substrate D3a of the optical disc D3 is 1.2 mm, the aberration of the light beams at the light collecting position of the objective lens 8 is shown in FIG. 55, at the point source P in FIG. 49B. For example, the aberration is 0.001 λ for d=30.5 mm. Since the numerical aperture is small, the range in which the aberration is equal to or less than the standard value the standard value s widened remarkably. The focal length f is 2.38 mm.

The working distance is changed to 0.67 mm in this case, this change or displacement can be also corrected by applying the offset to the objective lens driving coil 222 by the focus drive circuit 220 according to the displacement. When, therefore, the substrate D3a of the optical discs D3 is different from the effective numerical aperture of the objective lens 8, the point light source P shown in FIG. 49B can be determined by considering both the parameters.

With reference to FIGS. 57 to 60, there will be described an embodiment which handles the optical discs having different thicknesses by using two light sources. It is assumed that recording and reproduction is conducted on the high density optical disc by first light beam having a shore wavelength of λ1 and reproduction is performed on the low density optical disc by second light beam having a long wavelength of λ2.

(Thirty-first Embodiment)

Figure 57:
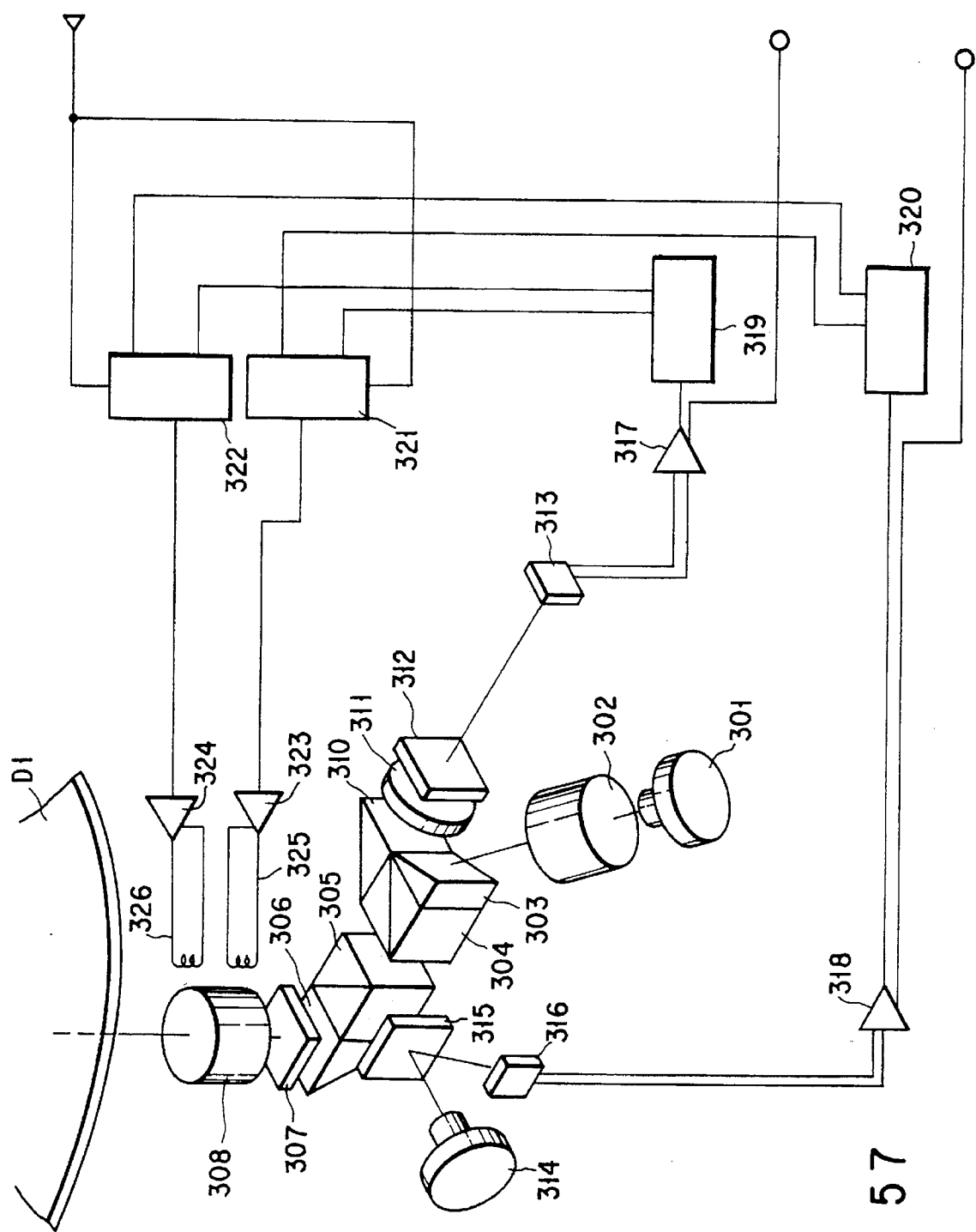
FIG. 57 is a perspective view of an optical head apparatus according to a thirty-first embodiment of this invention.

FIG. 57 shows an optical head apparatus according to a thirty-first embodiment.

The optical system of the optical head apparatus shown in FIG. 57 comprises a first light source 301 of a wavelength of λ1, a second light source 314 of a wavelength of λ2, a collimator lens 302, a beam shaping prism 303, a beam splitter 304, a dichroic mirror 305, a mirror 305, a quarter wavelength plate 307, an objective lens 308 and a mirror 310. Adjacent to the mirror 310 is a λ1 wavelength beam detecting system comprising a convex lens 311, a first diffracting element (first HOE) 312 and an optical detector 313. Adjacent to the dichroic mirror 305 is a detecting system for the light having a wavelength of λ2 which comprises a second diffracting element (second HOE) 315 and an optical detector 316. To the first optical detector 313 are connected an amplifier 317, an error signal operating device 319 and a switching circuit 321 in turn. To the second optical detector 316 are connected an amplifier 318, an error signal operating device 320 and a switching circuit 322 in turn. To the switching circuit 321 are connected a focus drive circuit 323 and a focus drive coil 325. To the switching circuit 322 are connected a tracking drive circuit 324 and a tracking drive coil 326.

The beam splitter 304 allows the P-polarized component of the light beam of the wavelength λ1 to pass therethrough and reflects the S-polarized component. The dichroic mirror 305 permits the light beam of the wavelength λ1 to pass therethrough and reflects the light beam of the wavelength λ2. The mirrors 306 and 310 change the traveling direction of the light beams. However, no adverse effect is given to the function of the optical head if the mirrors 306 and 310 are omitted.

The operation of the optical head apparatus shown in FIG. 57 will be described.

There will be described how recording, erasing and reproduction are performed on a normally thin high density optical disc D1. The λ1 wavelength light beam emitted from the light source 301 is formed into a parallel beam by the collimator lens 302 and then changed from an anisotropic light beam to an isotropic light beam. Thereafter, the light beam passes through the beam splitter 304 and the dichroic mirror 305, and then is deflected by the mirror 306. After having passed through the quarter wavelength plate 307, the light beam is collected on the recording layer D1b as a very small spot through the substrate D1a of the optical disc D1. The optical lens 308 is designed such that the aberration of the light beam of the wavelength λ1 at the light collecting position is less than the standard value by considering the aberration produced by the substrate D1a.

The light beam reflected by the recording layer D1b of the optical disc D1 passes through the objective lens 308 and the quarter wavelength plate 307 and is reflected by the mirror 304. The reflected light beam passes through the dichroic mirror 309 and is reflected again by the beam splitter 304. It is further deflected by the mirror 304 and incident on a signal detecting system comprising the converging lens 311, the first HOE 312 and the optical detector 313.

The light beam of the wavelength λ1 is linearly polarized. The linearly polarized light beam is changed into a circularly polarized light beam after having passed through the quarter wavelength plate 307. The light beam incident on the optical disc D1 is a circularly polarized light beam. The circularly polarized light beam reflected from the optical disc D1 passes through the quarter wavelength plate 307 again, and is changed into a linearly polarized light beam whose polarization direction is deflected by 90° from the polarization direction of the linearly polarized light beam first incident on the quarter wavelength plate 307. Thus, the light beam from the optical disc D1 is reflected by the beam splitter 304.

The first HOE 312 changes the shape of the light beam on the detecting surfaces of the optical detector 308 according to the focusing error of the objective lens 308. Thus, the focus error signals are obtained by operating the output signals of the optical detector 313 having the divided detecting surfaces. The tracking signal is detected by the pushpull method. The reproduction signal of the information is obtained by adding up the signals on all the divided faces of the optical detector 313 by means of the amplifying circuit 317.

The focus signal error signal and the tracking signal are generated by the error signal operating portion 319. These signals are supplied to the focus drive circuit 323 and the tracking drive circuit 324 through the switching circuits 321 and 322 and cause electric currents to flow through the focus drive coil 325 and the tracking drive coil 326. Then, the objective lens 308 is moved in the direction perpendicular to the optical axis and the track on the optical disc D1. Thus, the very small light spot is made to coincide with the information recorded on the recording layer D1b of the optical disc D1 such that the information is recorded, erased and reproduced stably.

The detection of the focus error signals and the tracking error signals are made by the first HOE 312 and the pushpull method, respectively, but may be made by any other method such as the astigmatism method without loosing the effect of this invention. The optical detecting surfaces can be arbitrarily divided according to the error detecting method. The mechanisms of the reproduction of the information and the control system on an optical head apparatus are detailed in Published Unexamined Japanese Patent Application No. 3-257.

A concrete example of the specification of the objective lens 308 will be described. Let it be that the numerical aperture of the objective lens NA is 0.6, the focal length f is 2.1 mm, the working distance WD is 0.9 mm and the wavelength λ is 690 nm. The aberration of the light beams at the light collecting position of the objective lens 308 is 0.027 λ for the optical disc D1 having a substrate D1a of a thickness of 0.6 mm. Since the aberration is smaller than the standard value (0.03 λ), light beam spot defined by λ/NA is obtained.

It will be described how no process the high density optical disc D1 and the low density optical disc D2 having different thicknesses. As shown in FIG. 58A, when the parallel light beam is incident on the objective lens 308, the aberration of the light beam at the light collecting position of the objective lens 308 is less than the standard value with respect to the optical disc D1 having the substrate D1a of thickness of 0.6 mm. When, however, the thicknesses of the substrate D1a of the disc D1 and the substrate D2a of the disc D2 are different from each other, the aberration of the light beam at the light collecting position of the objective lens 308 cannot be less than the standard value. Thus, the light spot defined by λ/NA is not obtained.

In this case, there is a point (point light source) P from which the light beam is emitted and collected at the light collecting position of the objective lens 308 at the aberration less than the standard value, as shown in FIG. 58B. FIG. 54 shows the calculated results of the aberrations of the light beam at the light collecting position of the objective lens 308 by taking d as the distance from the point P to the objective lens. The thickness of the substrate D2a is 1.2 mm in the case. d is 27.8 mm and the aberration at the light collecting position of the objective lens 308 is 0.02 λ. The range of the point light source whose aberration is less than the standard value is about 2.1 mm.

Putting the light source on the point light source, the light beam can be collected as a very small light spot by the objective lens 308. In other words, the aberration due to the change of the thickness of the substrate can be corrected by altering the radius of curvature of the light beams incident on the objective lens 308. Usually, the objective lens 308 is moved along the optical axis by normally about ±0.3 mm at the maximum due to the focus control in this case, the aberration is also made smaller than the standard value. By providing the point light source at or in the vicinity of the center of the range of the point light in which the aberration is less than the standard value, the allowance for the movement of the objective lens 308 along the optical axis is determined such that the light beam is collected as a very small light spot by the objective lens 308.

In this case, the working distance WD is 0.71 mm and the focal length f is 2.4 mm. Thus, the light spot formed by the objective lens 308 is displaced. The displacement can be corrected by applying offset corresponding to the displacement to an focus drive circuit 323. The effective numerical aperture NAe is about 0.55. Thus, the record density is determined by λ/NAe.

It is preferable that the wavelength of the light source put at the point P be different from that of the main light source. For example, when the light source of a wavelength of 780 nm, the distance d from the point P to the objective lens 308 is 28.1 mm. In this case, the light source is disposed at such a position that the aberration of the light spot collected by the objective lens 308 is less than the standard value.

It is preferable that the wavelength of the light source placed at the point P be different from that of the principle light source. For example, the distance d between the point P and the objective lens 308 is 28.1 mm for the light source of a wavelength of 78 nm in this case, the light source is placed at the position where the aberration of the light spot formed by the light beams converged by the objective lens 308.

Next, the light source is positioned at the point P. For example, the light source 314 of the wavelength λ2 is disposed as shown in FIG. 57. The light beam emitted from the light source of the wavelength λ2 passes through the second HOE 315 and is reflected by the dichroic mirror 305. Then, the light beam passes through the mirror 306 and the quarter wavelength plate 307 and is converged on the optical disc D2 by the objective lens 308. The light beam reflected by the optical disc D2 passes through the objective lens 308, the quarter wavelength plate 307 and the mirror 306 and is reflected by the dichroic mirror 705. Thereafter, the light beam diffracted by the second HOE 315 is detected by the optical detector 316, and the focus error signal and the tracking error signal are obtained. The second HOE 315 can be made in the same way as the first HOE 312.

A thirty-second embodiment and a thirty-third embodiment which are modifications of the thirty-first embodiment will be described. The same parts of these embodiments as those of the thirty-first embodiment are designated by the same reference numbers, and only the differences will be described.

(Thirty-second Embodiment)

FIG. 59 shows an optical head apparatus according to a thirty-second embodiment which employs a separating optical system. The portion encircled by a broken line is a moving portion and the other portion is a fixed portion. The moving portion is provided with an objective lens actuator having two axes. The moving portion together with the objective lens actuator is moved radially of the optical discs D1 and D2 to perform access control on the discs. The focus control and the tracking control are made by the objective lens actuator having two axes.

In this way, the distance between the light source 314 and the objective lens 308 can be maintained constant by simultaneously moving the light source 314, the second HOE 315, the detector 316, the dichroic mirror 305, the mirror 306, the quarter wavelength plate 307 and the objective lens 308 together with the objective lens actuator having two axes. The light beam from the optical source 314 can be collected as a very small light beam spot through the objective lens 308. Thus, recording, erasing and reproduction can be performed even when the optical discs whose substrate thicknesses are different from each other are used.

(Thirty-third Embodiment)

Figure 60:
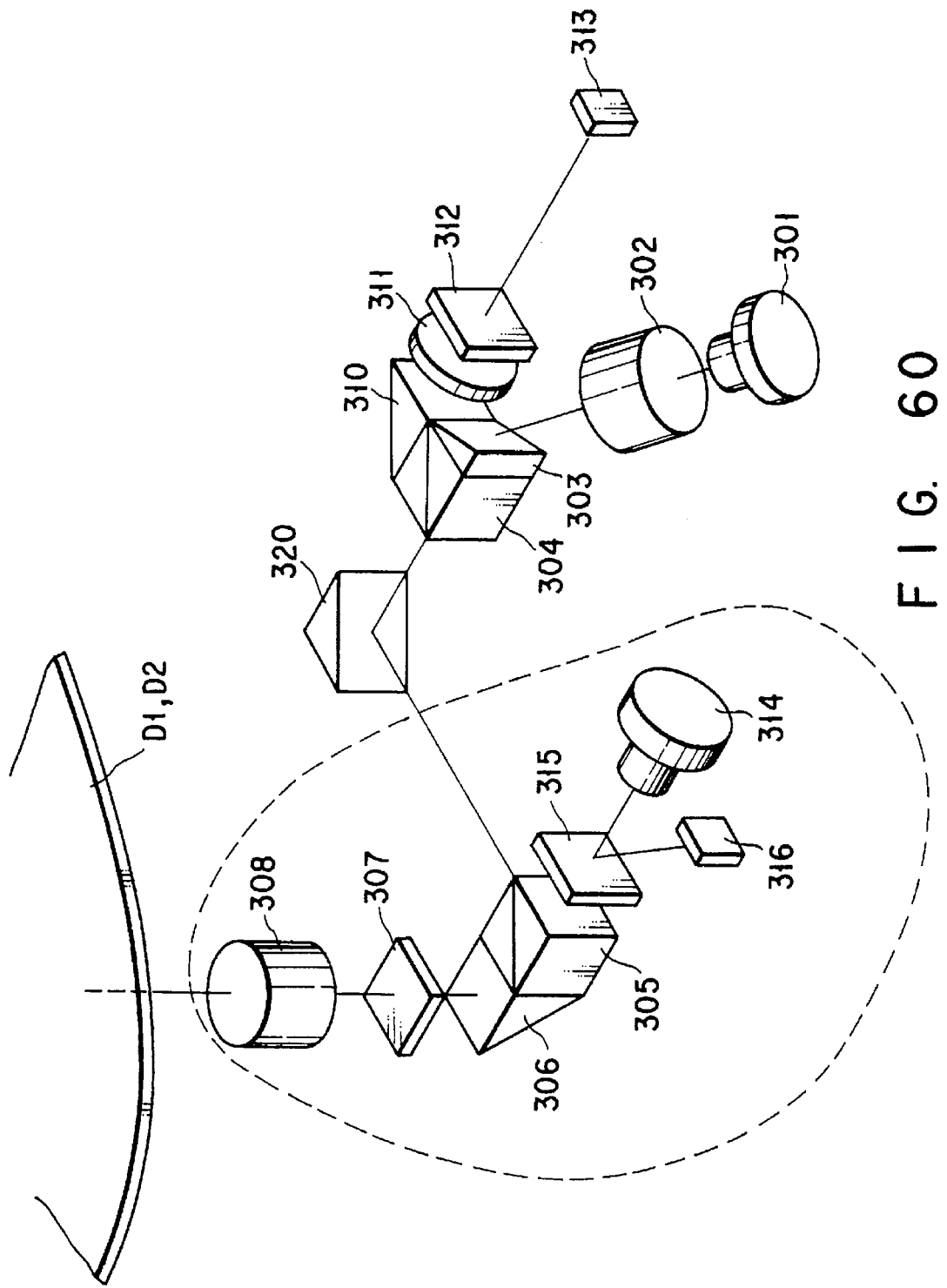
FIG. 60 is a perspective view of an optical head apparatus according to a thirty-third embodiment of this invention.

FIG. 60 shows an optical head apparatus according to a thirty-third embodiment modified from the thirty-second embodiment. This embodiment also uses a separating optical system. The portion encircled by a broken line is a moving portion and the other portion is a fixed portion. The direction of the reflecting surface of the dichroic mirror 305 of this embodiment differs from that of the thirty-second embodiment. A mirror 320 is provided between the dichroic mirror 305 and the beam splitter 304. The mirror 320 is intended to change the direction of the light beams and thus can be omitted.

The thirty-first to thirty-third embodiments are intended to use light sources providing two kind of light beams having different wavelengths. Normally, an optimized wavelength is allotted to the reproduction signal and the like of an optical disc. For example, the optimized wavelength for a compact disc is 780 nm. Although the signal can be reproduced even if the wavelength is deviated slightly, the wavelength suited to the recording medium is the best. Therefore, it is preferable that the light sources emitting light beams having wavelengths suited to the recording media, i.e., optical discs be used.

In the embodiments as described above, optical discs use PC medium but NOS medium or WO medium may be used instead. Further, the optical recording medium is not limited to a disc but may be a card. The mechanism for discriminating high and low density discs used in the eighth embodiment can be also employed in all the other embodiments.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head apparatus to be used for first and second optical discs having first and second areal densities, respectively, the first density being higher than the second density, said apparatus comprising:

a first light source for emitting a first light beam having a first wavelength;

a second light source for emitting a second light beam having a second wavelength; and an optical system for guiding said first and second light beams from said first and second light sources to a target optical disc and guiding said first and second light beams upon reflection from said target optical disc to optical detecting means, said optical system including a quarter wavelength plate and an objective lens for converging said first and second light beams on said target optical disc as a first light spot and a second light spot, respectively, wherein information is reproduced only by said first light beam when said target optical disc is said first optical disc, and information is recorded and reproduced only by said second light beam when said target optical disc is said second optical disc.

2. The apparatus according to claim 1, further comprising discriminating means for effecting discrimination between said first and second optical discs.

3. The apparatus according to claim 1, wherein said optical system includes a diffracting element disposed in front of said optical detecting means, for allowing said first and second light beams reflected by said target optical disc to pass therethrough and guiding the same to said optical detecting means.

4. The apparatus according to claim 3, wherein said optical detecting means comprises a single optical detector having a first optical detecting surface and a second detecting surface, provided at light radiating positions of said first and second light beams diffracted by said diffracting element.

5. The apparatus according to claim 3, wherein said optical detecting means comprises a first optical detector and a second optical detector, provided at light radiating positions of said first and second light beams diffracted by said diffracting element.

6. The apparatus according to claim 1, further comprising optical compensation means insertable between said objective lens and said second light source, for changing a radius of curvature of said second light beam incident on said objective lens according to thicknesses of said first and second optical discs so as to make an aberration of said second light spot less than a standard aberration value.

7. The apparatus according to claim 6, wherein said optical compensation means includes an aperture dimension changing optical element for reducing a beam diameter of said second light beam incident on said objective lens.

8. An optical head apparatus to be used for first and second optical discs having first and second areal densities, respectively, the first density being higher than the second density, said apparatus comprising:

a first light source for emitting a first light beam having a first wavelength;

a second light source for emitting a second light beam having a second wavelength larger than said first wavelength; and an optical system for guiding said first and second light beams from said first and second light sources to a target optical disc, separating said first and second light beams reflected from said target optical disc and guiding the same to first and second optical detecting means, respectively, said optical system including an objective lens for converging said first and second light beams as a first light spot and a second light spot on said target optical disc, said optical system further including at least one beam splitter disposed between said first and second light sources and said objective lens, for reflecting all said first light beam, transmitting at least part of a P-polarized component of said second light beam, and reflecting all of an S-polarized component of said second light beam, and a quarter wavelength plate disposed in an optical path between said beam splitter and said objective lens, said optical system further including a diffracting element for diffracting said first and second light beams to allow the same to be incident on said first and second optical detecting means, respectively, wherein information is reproduced only by said first light beam when said target optical disc is said first optical disc, and information is recorded and reproduced only by said second light beam when said target optical disc is said second optical disc, and wherein one of said first and second light sources is turned off when the other is turned on, so that the corresponding light beam from said one light source does not affect the other light beam from the other light source.

9. The apparatus according to claim 8, wherein said first and second detecting means have a first optical detector and a second optical detector, respectively.

10. An optical head apparatus to be used for first and second optical discs having first and second areal densities, respectively, the first density being higher than the second density, said apparatus comprising:

a first light source for emitting a first light beam having a first wavelength;

a second light source for emitting a second light beam having a second wavelength larger than said first wavelength; and an optical system for guiding said first and second light beams from said first and second light sources to a target optical disc, separating said first and second light beams reflected from said target optical disc and guiding the same to first and second optical detecting means, respectively, said optical system including an objective lens for converging said first and second light beams as a first light spot and a second light spot on said target optical disc, and said optical system further comprises a first beam splitter disposed between said first and second light sources and said objective lens, for reflecting all of said first light beam, transmitting at least part of a P-polarized component of said second light beam, and reflecting all of an S-polarized component of said second light beam, a second beam splitter disposed between said first and second light sources and said objective lens, for reflecting all of said first light beam, transmitting all of a P-polarized component of said second light beam, and reflecting all of said S-polarized component of said second light beam, and a quarter wavelength plate disposed in an optical path between said beam splitter and said objective lens, wherein information is reproduced only by said first light beam when said target optical disc is said first optical disc, and information is recorded and reproduced only by said second light beam when said target optical disc is said second optical disc, and wherein one of said first and second light sources is turned off when the other is turned on, so that the corresponding light beam from said one light source does not affect the other light beam from the other light source.

11. An optical head apparatus to be used for first and second optical discs having different thicknesses and having first and second areal densities, respectively, the first density being higher than the second density, said apparatus comprising:

a first light source for emitting a first light beam having a first wavelength and being incident on an objective lens as a parallel light beam along an optical axis;

a second light source for emitting a second light beam having a second wavelength longer than said first wavelength and being incident on said objective lens as a divergent light beam along said optical axis; and an optical system for guiding said first and second light beams to a target optical disc and guiding said first and second light beams upon reflection from said target optical disc to a first optical detector and a second optical detector, said optical system including an objective lens for converging said first and second light beams as a first light spot and a second light spot on said target optical disc wherein said first light beam is used when said target optical disc is said first optical disc, and said second light beam is used when said target optical disc is said second optical disc.

12. The apparatus according to claim 11, further comprising discriminating means for effecting discrimination between said first and second optical discs.

13. The apparatus according to claim 12, wherein one of said first and second light sources is turned off when the other is turned on, so that the corresponding light beam from said one source does not affect the other light beam from the other source.

14. The apparatus according to claim 11, wherein said optical system includes a diffracting element provided adjacent to said second light source and said second optical detector such that said second light beam passes through said diffracting element and is guided to said second optical disc, and said second light beam reflected is incident on said second detector through said diffracting element.

15. The apparatus according to claim 11, wherein information is reproduced by said first light beam when said target optical disc is said first optical disc and information is reproduced by said second light beam when said target optical disc is said second optical disc.

16. The apparatus according to claim 15, wherein said second light source and said objective lens are integrally movable, while said first light source is fixed, so as to adjust positions of said first and second light spots on said target optical disc.

* * * * *